United States Patent
Hoshino et al.

(10) Patent No.: US 6,388,639 B1
(45) Date of Patent: May 14, 2002

(54) STEREOSCOPIC IMAGE DISPLAY APPARATUS, METHOD OF DISPLAYING STEREOSCOPIC IMAGE, AND RECORDING MEDIUM

(75) Inventors: Toshihito Hoshino; Toru Ozeki, both of Toyota (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 0 days.

(21) Appl. No.: 08/992,337

(22) Filed: Dec. 17, 1997

(30) Foreign Application Priority Data

Dec. 18, 1996 (JP) .............................. 8-338745
Apr. 2, 1997 (JP) .............................. 9-083962
Sep. 18, 1997 (JP) .............................. 9-253903

(51) Int. Cl.$^7$ ............................ G09G 5/00; H04N 13/04
(52) U.S. Cl. ................................. 345/8; 345/7; 348/53; 348/56
(58) Field of Search ................................. 345/7, 8, 419, 345/425; 348/51–56; 359/13, 462, 464, 466; 395/125

(56) References Cited

U.S. PATENT DOCUMENTS

| | | | |
|---|---|---|---|
| 4,562,463 A | | 12/1985 | Lipton |
| 4,870,600 A | | 9/1989 | Hiraoka |
| 5,495,576 A | * | 2/1996 | Ritchey ..................... 395/125 |
| 5,662,523 A | * | 9/1997 | Yasumaru et al. ............ 345/8 |
| 5,671,992 A | * | 9/1997 | Richards ..................... 359/464 |
| 5,737,012 A | * | 4/1998 | Tabata et al. ................. 345/8 |
| 5,767,821 A | * | 6/1998 | Palsgard et al. .............. 345/8 |
| 5,821,989 A | * | 10/1998 | Lazzaro et al. ............... 348/56 |
| 5,831,584 A | * | 11/1998 | Socks et al. .................. 345/8 |
| 5,991,085 A | * | 11/1999 | Rallison et al. ............... 345/8 |

FOREIGN PATENT DOCUMENTS

| | | |
|---|---|---|
| EP | 607 000 | 7/1994 |
| EP | 751 689 | 1/1997 |
| JP | 6-131442 | 5/1994 |
| JP | 8-234140 | 9/1996 |
| WO | 95/21397 | 8/1995 |

OTHER PUBLICATIONS

Miyasato et al., "A Study of a Multi–Stereoscopic Display System for Multi–viewers", ATR Media Intergration & Communications Research Laboratories, A–16–21, pp. 393 & 1.

Cruz–Neira et al., "Surround–Screen Projection–Based Virtual Reality; The Design and Implementation of the CAVE", Computer Graphics Proceedings, Annual Conference Series, 1993, pp. 135–142.

* cited by examiner

*Primary Examiner*—Bipin Shalwala
*Assistant Examiner*—David L. Lewis
(74) *Attorney, Agent, or Firm*—Pillsbury Winthrop LLP

(57) ABSTRACT

Space correction processing is performed for correcting an error between the position of actual space and the position of space which has been detected by a position sensor and can serve as a virtual space. Processing for setting the position of a screen is performed for accurately ascertaining the three-dimensional position of an image which is displayed on a screen. Processing for setting the position of a visual point is performed for setting the position of an actual visual point of an operator. Consequently, the position of the visual point and a position on the screen can be inputted accurately, and a highly accurate stereoscopic image is displayed in the virtual stereoscopic space faithfully to a real object by adopting the set screen position and the position of the visual point in the virtual space subjected to spatial correction.

25 Claims, 47 Drawing Sheets

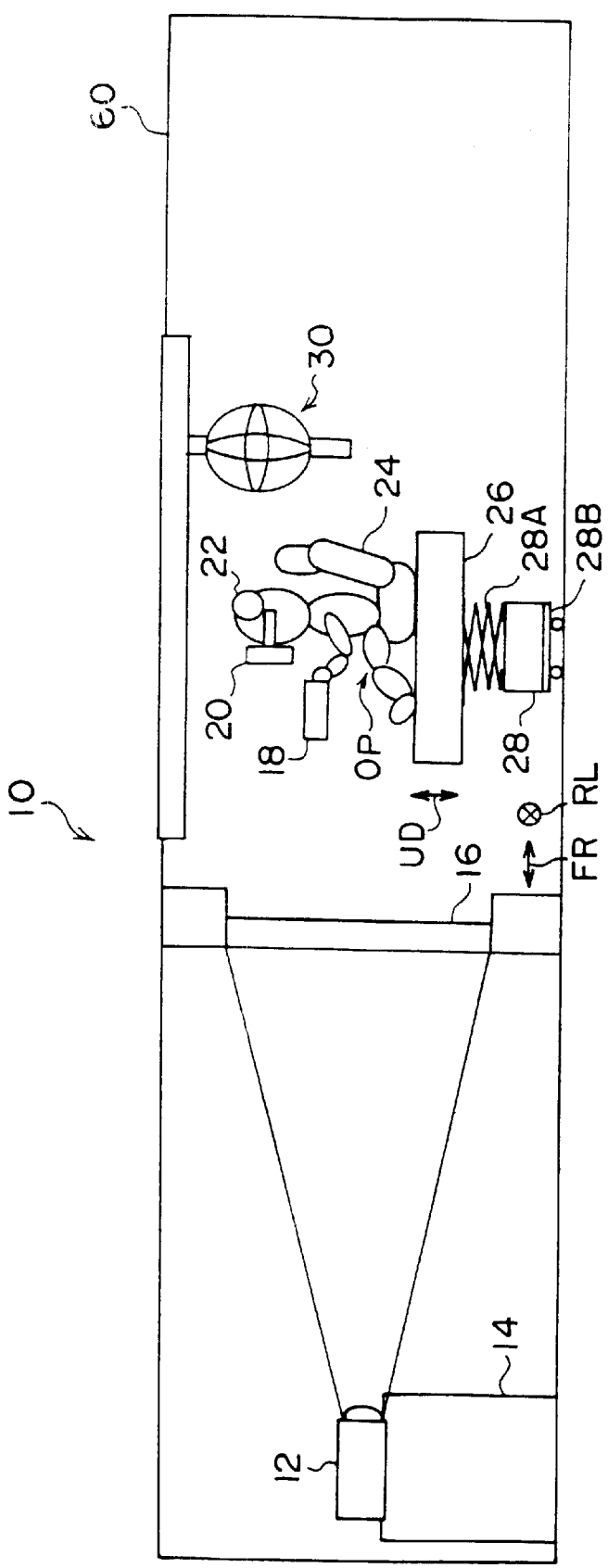

F I G. 6
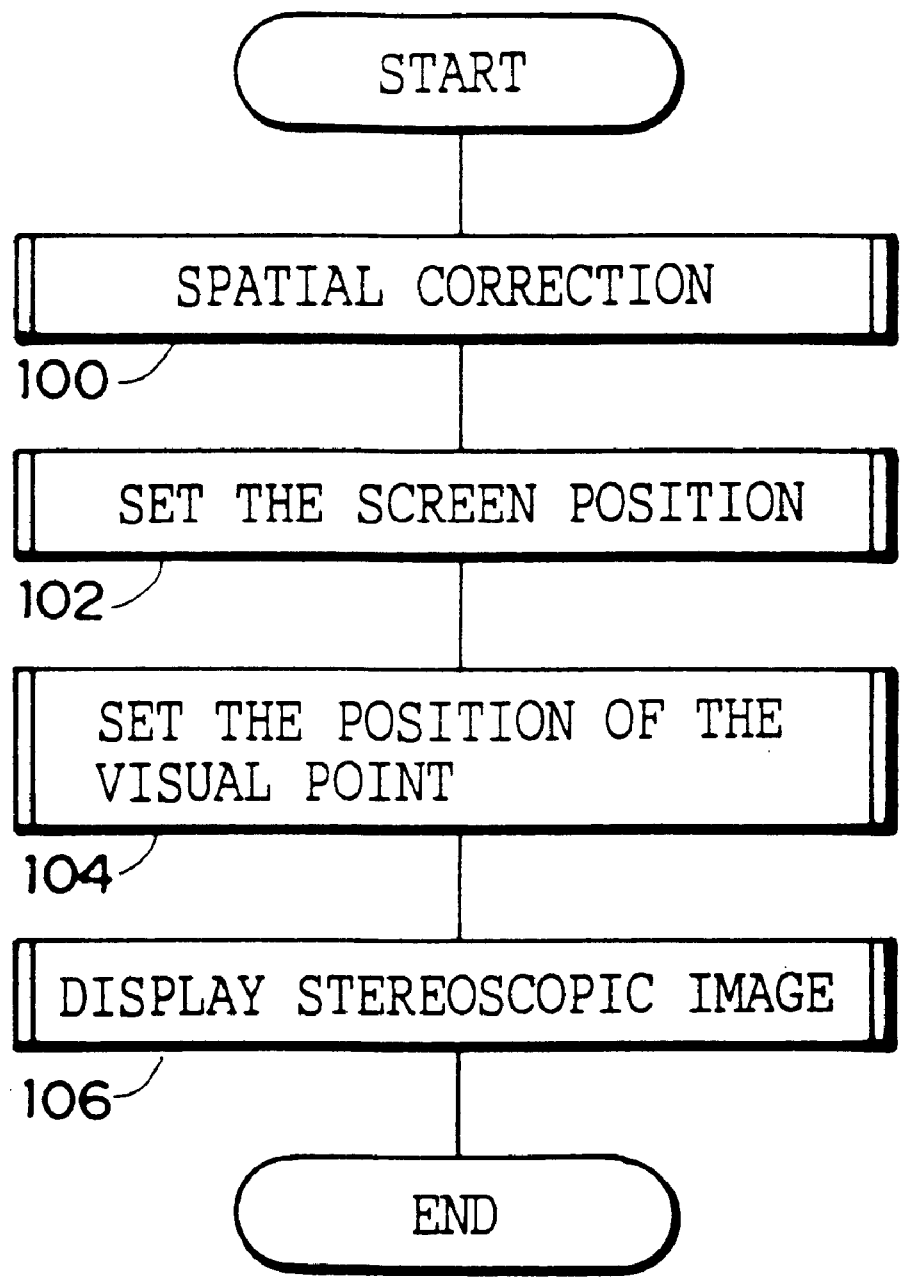

F I G. 8
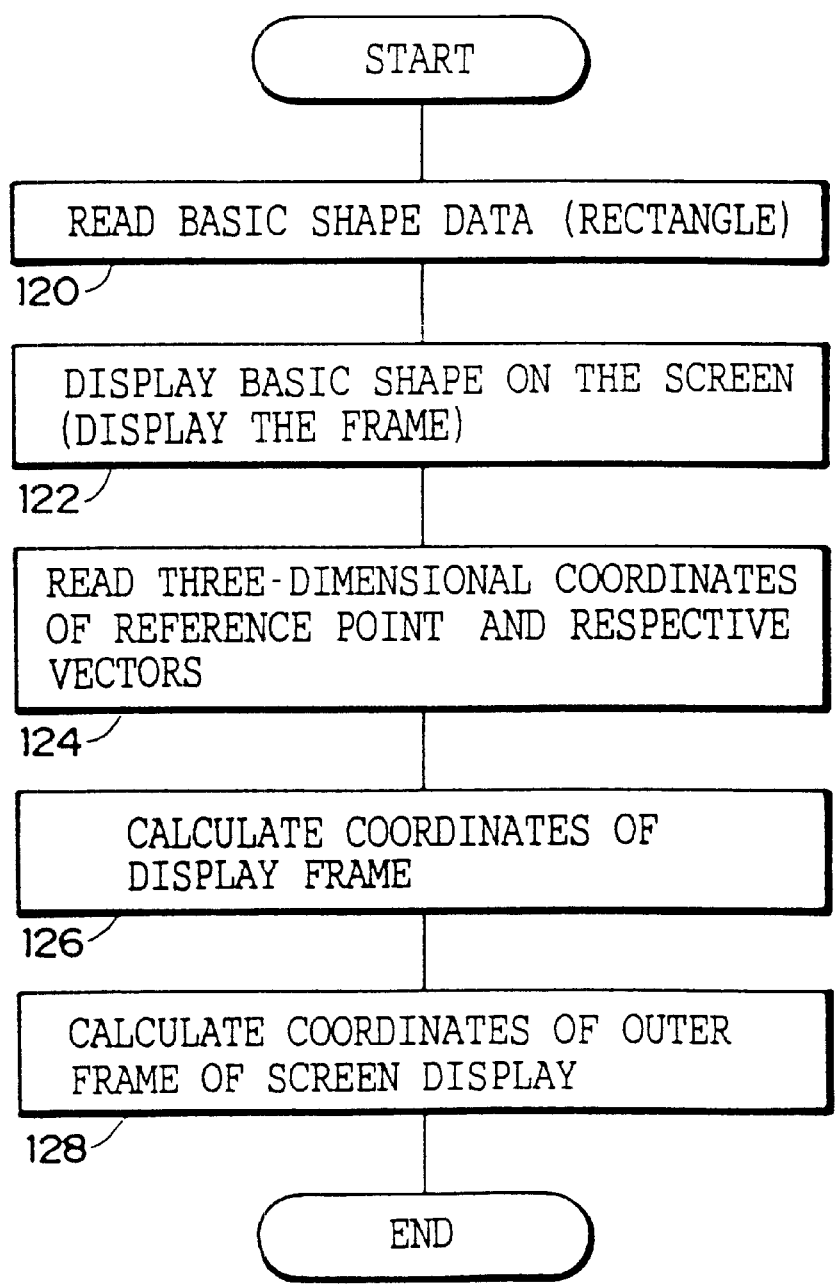

F I G. 1 4
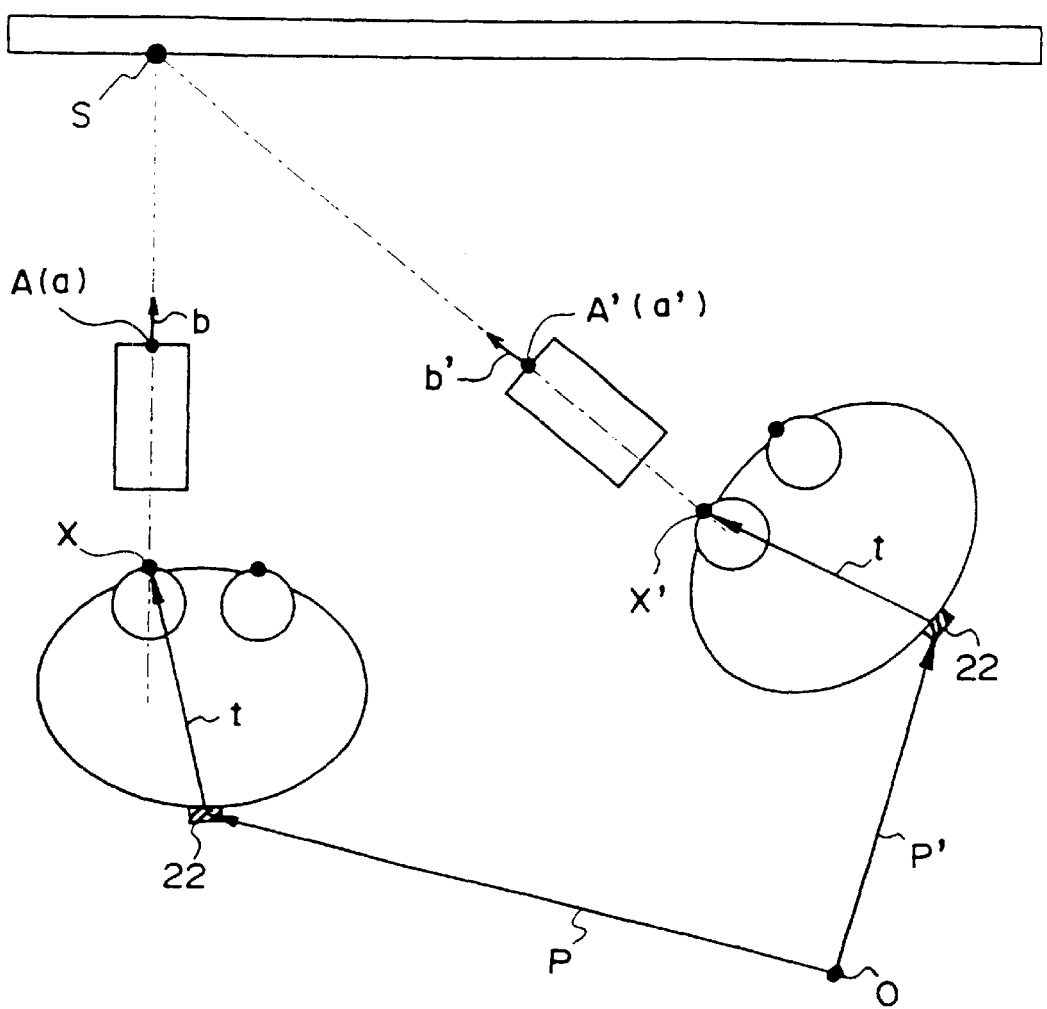

F I G. 1 6
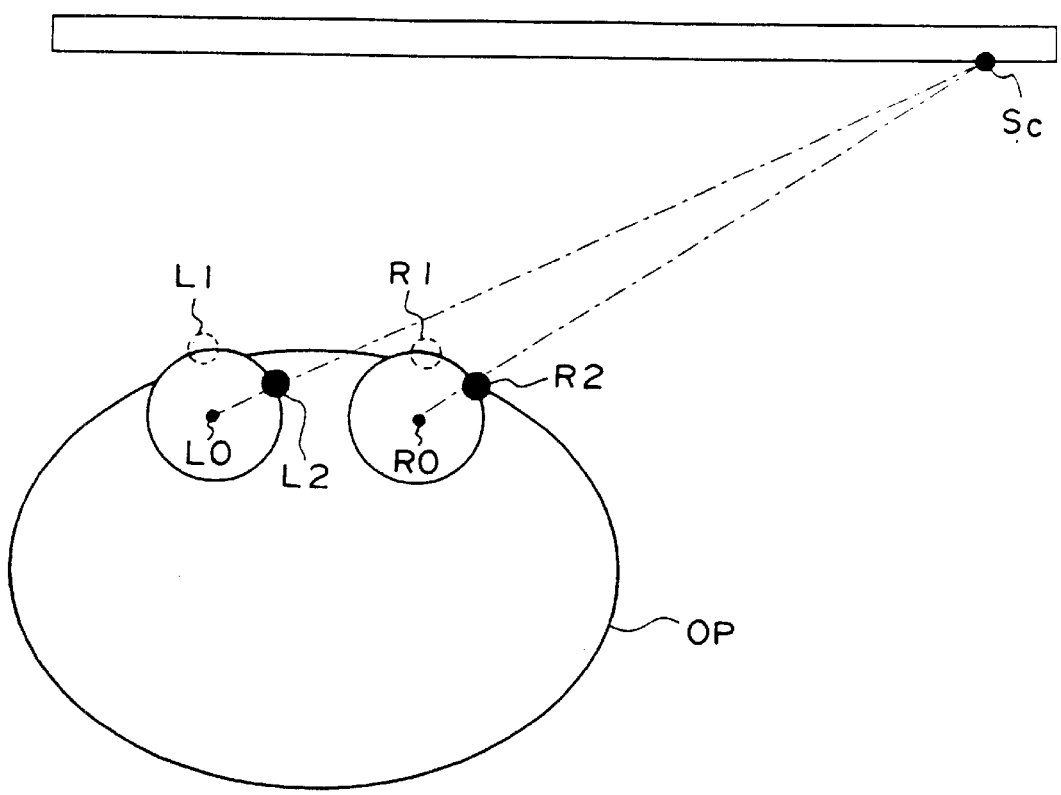

F I G. 1 8
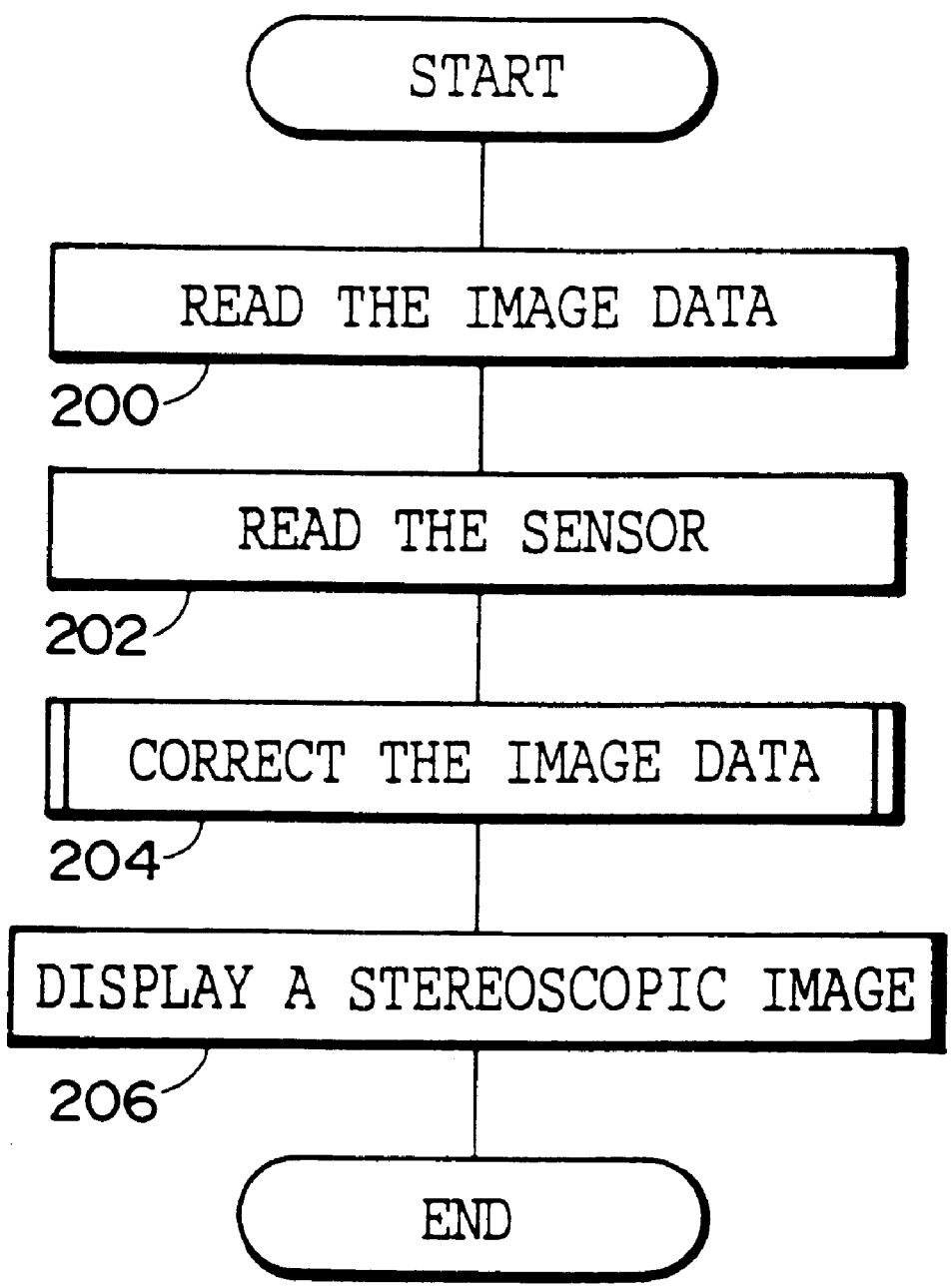

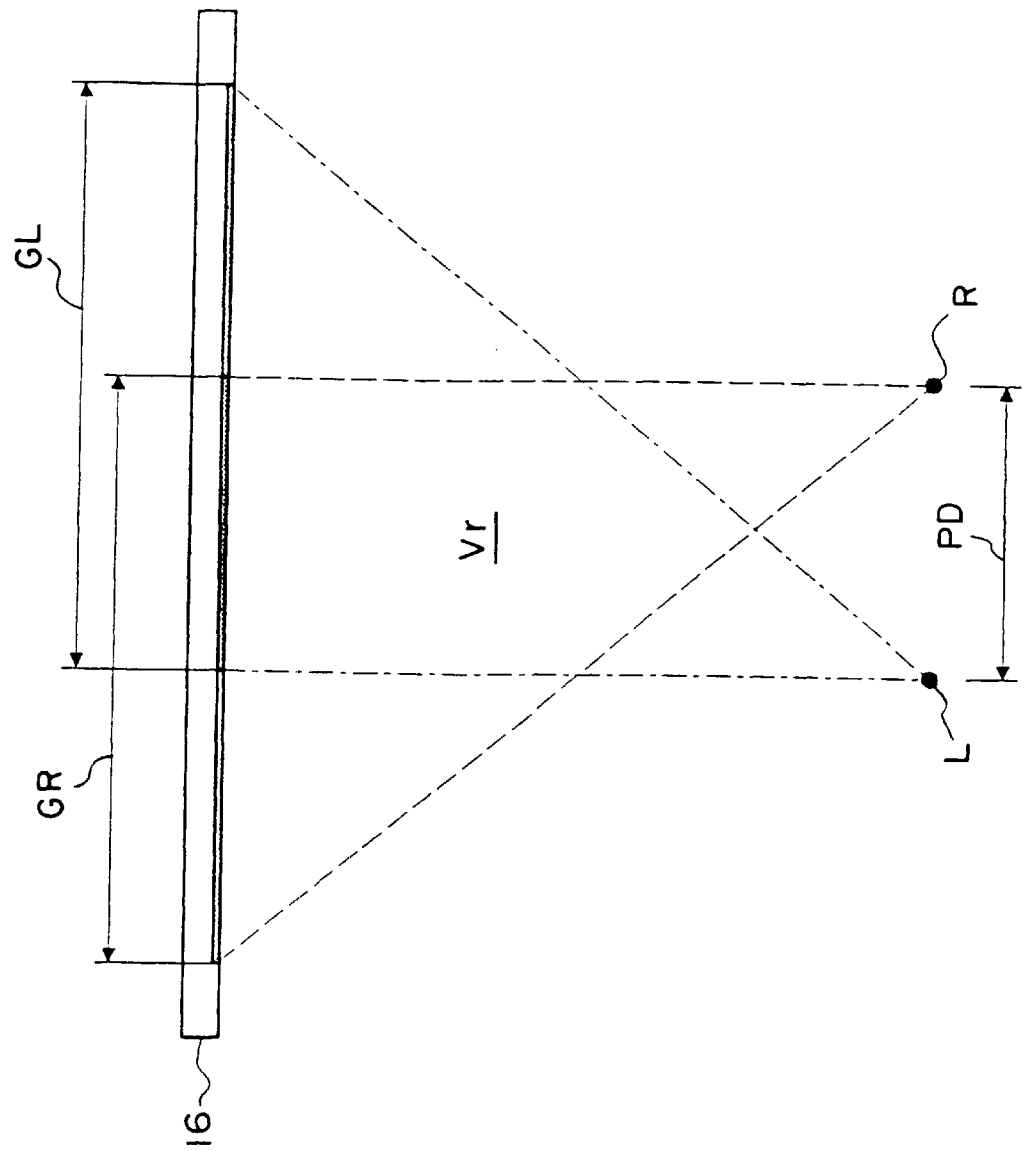

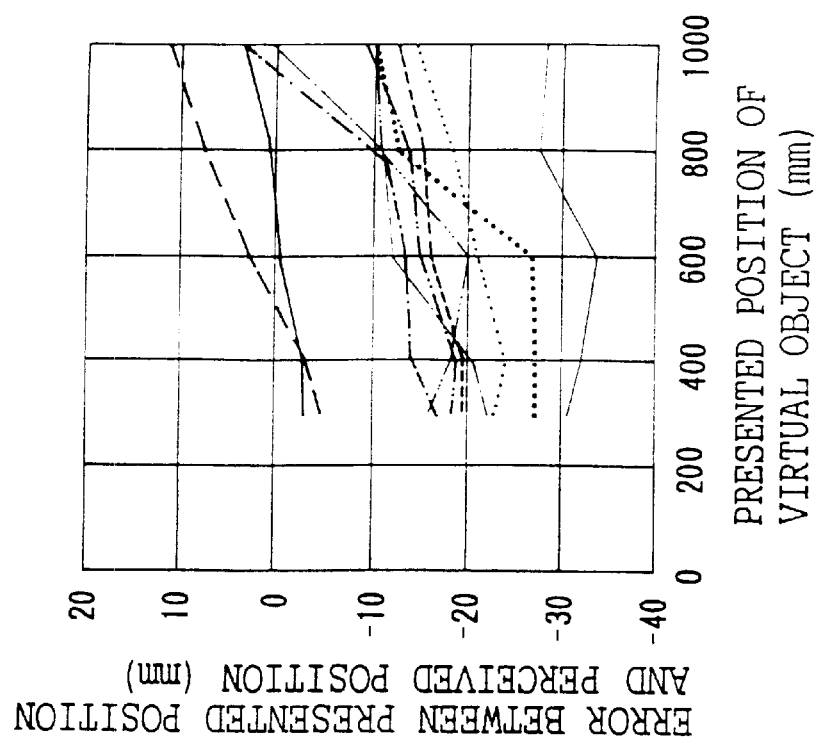
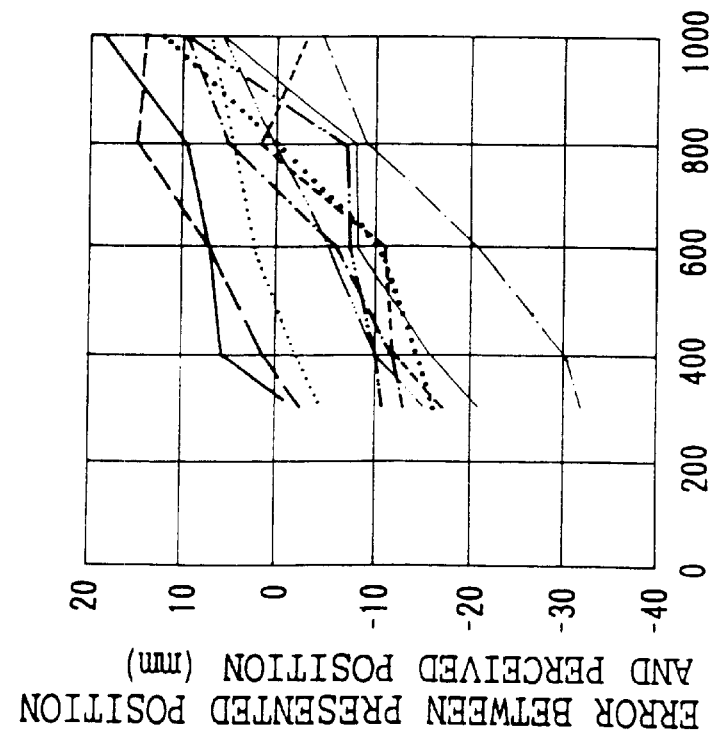
FIG. 20A
FIG. 20B

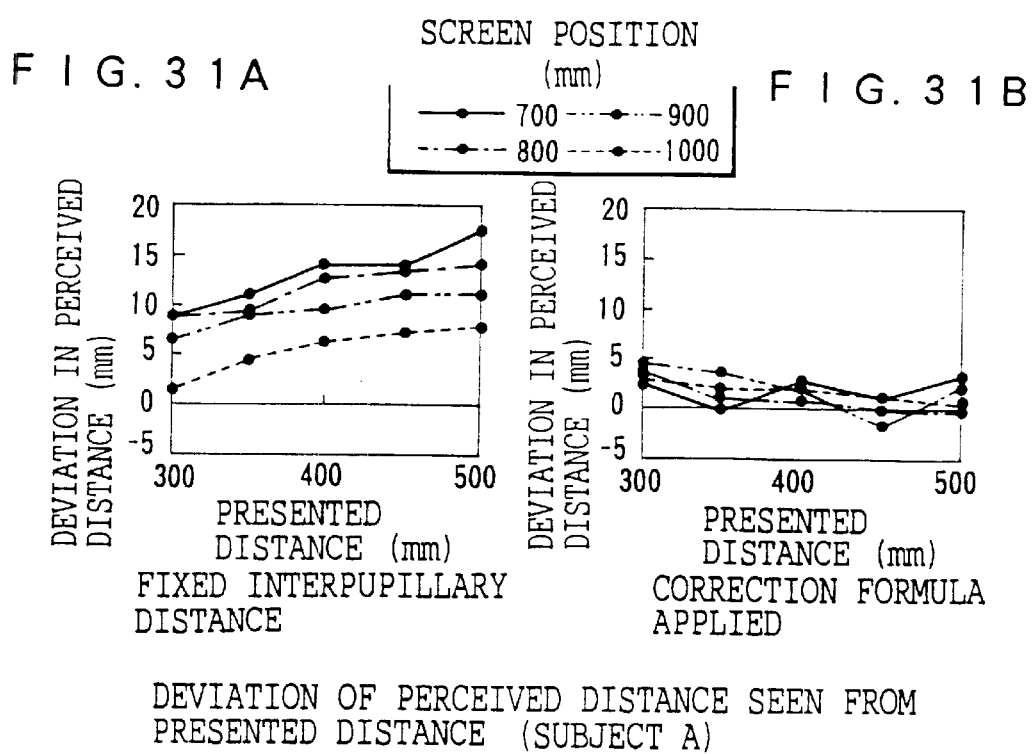
DEVIATION OF PERCEIVED DISTANCE SEEN FROM PRESENTED DISTANCE (SUBJECT A)
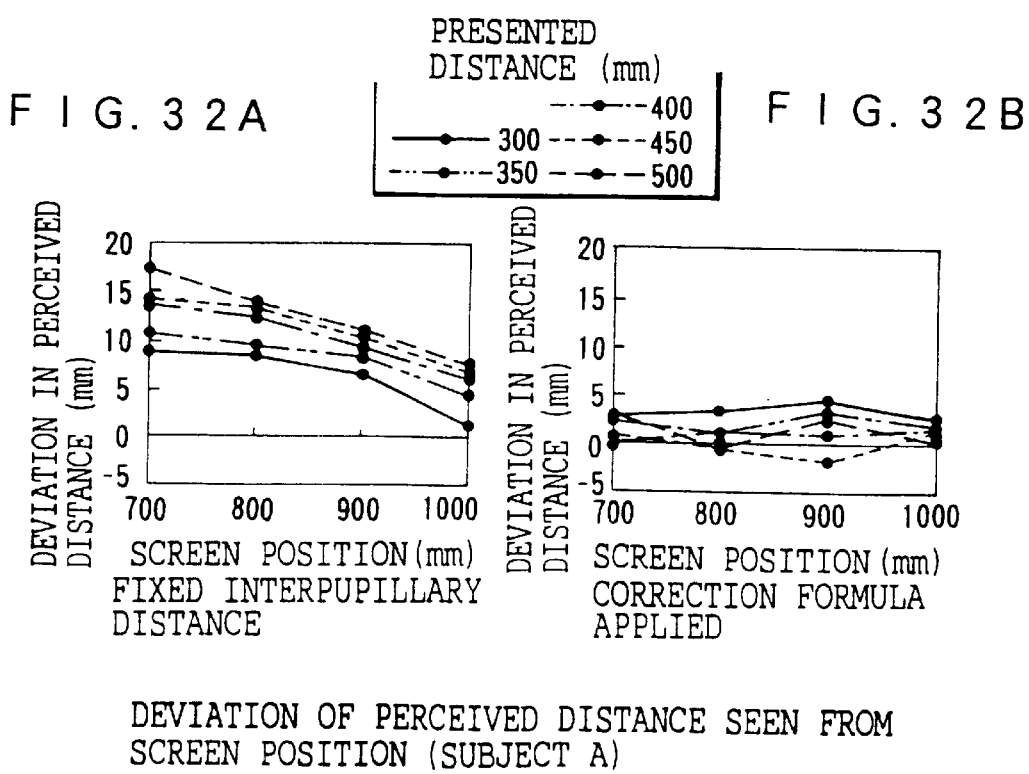
DEVIATION OF PERCEIVED DISTANCE SEEN FROM SCREEN POSITION (SUBJECT A)

F I G. 3 7
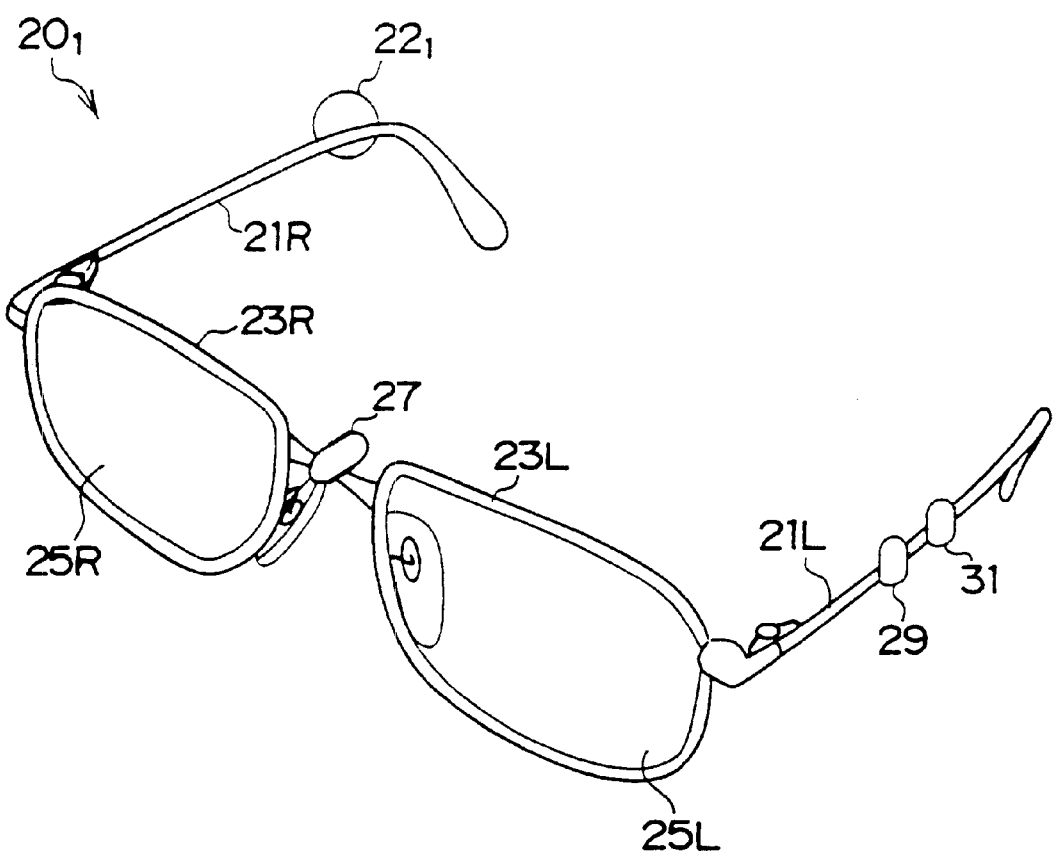

F I G. 44A
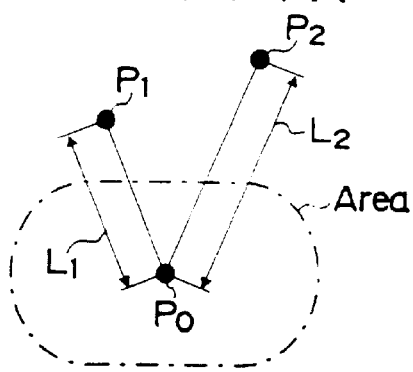
F I G. 44B
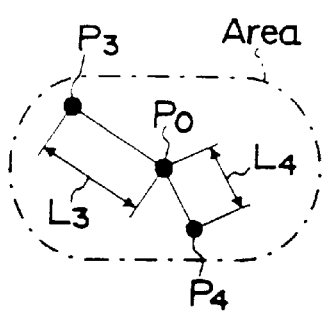
F I G. 44C
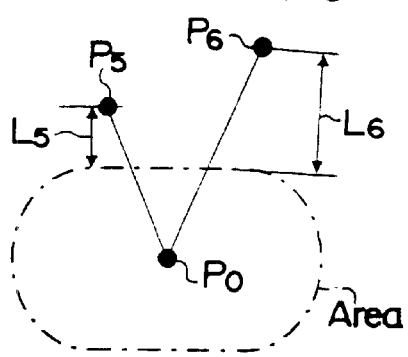
F I G. 44D
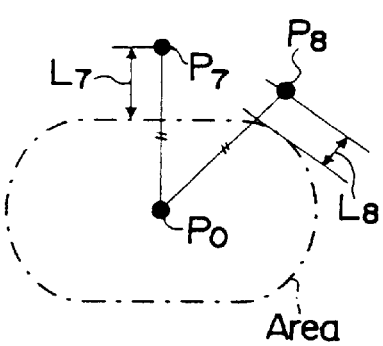
F I G. 44E
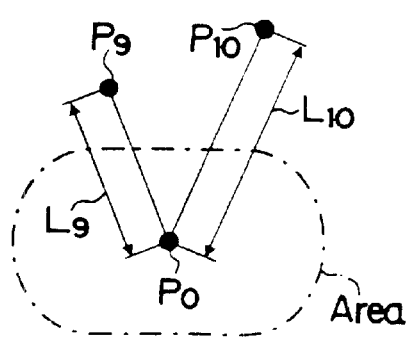
F I G. 44F
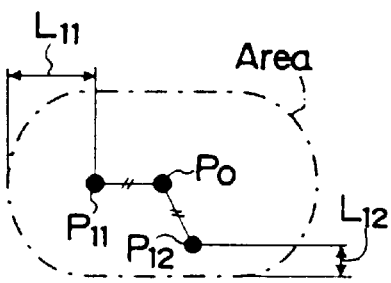

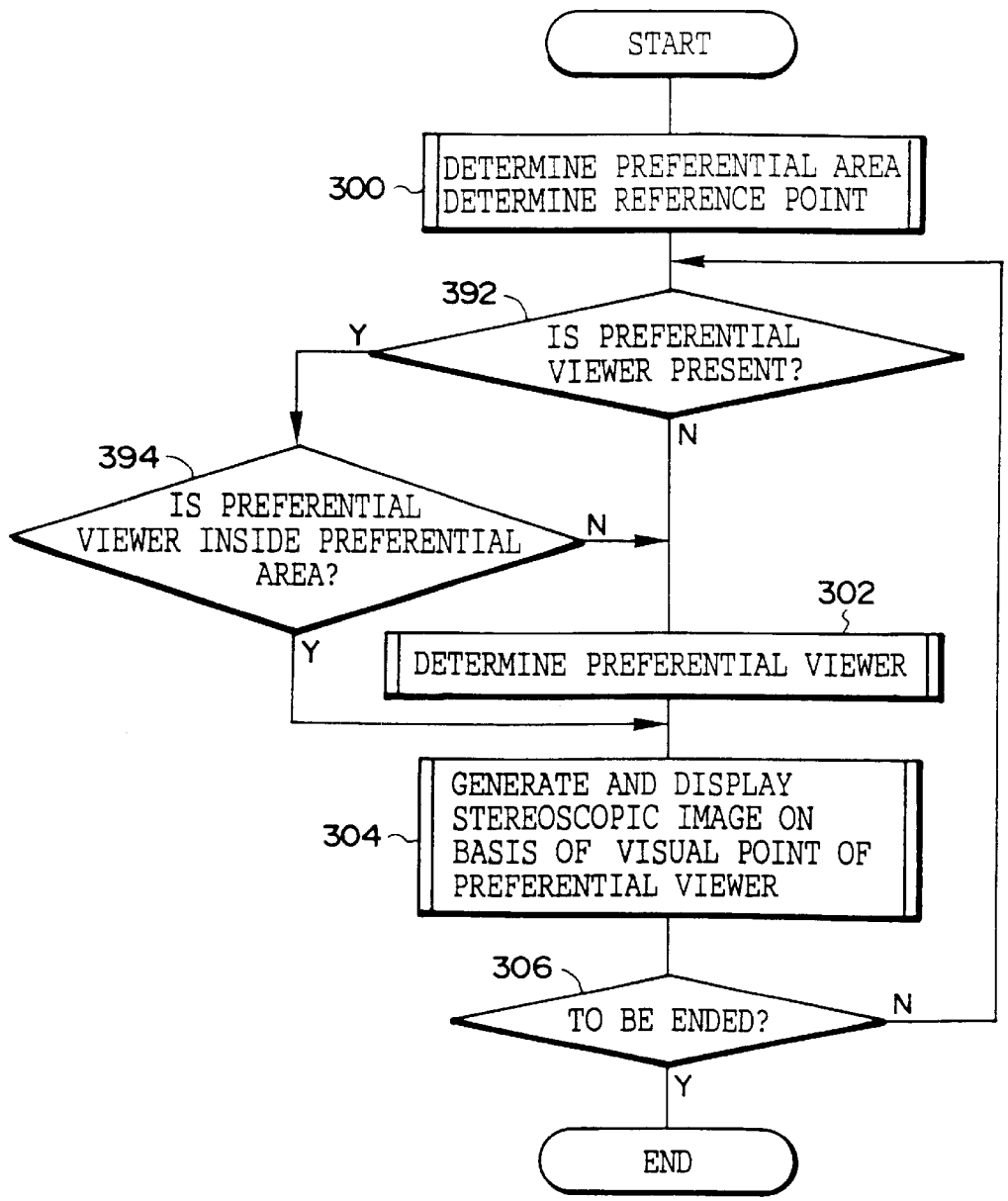

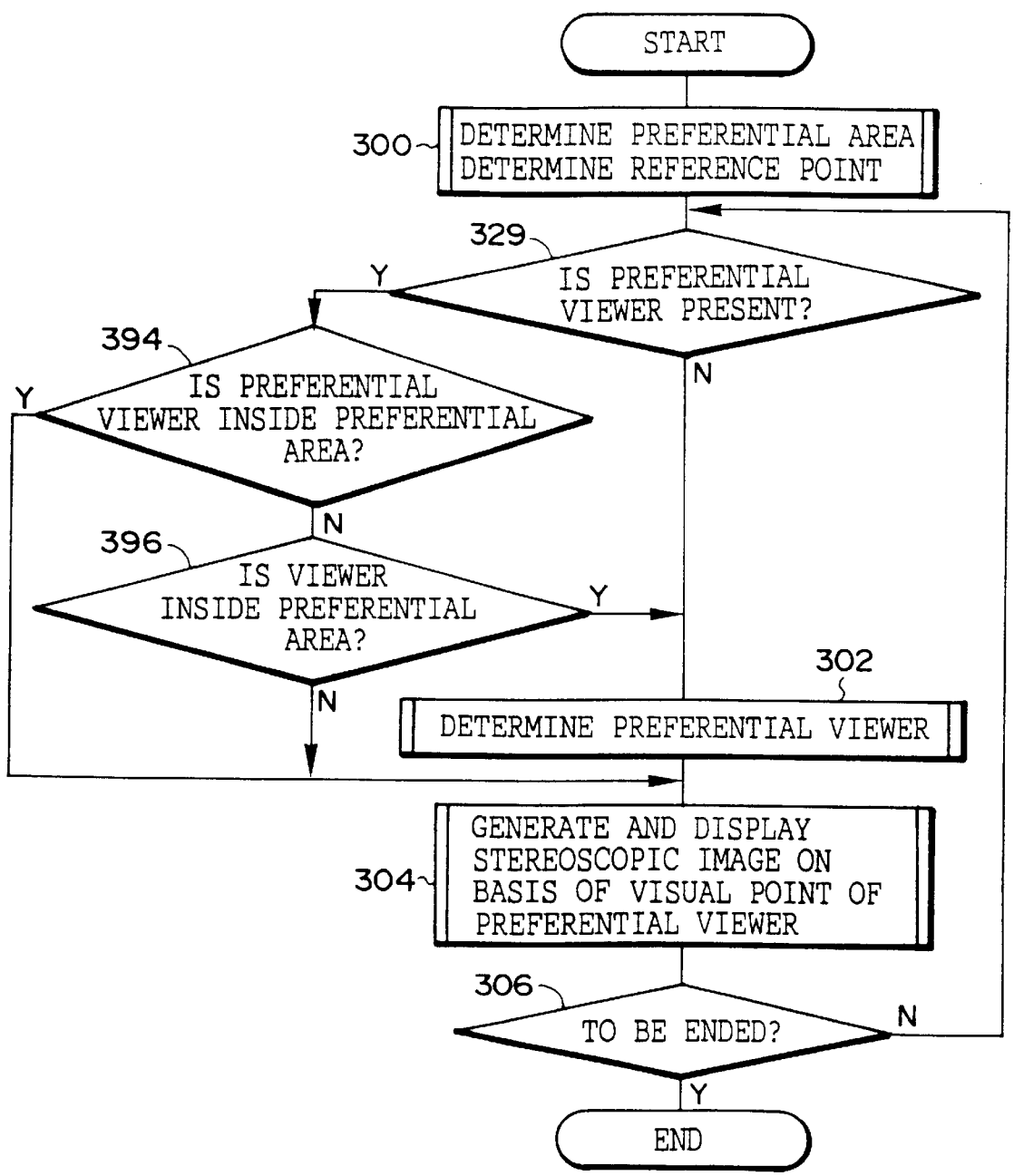

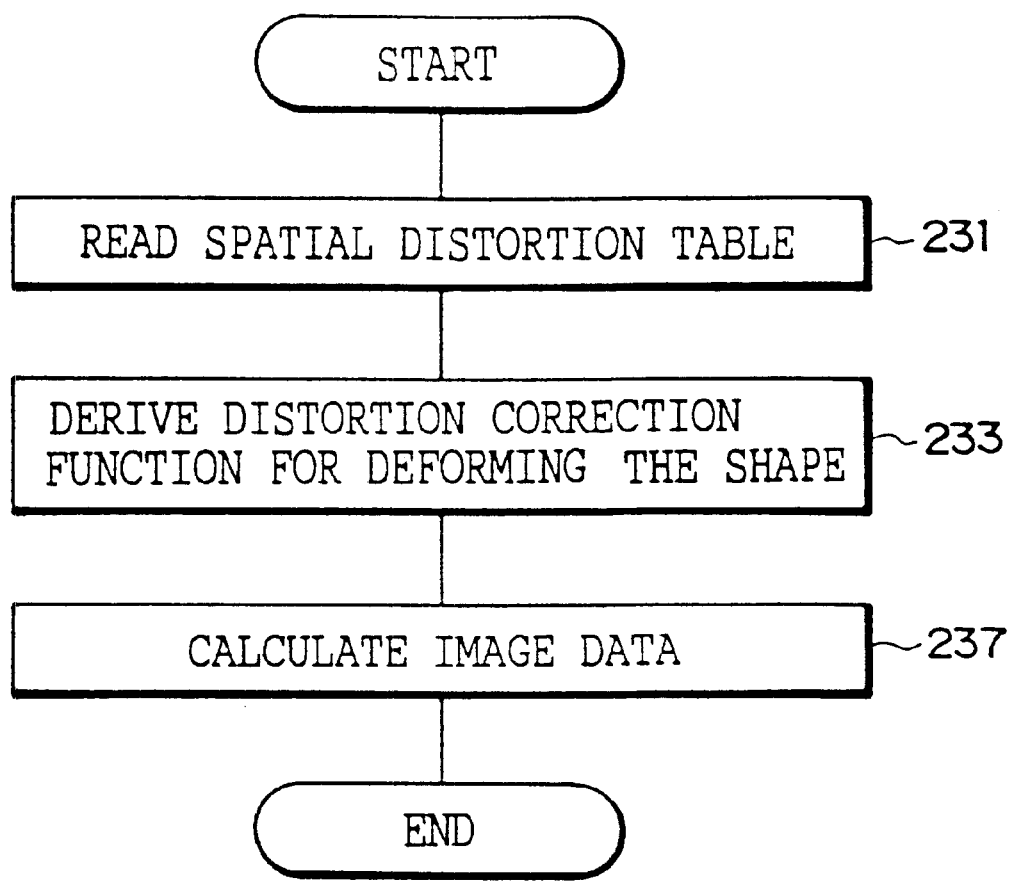
F I G. 4 9

STEREOSCOPIC IMAGE DISPLAY APPARATUS, METHOD OF DISPLAYING STEREOSCOPIC IMAGE, AND RECORDING MEDIUM

BACKGROUND OF THE INVENTION

1. Field of the Invention

The present invention relates to a stereoscopic image display apparatus, a method of displaying a stereoscopic image, and a recording medium, and more particularly to a stereoscopic image display apparatus, a method of displaying a stereoscopic image, and a recording medium for displaying a virtual object in a virtual stereoscopic space.

2. Description of the Related Art

In a case where the shape of a vehicle body, a component part, or the like is designed and evaluated, it has been the conventional practice to fabricate a member based on design values (a real object having the same values as the design values) and repeatedly effect processing including the evaluation, examination, and redesign thereof. However, it requires a huge amount of time to fabricate a member and repeat the examination and redesign. For this reason, there has been a demand for an apparatus which permits evaluation and examination without fabricating a member which is a real object.

As such an apparatus, attention has been focused on an apparatus which makes it possible to effect examination and obtain information for redesign by reproducing an image of a real object through a stereoscopic image of computer graphics (CG) in which a virtual object corresponding to the real object to be formed in accordance with design values is displayed in a virtual space. That is, in recent years, computer design using CAD is effected starting with the design stage, and data for a stereoscopic image is generated by using this CAD data, thereby making it possible to display the stereoscopic image. As one example, a stereoscopic display apparatus is known in which a three-dimensional space is generated by using stereoscopic eyeglasses, and a virtual object in that virtual space is operated to improve the operability of CAD (refer to Japanese Patent Application Laid-Open (JP-A) No. 6-131442).

However, faithful reproduction, i.e., display, of design values is required to effect evaluation, examination, and the like without fabricating a member which is a real object. For this reason, a stereoscopic image must be displayed with the same size as that of a real object or on the basis of a fixed scale set in advance. With conventional stereoscopic display apparatuses, sufficient examination has not been made concerning displaying accuracy, so that the conventional stereoscopic display apparatuses cannot display a stereoscopic image with the same size as that of a real object or on the basis of a fixed scale set in advance.

In addition, although there are variations among individual operators in the perception (perceptual information) of a virtual object in a virtual three-dimensional space, sufficient examination has not been made in this respect with the conventional stereoscopic display apparatuses, so that stereoscopic display with high accuracy has been impossible.

Further, although the conventional stereoscopic display apparatuses are able to display a virtual object similar to a real object in a virtual space, it has been possible only for a single operator to view the virtual object. For this reason, it has been difficult for a plurality of operators (viewers) to view the virtual object which is stereoscopically displayed.

SUMMARY OF THE INVENTION

In view of the above-described circumstances, it is an object of the present invention to provide a stereoscopic image display apparatus, a method of displaying a stereoscopic image, and a recording medium which are capable of displaying a virtual object which is faithfully reproduced in a virtual stereoscopic space.

Another object of the present invention is to provide a stereoscopic image display apparatus, a method of displaying a stereoscopic image, and a recording medium which allow a plurality of operators to perceive the virtual object reproduced in a virtual stereoscopic space.

To attain the above objects, in accordance with a first aspect of the present invention, there is provided a stereoscopic image display apparatus comprising: display means having a display area for displaying an image; a pair of stereoscopic eyeglasses disposed at a position spaced apart from the display means and having an optical element for a left eye and an optical element for a right eye whose states of transmission and nontransmission of light can be mutually changed over on the basis of signals inputted respectively thereto; visual-point position input means for inputting positions of a pair of eyeballs located in vicinities of the stereoscopic eyeglasses; display-position input means for inputting positions on the display area of the display means; and controlling means for defining as a virtual stereoscopic space a space included between the display means and the stereoscopic eyeglasses on the basis of the inputted positions of the eyeballs and the inputted positions on the display area, for causing an image for the left eye of a virtual object and an image for the right eye of the virtual object to be displayed by the display means by being mutually changed over so as to allow the virtual object to be perceived in the virtual stereoscopic space, and for outputting changeover signals to cause the optical element for the left eye and the optical element for the right eye to repeat the transmission and nontransmission of the light alternately in synchronism with the changeover.

In accordance with a second aspect of the present invention, in the stereoscopic image display apparatus according to the first aspect of the invention, the display means is formed by including a reflecting member for reflecting part of the light, and the visual-point position input means inputs positions of visual points on the basis of the input of the positions on the display means onto which the pair of eyeballs located in the vicinities of the stereoscopic eyeglasses are projected.

In accordance with a third aspect of the present invention, in the stereoscopic image display apparatus according to the first aspect of the invention, the visual-point position input means is provided with a position input portion for inputting an operator's own position and a sighting portion for forming a reference visual axis with respect to the position input portion, and the visual-point position input means inputs the position of the visual point on the basis of the inputted operator's own position and the reference visual axis.

In accordance with a fourth aspect of the present invention, in the stereoscopic image display apparatus according to the second aspect of the invention, the visual-point position input means is provided with a detecting portion for detecting the rotation of the eyeball located in the vicinity of the stereoscopic eyeglasses, and the visual-point position input means inputs the position of the visual point on the basis of the detected rotation of the eyeball.

In accordance with a fifth aspect of the present invention, in the stereoscopic image display apparatus according to the second aspect of the invention, the visual-point position input means is provided with a detecting means for detecting the rotation of the eyeball from a fixation position on the display means, and the visual-point position input means inputs the position of the visual point on the basis of the detected rotation of the eyeball.

In accordance with a sixth aspect of the present invention, in the stereoscopic image display apparatus according to the first aspect of the invention, the display-position input means is provided with a position input portion for inputting the operator's own position and a light emitting portion for forming a reference optical axis with respect to the position input portion, and the display-position input means inputs the position on the display area on the basis of the inputted operator's own position and the reference optical axis with respect to a reference figure displayed on the display area.

In accordance with a seventh aspect of the present invention, the stereoscopic image display apparatus according to the first aspect of the invention further comprises: correcting means for determining in advance a relationship of correspondence between a perceived position in the virtual stereoscopic space and at least one of the position inputted by the visual-point positions input means and the position inputted by the display-position input means, and for correcting coordinates in the virtual stereoscopic space for displaying the virtual object on the basis of the relationship of correspondence.

In accordance with an eighth aspect of the present invention, in the stereoscopic image display apparatus according to the seventh aspect of the invention, the correcting means calculates the image for the left eye of the virtual object and the image for the right eye of the virtual object on the basis of the relationship of correspondence.

In accordance with a ninth aspect of the present invention, in the stereoscopic image display apparatus according to the seventh aspect of the invention, the correcting means determines the relationship of correspondence on the basis of an error between a position of the virtual object displayed in the virtual stereoscopic space and measured in advance and a measurement position used in the measurement of the perceived position of the virtual object.

In accordance with a 10th aspect of the present invention, there is provided a method of displaying a stereoscopic image for displaying a stereoscopic image by a programmed computer, comprising the steps of: inputting positions of a pair of eyeballs located in vicinities of a pair of stereoscopic eyeglasses having an optical element for a left eye and an optical element for a right eye whose states of transmission and nontransmission of light can be mutually changed over on the basis of signals inputted respectively thereto; inputting positions on a display area of display means having the display area for displaying an image; and defining as a virtual stereoscopic space a space included between the display means and the stereoscopic eyeglasses on the basis of the positions of the eyeballs and the positions on the display area, effecting a changeover between an image for the left eye of a virtual object and an image for the right eye of the virtual object so as to allow the virtual object to be perceived in the virtual stereoscopic space, and causing the states of transmission and nontransmission of light of the optical element for the left eye and the optical element for the right eye to be mutually changed over alternately in synchronism with the changeover.

In accordance with an 11th aspect of the present invention, there is provided a recording medium in which a stereoscopic-image display program is recorded for displaying a stereoscopic image by a computer by: inputting positions of a pair of eyeballs located in vicinities of a pair of stereoscopic eyeglasses having an optical element for a left eye and an optical element for a right eye whose states of transmission and nontransmission of light can be mutually changed over on the basis of signals inputted respectively thereto; inputting positions on a display area of display means having the display area for displaying an image; and defining as a virtual stereoscopic space a space included between the display means and the stereoscopic eyeglasses on the basis of the positions of the eyeballs and the positions on the display area, effecting a changeover between an image for the left eye of a virtual object and an image for the right eye of the virtual object so as to allow the virtual object to be perceived in the virtual stereoscopic space, and causing the states of transmission and nontransmission of light of the optical element for the left eye and the optical element for the right eye to be mutually changed over alternately in synchronism with the changeover.

In accordance with a 12th aspect of the present invention, there is provided a stereoscopic image display apparatus comprising: display means for displaying an image; a plurality of pairs of stereoscopic eyeglasses disposed at positions spaced apart from the display means, each of the plurality of pairs of stereoscopic eyeglasses having notifying means for notifying an operator's own position as well as an optical element for a left eye and an optical element for a right eye whose states of transmission and nontransmission of light can be mutually changed over on the basis of signals inputted respectively thereto; selecting means for selecting stereoscopic eyeglasses subject to perception from among the plurality of pairs of stereoscopic eyeglasses; display-position input means for inputting positions on the display means; and controlling means for defining as a virtual stereoscopic space a space included between the display means and the stereoscopic eyeglasses on the basis of the positions on the display means and a reference position spaced apart from the display means and set in advance, for causing an image for the left eye of a virtual object and an image for the right eye of the virtual object to be displayed by the display means by being mutually changed over so as to allow the virtual object to be perceived in the virtual stereoscopic space, and for outputting changeover signals to cause the optical element for the left eye and the optical element for the right eye of the stereoscopic eyeglasses subject to perception to repeat the transmission and non-transmission of the light alternately in synchronism with the changeover.

In accordance with a 13th aspect of the present invention, in the stereoscopic image display apparatus according to the 12th aspect of the invention, the reference position is set on the basis of the operator's own position notified by the notifying means of one of the plurality of pairs of stereoscopic eyeglasses.

In accordance with a 14th aspect of the present invention, in the stereoscopic image display apparatus according to the 12th aspect of the invention, the reference position is one of a position of a visual point set in advance and the position of the visual point which is set on the basis of the position notified by the notifying means of one of the plurality of pairs of stereoscopic eyeglasses.

In accordance with a 15th aspect of the present invention, in the stereoscopic image display apparatus according to the 12th aspect of the invention, the selecting means selects the stereoscopic eyeglasses whose distance to the reference position is shortest.

In accordance with a 16th aspect of the present invention, in the stereoscopic image display apparatus according to the 12th aspect of the invention, the selecting means has area-setting means for setting a presence area where the stereoscopic eyeglasses are estimated to be present on the basis of the reference position, and the selecting means selects the stereoscopic eyeglasses subject to perception on the basis of the presence area and a plurality of positions notified by the notifying means.

In accordance with a 17th aspect of the present invention, in the stereoscopic image display apparatus according to the 12th aspect of the invention, the optical element for the left eye and the optical element for the right eye of the stereoscopic eyeglasses are liquid-crystal shutters.

In accordance with an 18th aspect of the present invention, there is provided a method of displaying a stereoscopic image for displaying a stereoscopic image by a programmed computer, comprising the steps of: inputting positions on a display area of display means having the display area for displaying an image; selecting a pair of stereoscopic eyeglasses subject to perception from among a plurality of pairs of stereoscopic eyeglasses, each of the plurality of pairs of stereoscopic eyeglasses having an optical element for a left eye and an optical element for a right eye whose states of transmission and nontransmission of light can be mutually changed over on the basis of signals inputted respectively thereto; and defining as a virtual stereoscopic space a space included between the display means and the stereoscopic eyeglasses on the basis of the positions on the display means and a reference position spaced apart from the display means and set in advance, causing an image for the left eye of a virtual object and an image for the right eye of the virtual object to be displayed by the display means by being mutually changed over so as to allow the virtual object to be perceived in the virtual stereoscopic space, and causing the states of transmission and nontransmission of light of the optical element for the left eye and the optical element for the right eye of the stereoscopic eyeglasses subject to perception to be mutually changed over alternately in synchronism with the changeover.

In accordance with a 19th aspect of the present invention, there is provided a recording medium in which a stereoscopic-image display program is recorded for displaying a stereoscopic image by a computer by: inputting positions on a display area of display means having the display area for displaying an image; selecting a pair of stereoscopic eyeglasses subject to perception from among a plurality of pairs of stereoscopic eyeglasses, each of the plurality of pairs of stereoscopic eyeglasses having an optical element for a left eye and an optical element for a right eye whose states of transmission and nontransmission of light can be mutually changed over on the basis of signals inputted respectively thereto; and defining as a virtual stereoscopic space a space included between the display means and the stereoscopic eyeglasses on the basis of the positions on the display means and a reference position spaced apart from the display means and set in advance, causing an image for the left eye of a virtual object and an image for the right eye of the virtual object to be displayed by the display means by being mutually changed over so as to allow the virtual object to be perceived in the virtual stereoscopic space, and causing the states of transmission and nontransmission of light of the optical element for the left eye and the optical element for the right eye of the stereoscopic eyeglasses subject to perception to be mutually changed over alternately in synchronism with the changeover.

In accordance with the above-described first aspect of the present invention, the positions of the pair of eyeballs located in the vicinities of the stereoscopic eyeglasses are inputted by the visual-point position input means. In addition, positions on the display area of the display means are inputted by the display-position input means. As a result, the positions on the display area of the display means and the positions of the eyeballs are made to correspond to each other accurately. The controlling means defines as the virtual stereoscopic space the space included between the display means and the stereoscopic eyeglasses on the basis of the inputted positions of the eyeballs and the inputted positions on the display area. Further, the controlling means causes the image for the left eye of the virtual object and the image for the right eye of the virtual object to be displayed by the display means by being mutually changed over so as to allow the virtual object to be perceived in the virtual stereoscopic space, and outputs changeover signals to cause the optical element for the left eye and the optical element for the right eye to repeat the transmission and nontransmission of the light alternately in synchronism with the changeover. The stereoscopic eyeglasses are provided with the optical element for the left eye and the optical element for the right eye, and their states of the transmission and nontransmission of the light are changed over by signals from the controlling means, thereby allowing the operator to perceive a virtual object displayed in the virtual stereoscopic space and corresponding to a real object.

In accordance with the above-described second aspect of the present invention, the display means is formed by including a reflecting member for reflecting part of the light, the pupils of the operator can be projected onto the display means. Hence, the visual-point position input means is capable of inputting the positions of visual points on the basis of the input of the positions on the display means onto which the pair of eyeballs located in the vicinities of the stereoscopic eyeglasses are projected. That is, the visual axis from the operator's pupil to the pupil projected onto the display means is aligned with a straight line connecting the operator's pupil to the pupil projected onto the display means, so that the input of the position on the displaying means accurately corresponds to the position of the visual point.

In accordance with the above-described third aspect of the present invention, the visual-point position input means is provided with the position input portion for inputting the operator's own position and the sighting portion for forming the reference visual axis with respect to the position input portion, and the visual-point position input means inputs the position of the visual point on the basis of the inputted operator's own position and the reference visual axis. Accordingly, the position on the display means viewed by the operator can be accurately specified, and it is possible to accurately input the operator's own position which indicates the position which can be specified.

In accordance with the above-described fourth aspect of the present invention, the visual-point position input means is provided with the detecting portion for detecting the rotation of the eyeball located in the vicinity of the stereoscopic eyeglasses, and the visual-point position input means inputs the position of the visual point on the basis of the detected rotation of the eyeball. Accordingly, it is possible to detect the movement of the position of the visual point due to the rotary motion of the eyeball, and to accurately input the position of the visual point.

In accordance with the above-described fifth aspect of the present invention, the visual-point position input means is provided with the detecting means for detecting the rotation of the eyeball from a fixation position on the display means, and the visual-point position input means inputs the position of the visual point on the basis of the detected rotation of the eyeball. Accordingly, it is possible to detect the movement of the position of the visual point due to the rotary motion of the eyeball, and to accurately input the position of the visual point.

In accordance with the above-described sixth aspect of the present invention, the display-position input means is provided with the position input portion for inputting the operator's own position and the light emitting portion for forming a reference optical axis with respect to the position input portion, and the display-position input means inputs the position on the display area on the basis of the inputted operator's own position and the reference optical axis with respect to a reference figure displayed on the display area. Accordingly, it is possible to give a designation onto the display means by means of light emitted along the reference optical axis, and to accurately input the operator's own position which is on an extension of a line of the position designated on the display means.

In accordance with the above-described seventh aspect of the present invention, the correcting means is further provided for determining in advance the relationship of correspondence between a perceived position in the virtual stereoscopic space and at least one of the positions inputted by the visual-point position input means and the position inputted by the display-position input means, and for correcting the coordinates in the virtual stereoscopic space for displaying the virtual object on the basis of the relationship of correspondence. Accordingly, since the relationship of correspondence between the position in the virtual stereoscopic space and the position inputted by the visual-point position input means, as well as the relationship of correspondence between the position in the virtual stereoscopic space and the position inputted by the display-position input means, can be determined, the coordinates in the virtual stereoscopic space for displaying the virtual object can be corrected easily, and the virtual object can be displayed accurately.

When the operator views an image, the head of the operator is not always fixed. Therefore, due to the movement of the head of the operator, the relationship between the positions of the eyeballs and the display area moves relatively. In this case, if only the relationship of correspondence between, on the one hand, the perceived position in the virtual stereoscopic space and, on the other hand, at least one predetermined position of the position inputted by the visual-point input means and the position input by the display-position input means, is determined, the display accuracy of the virtual object deteriorates depending on the position of the visual point. For this reason, if the relationship of correspondence is determined by taking into consideration the distance of space between the positions of the eyeballs and the display area, the virtual object can be displayed accurately even if the head of the operator moves or the display device moves.

In accordance with the above-described eighth aspect of the present invention, since the correcting means calculates the image for the left eye of the virtual object and the image for the right eye of the virtual object on the basis of the aforementioned relationship of correspondence, the virtual object can be obtained at a more accurate position as a stereoscopic image.

In accordance with the above-described ninth aspect of the present invention, since the correcting means determines the aforementioned relationship of correspondence on the basis of the error between the position of the virtual object displayed in the virtual stereoscopic space and measured in advance and the measurement position used in the measurement of the perceived position of the virtual object, it is possible to display a virtual object corresponding to the perception characteristic of the operator.

In accordance with above-described 10th aspect of the present invention, processing is executed in accordance with the method of displaying a stereoscopic image for displaying a stereoscopic image by a programmed computer. Namely, the positions of the pair of eyeballs are inputted which are located in the vicinities of the pair of stereoscopic eyeglasses having the optical element for the left eye and the optical element for the right eye whose states of transmission and nontransmission of light can be mutually changed over on the basis of signals inputted respectively thereto. Positions on the display area of display means having the display area for displaying an image are inputted. Further, the space included between the display means and the stereoscopic eyeglasses is defined as a virtual stereoscopic space on the basis of the positions of the eyeballs and the positions on the display area; a changeover is effected between the image for the left eye of the virtual object and the image for the right eye of the virtual object so as to allow the virtual object to be perceived in the virtual stereoscopic space; and the states of transmission and nontransmission of light of the optical element for the left eye and the optical element for the right eye are mutually changed over alternately in synchronism with the changeover.

In addition, since the distance of space between the positions of the eyeballs and the display area can change during display, in such a case, it suffices if, as stated in the seventh aspect of the invention, the relationship of correspondence is determined in advance between the perceived position in the virtual stereoscopic space and at least one of the position of the eyeball and the position on the display area, and if the coordinates in the virtual stereoscopic space for displaying the virtual object are corrected on the basis of the relationship of correspondence.

In accordance with the above-described 11th aspect of the present invention, the above-described processing which is executed can be stored in a recording medium in which a stereoscopic-image display program is recorded for displaying a stereoscopic image by a computer. In this recording medium, a stereoscopic-image display program is recorded for displaying a stereoscopic image by a computer by: inputting positions of the pair of eyeballs located in the vicinities of the pair of stereoscopic eyeglasses having the optical element for the left eye and the optical element for the right eye whose states of transmission and nontransmission of light can be mutually changed over on the basis of signals inputted respectively thereto; inputting positions on the display area of display means having the display area for displaying an image; and defining as the virtual stereoscopic space the space included between the display means and the stereoscopic eyeglasses on the basis of the positions of the eyeballs and the positions on the display area, effecting a changeover between the image for the left eye of the virtual object and the image for the right eye of the virtual object so as to allow the virtual object to be perceived in the virtual stereoscopic space, and causing the states of transmission and nontransmission of light of the optical element for the left eye and the optical element for the right eye to be mutually changed over alternately in synchronism with the changeover.

In accordance with the above-described 12th aspect of the present invention, a pair of stereoscopic eyeglasses subject to perception is selected from among the plurality of pairs of stereoscopic eyeglasses. The controlling means defines as the virtual stereoscopic space the space included between the display means and the selected stereoscopic eyeglasses on the basis of the reference position set in advance and the positions on the display means inputted by the display-position input means. At the same time, the controlling means causes the image for the left eye of the virtual object and the image for the right eye of the virtual object to be displayed by the display means by being mutually changed over so as to allow the virtual object to be perceived in the virtual stereoscopic space, and outputs changeover signals to cause the optical element for the left eye and the optical element for the right eye of the stereoscopic eyeglasses subject to perception to repeat the transmission and non-transmission of the light alternately in synchronism with the changeover. The stereoscopic eyeglasses are provided with the optical element for the left eye and the optical element for the right eye. As the states of transmission and nontransmission of light of these optical elements are changed over in response to signals from the controlling means, a virtual object displayed in the virtual stereoscopic space and corresponding to a real object can be perceived by the operator wearing the stereoscopic eyeglasses selected as the subject for perception from among the plurality of stereoscopic eyeglasses.

Accordingly, since the virtual object can be perceived by selecting the stereoscopic eyeglasses subject to perception from among the plurality of stereoscopic eyeglasses, the virtual object can be presented to the operator having the stereoscopic eyeglasses selected among the plurality of operators. In addition, the virtual object can be presented to the plurality of operators by consecutively selecting the stereoscopic eyeglasses subject to perception with respect to the plurality of stereoscopic eyeglasses.

For example, in a case where a virtual stereoscopic space is presented with respect to an object viewed from the interior of the vehicle, and a virtual object is to be perceived, an arbitrary position in the inner space of the vehicle, e.g, a driver seat, can be set as the aforementioned reference position. In addition, since a plurality of occupants are capable of being seated inside the vehicle, by setting the seated positions of the respective occupants as the reference positions, the virtual object can be presented to the respective occupants. Therefore, as stated in the 13th aspect of the present invention, the reference position can be set on the basis of the operator's own position notified by the notifying means of one of the plurality of pairs of stereoscopic eyeglasses. Thus, by setting the reference position on the basis of the position notified by the notifying means, it is possible to present an optimum virtual object to the operator wearing the stereoscopic eyeglasses.

In addition, in the case where a virtual stereoscopic space is presented with respect to an object viewed from the interior of the vehicle, and a virtual object is to be perceived, the perception takes place at the position of the visual point, so that the aforementioned reference position can be the position of the visual point of the driver seated in the driver seat. Further, by setting the respective seated positions of a plurality of occupants in the vehicle or their positions of visual points as the reference positions, it is possible to present the virtual object to the respective occupants. Accordingly, as stated in the 14th aspect of the present invention, if the reference position is one of the position of the visual point set in advance and the position of the visual point which is set on the basis of the position notified by the notifying means of one of the plurality of pairs of stereoscopic eyeglasses, the virtual object can be displayed by accurately fixing the virtual object in the virtual stereoscopic space relative to the position where the operator subject to perception views.

In the case where the selecting means selects the stereoscopic eyeglasses subject to perception from among the plurality of stereoscopic eyeglasses, the subject stereoscopic eyeglasses may be selected by being set by input means for designating one of the plurality of pairs of stereoscopic eyeglasses. In addition, the stereoscopic eyeglasses subject to perception may be automatically selected from among the plurality of stereoscopic eyeglasses. That is, as stated in the 15th aspect of the present invention, if the selecting means selects the stereoscopic eyeglasses whose distance to the reference position is shortest, even if a plurality of operators wearing the stereoscopic eyeglasses are present in the vicinities of the reference position, the stereoscopic eyeglasses with the shortest distance is selected from among them, so that the virtual object can be displayed simply and accurately to the operator subject to perception.

In addition, as stated in the 16th aspect of the present invention, the selecting means may have the area-setting means for setting the presence area where the stereoscopic eyeglasses are estimated to be present on the basis of the reference position. The area-setting means sets the presence area within a predetermined range from the reference position, e.g., a presence area having a shape (a circle, an ellipsis, etc.) which is defined by a 1 m radius. Since it is estimated that operators wearing the stereoscopic eyeglasses are present in this presence area, the stereoscopic eyeglasses subject to perception can be selected on the basis of the presence area and a plurality of positions notified by the notifying means. In the selection on the basis of the presence area and the positions notified by the notifying means, the pair of stereoscopic eyeglasses with the shortest distance to the reference point is selected when pairs of stereoscopic eyeglasses are present inside the presence area, or the stereoscopic eyeglasses whose dependence on the presence area is high, e.g., the stereoscopic eyeglasses whose distance to outside the presence area is longest is selected. Alternatively, it suffices if the stereoscopic eyeglasses with the shortest distance to the presence area is selected when no stereoscopic eyeglasses are present inside the presence area. Thus, since the stereoscopic eyeglasses subject to perception can be selected on the basis of the presence area and the positions notified by the notifying means, the stereoscopic eyeglasses subject to perception can be selected automatically from a plurality of stereoscopic eyeglasses.

Incidentally, by using liquid-crystal shutters as the optical element for the left eye and the optical element for the right eye of the stereoscopic eyeglasses as stated in the 17th aspect of the present invention, the optical element for the left eye and the optical element for the right eye of the stereoscopic eyeglasses can be provided with high-speed follow-up characteristics, and the changeover of their light-shielding characteristics can be facilitated, so that the virtual object can be perceived easily by the operator by the use of such stereoscopic eyeglasses.

In the above-described stereoscopic image display apparatus, as stated in the 18th aspect of the present invention, processing is executed in accordance with the method of displaying a stereoscopic image for displaying a stereoscopic image by a programmed computer. Namely, this method comprises the steps of: inputting positions on a display area of display means having the display area for displaying an image; selecting a pair of stereoscopic eyeglasses subject to perception from among a plurality of pairs of stereoscopic eyeglasses, each of the plurality of pairs of stereoscopic eyeglasses having an optical element for a left eye and an optical element for a right eye whose states of transmission and nontransmission of light can be mutually changed over on the basis of signals inputted respectively thereto; and defining as a virtual stereoscopic space a space included between the display means and the stereoscopic eyeglasses on the basis of the positions on the display means and a reference position spaced apart from the display means and set in advance, causing an image for the left eye of a virtual object and an image for the right eye of the virtual object to be displayed by the display means by being mutually changed over so as to allow the virtual object to be perceived in the virtual stereoscopic space, and causing the states of transmission and nontransmission of light of the optical element for the left eye and the optical element for the right eye of the stereoscopic eyeglasses subject to perception to be mutually changed over alternately in synchronism with the changeover.

The above-described processing which is executed can be stored in a recording medium in which a stereoscopic-image display program is recorded for displaying a stereoscopic image by a computer, as stated in the 19th aspect of the present invention. In this recording medium, the stereoscopic-image recording program for displaying a stereoscopic image is recorded by: inputting positions on a display area of display means having the display area for displaying an image; selecting a pair of stereoscopic eyeglasses subject to perception from among a plurality of pairs of stereoscopic eyeglasses, each of the plurality of pairs of stereoscopic eyeglasses having an optical element for a left eye and an optical element for a right eye whose states of transmission and nontransmission of light can be mutually changed over on the basis of signals inputted respectively thereto; and defining as a virtual stereoscopic space a space included between the display means and the stereoscopic eyeglasses on the basis of the positions on the display means and a reference position spaced apart from the display means and set in advance, causing an image for the left eye of a virtual object and an image for the right eye of the virtual object to be displayed by the display means by being mutually changed over so as to allow the virtual object to be perceived in the virtual stereoscopic space, and causing the states of transmission and nontransmission of light of the optical element for the left eye and the optical element for the right eye of the stereoscopic eyeglasses subject to perception to be mutually changed over alternately in synchronism with the changeover.

As described above, in accordance with the above-described first aspect of the present invention, the positions of the pair of eyeballs located in the vicinities of the stereoscopic eyeglasses are inputted by the visual-point position input means, and positions on the display area of the display means are inputted by the display-position input means. As a result, the positions on the display area of the display means and the positions of the eyeballs are made to correspond to each other accurately. Accordingly, an advantage can be obtained in that highly accurate display is possible in which the virtual object displayed in the virtual stereoscopic space corresponds to a real object.

In accordance with the above-described second aspect of the present invention, an advantage can be obtained in that the pupils of the operator projected onto the reflecting member of the display means can be inputted by the visual-point position input means, so that the input of the positions on the display means are made to accurately correspond to the positions of visual points, thereby improving the accuracy of the input of the positions of the visual points.

In accordance with the above-described third aspect of the present invention, the position of the visual-point position input means can be inputted by the position input portion, and the position of the visual point can be inputted by the sighting portion for forming the reference visual axis with respect to the position input portion. Accordingly, advantages can be obtained in that the positions on the display means can be accurately specified, and that it is possible to accurately input the operator's own position which indicates the position which can be specified.

In accordance with the above-described fourth aspect of the present invention, since the rotation of the eyeball can be detected by the detecting portion of the visual-point position input means, and the position of the visual point can be inputted on the basis of the detected rotation of the eyeball, an advantage can be obtained in that it is possible to accurately input the position of the visual point.

In accordance with the above-described fifth aspect of the present invention, since the rotation of the eyeball can be detected by the detecting means of the visual-point position input means, and the position of the visual point can be inputted on the basis of the detected rotation of the eyeball, an advantage can be obtained in that it is possible to accurately input the position of the visual point.

In accordance with the above-described sixth aspect of the present invention, since the operator's own position can be inputted by the position input portion of the display-position input means, and the light emitting portion forms a reference optical axis with respect to the position input portion. Accordingly, advantages can be obtained in that the position on the display area can be inputted on the basis of the operator's own position and the application of the light with the reference optical axis, and that it is possible to accurately input the operator's own position which is on an extension of a line of the position designated on the display means.

In accordance with the above-described seventh aspect of the present invention, the coordinates in the virtual stereoscopic space for displaying a virtual object can be corrected on the basis of the relationship of correspondence determined in advance between the perceived position in the virtual stereoscopic space and at least one of the position inputted by the visual-point position input means and the position inputted by the display-position input means. Accordingly, an advantage can be obtained in that the coordinates in the virtual stereoscopic space for displaying the virtual object can be corrected easily, making it possible to display the virtual object accurately.

In accordance with the above-described eighth aspect of the present invention, an advantage can be obtained in that, by calculating the image for the left eye of the virtual object and the image for the right eye of the virtual object on the basis of the relationship of correspondence obtained by the correcting means, the virtual object can be obtained at a more accurate position as a stereoscopic image.

In accordance with the above-described ninth aspect of the present invention, since the relationship of correspondence is determined on the basis of the error between the position of the virtual object displayed in the virtual stereoscopic space and measured in advance and the measurement position used in the measurement of the perceived position of the virtual object, an advantage can be obtained in that it is possible to display a virtual object corresponding to the perception characteristic of the operator.

In accordance with the above-described 12th aspect of the present invention, since the virtual object is displayed in the virtual stereoscopic space set by the controlling means with respect to the stereoscopic eyeglasses selected by the selecting means from among a plurality of pairs of stereoscopic eyeglasses, an advantage can be obtained in that the virtual object can be perceived by the operator wearing the stereoscopic eyeglasses selected as the subject for perception from among the plurality of stereoscopic eyeglasses.

In accordance with the above-described 13th aspect of the present invention, since the reference position is set on the basis of the operator's own position notified by the notifying means of one of the plurality of pairs of stereoscopic eyeglasses, an advantage can be obtained in that it is possible to present an optimum virtual object to the respective operators wearing the stereoscopic eyeglasses.

In accordance with the above-described 14th aspect of the present invention, since the position of the visual point or the position of the visual point set on the basis of the position notified by the notifying means is set as the reference position, an advantage can be obtained in that the virtual object can be displayed by accurately fixing the virtual object in the virtual stereoscopic space relative to the position where the operator subject to perception views.

In accordance with the above-described 15th aspect of the present invention, since the stereoscopic eyeglasses whose distance to the reference position is shortest is selected, an advantage can be obtained in that even if a plurality of operators wearing the stereoscopic eyeglasses are present in the vicinities of the reference position, the pair of stereoscopic eyeglasses with the shortest distance is selected from among them, so that the virtual object can be displayed simply and accurately to the operator subject to perception.

In accordance with the above-described 16th aspect of the present invention, since the stereoscopic eyeglasses subject to perception can be selected on the basis of the presence area and the positions notified by the notifying means, an advantage can be obtained in that the stereoscopic eyeglasses subject to perception can be selected automatically from a plurality of stereoscopic eyeglasses.

In accordance with the above-described 17th aspect of the present invention, since liquid-crystal shutters are used as the optical element for the left eye and the optical element for the right eye of the stereoscopic eyeglasses, advantages can be obtained in that follow-up characteristics are made high-speed, and the changeover of light-shielding characteristics is facilitated, so that the virtual object can be perceived easily by the operator by the use of such stereoscopic eyeglasses.

BRIEF DESCRIPTION OF THE DRAWINGS

FIG. 1 is a schematic diagram illustrating the configuration of a stereoscopic image display apparatus in accordance with a first embodiment of the present invention;

FIG. 6 is a flowchart illustrating the flow of processing for displaying a stereoscopic image in the stereoscopic image display apparatus;

FIG. 8 is a flowchart illustrating the flow of processing for setting the position of a screen;

FIG. 14 is an image diagram for explaining a process in another example of processing for setting the position of a visual point;

FIG. 16 is an image diagram for explaining a process in the processing for setting the position of a visual point on the basis of the fixation point;

FIG. 18 is a flowchart illustrating the flow of processing for displaying a stereoscopic image;

FIG. 19 is an image diagram for explaining a process for displaying a stereoscopic image;

FIGS. 20A and 20B are graphs illustrating the perception characteristics of operators, in which FIG. 20A shows the relationship between a presented position and an error when a virtual object was viewed in an orthoscopic state, while FIG. 20B shows the relationship in the state of squint;

FIGS. 21A and 21B are graphs illustrating the relationship between an interpupillary distance and a presented distance of the virtual object, in which FIG. 21A shows the results in the orthoscopic state, while FIG. 21B shows the results in the state of squint;

FIGS. 25A and 25B are graphs illustrating the error of a perceived position when the virtual object was presented to a corrected position, in which FIG. 25A shows the results in the orthoscopic state, while FIG. 25B shows the results in the state of squint;

FIGS. 31A and 31B are graphs illustrating the perception characteristics of an operator on the basis of the presented distance, in which FIG. 31A shows the relationship between the presented position of the virtual object and the error of the perceived distance when the virtual interpupillary distance was fixed, while FIG. 31B shows the relationship between the presented position of the virtual object and the error of the perceived distance when the virtual interpupillary distance was corrected;

FIGS. 32A and 32B are graphs illustrating the perception characteristics of the operator on the basis of the screen position, in which FIG. 32A shows the relationship between the screen position and the error of the perceived distance when the virtual interpupillary distance was fixed, while FIG. 32B shows the relationship between the screen position and the error of the perceived distance when the virtual interpupillary distance was corrected;

FIG. 37 is a perspective view illustrating a schematic configuration of stereoscopic eyeglasses;

FIGS. 44A to 44F are diagrams for explaining processes for setting a preferential viewer;

FIG. 47 is a flowchart illustrating the flow of processing for displaying a stereoscopic image in accordance with a third embodiment of the present invention;

FIG. 48 is a flowchart illustrating the flow of processing for displaying a stereoscopic image in accordance with a fourth embodiment of the present invention; and FIG. 49 is a flowchart illustrating the flow of fifth correction processing for allowing the virtual object to be perceived to be at a correct position for the operator.

DESCRIPTION OF THE PREFERRED EMBODIMENTS

Figure 2:
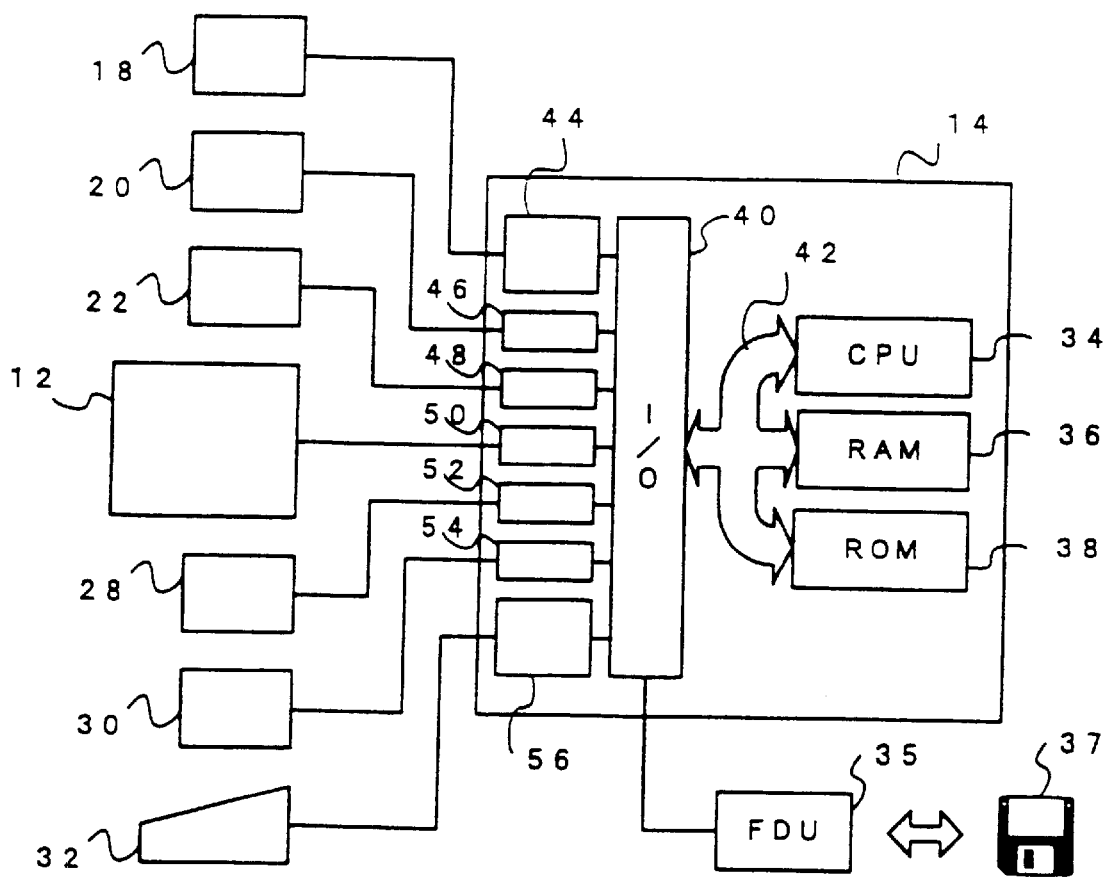
FIG. 2 is a block diagram illustrating the schematic configuration of a controller of the stereoscopic image display apparatus in accordance with the first embodiment of the present invention.

Referring now to the accompanying drawings, a detailed description will be given of the embodiments of the present invention.

First Embodiment

In a first embodiment of the present invention, the present invention is applied to a case in which a stereoscopic image is presented to a single operator (viewer).

As shown in FIG. 1, a stereoscopic image display apparatus 10 in accordance with this embodiment is provided with a projector 12 for projecting an image onto a screen 16 in a darkroom 60. The projector 12 is mounted on a controller 14 for generating an image for stereoscopic display.

A seat 24 in which an operator OP is seated is located on the projection side of the projector 12 and downstream of the screen 16. The seat 24 is mounted on a pedestal 26, and this pedestal 26 is connected to a motor 28 via a bellows 28A. The motor 28 is fixed to a cart 28B which is movable on a floor, and the bellows 28A is extended or contracted as the motor 28 is driven. As the bellows 28A is extended or contracted, the pedestal 26 is moved in the vertical direction (in the direction of arrow UD in FIG. 1), so that the operator OP seated in the seat 24 is raised or lowered. The raising or lowering of the operator OP seated in the seat 24 is used for adjustment of the vehicle height corresponding to the type of vehicle.

It should be noted that the cart 28 is movable on the floor in predetermined directions (in the direction of arrow FR in FIG. 1 as a back-and-forth direction, and in the direction of arrow RL in FIG. 1 as a left-and-right direction).

The operator OP has a position input device 18 (whose details will be described later) for inputting position coordinates and the like. A pair of liquid-crystal shutter eyeglasses 20 is mounted on the head of the operator OP, and this liquid-crystal shutter eyeglasses 20 is provided with a position sensor 22. The position sensor 22 is a magnetic field detection sensor which detects a magnetic field generated by a magnetic field generator 30 disposed behind the operator OP so as to detect the three-dimensional coordinates where the position sensor 22 is located as well as the direction thereof.

As shown in FIG. 2, the controller 14 is constituted by a microcomputer which is comprised of a CPU 34, a RAM 36, a ROM 38, and an input/output port 40, all of which may be singular or plural. The respective units of the microcomputer are connected to each other by a bus 42 to allow various commands and data to be transmitted or received. The position input device 18 is connected to the input/output port 40 via a driver 44. The liquid-crystal shutter eyeglasses 20 and the position sensor 22 are also connected to the input/output port 40 via a driver 46 and a driver 48, respectively. The projector 12 is also connected to the input/output port 40 via a driver 50. The motor 28 and the magnetic field generator 30 are also connected to the input/output port 40 via a driver 52 and a driver 54, respectively. A keyboard 32 is also connected to the input/output port 40 via a driver 56. Further, a processing routine which will be described later is stored in the ROM 38.

A floppy disk unit (FDU) 35, into which a floppy disk 37 as a recording medium can be removably inserted, is also connected to the input/output port 40. Incidentally, the processing routine and the like which will be described later can be read from and written on the floppy disk 37 by using the FDU 35. Accordingly, the processing routine which will be described later may be recorded in advance on the floppy disk 37 without being stored in the ROM 38, and the processing program recorded on the floppy disk 37 may be executed via the FDU 35. In addition, a large-capacity storage device (not shown) such as a hard disk may be connected to the controller 14, and the processing program recorded on the floppy disk 37 may be stored (installed) in the large-capacity storage device (not shown). Further, as the recording medium, it is also possible to use an optical disk such as a CD-ROM, or magneto-optic disk such as an MD or MO, and when such a recording medium is used, it suffices if a CD-ROM device, an MD device, an MO device, or the like is used in place of or in addition to the FDU 35.

Figure 3:
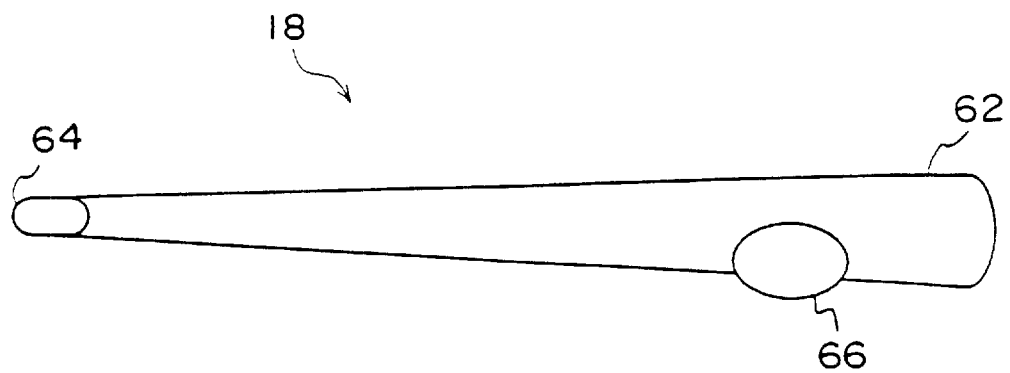
FIG. 3 is an image diagram illustrating the schematic configuration of a position input device.

As shown in FIG. 3, the position input device 18 has a body 62 of a pen shape, and a detecting portion 64 for detecting a magnetic field is attached to a distal end thereof. A designating portion 66 for designating a timing for detection is also attached to the position input device 18. Incidentally, in this embodiment, other three-dimensional pointers 18A and 18B may be used as the position input device 18 in the following description so as to facilitate the input of three-dimensional coordinates.

Figure 4:
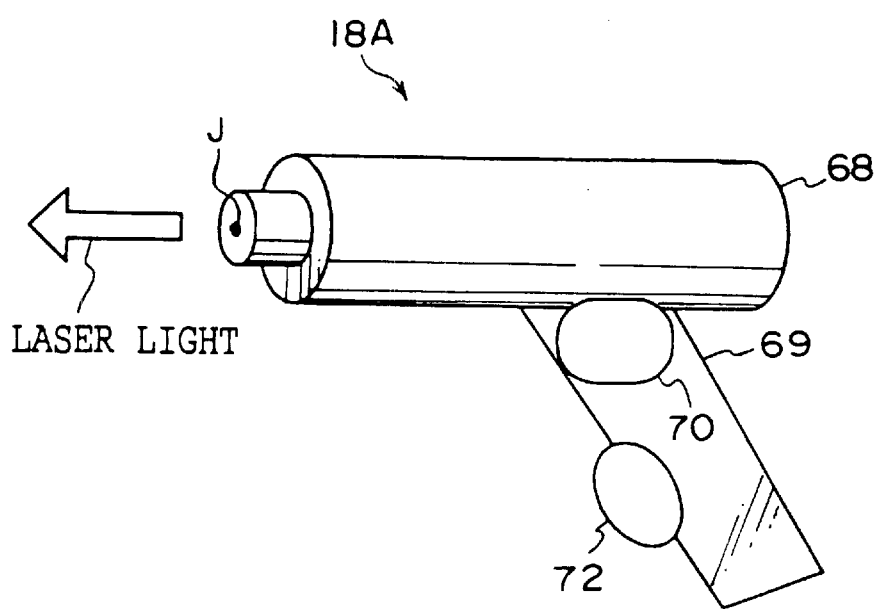
FIG. 4 is an image diagram illustrating the schematic configuration of another position input device using the optical axis of laser light as its optical axis.
Figure 5:
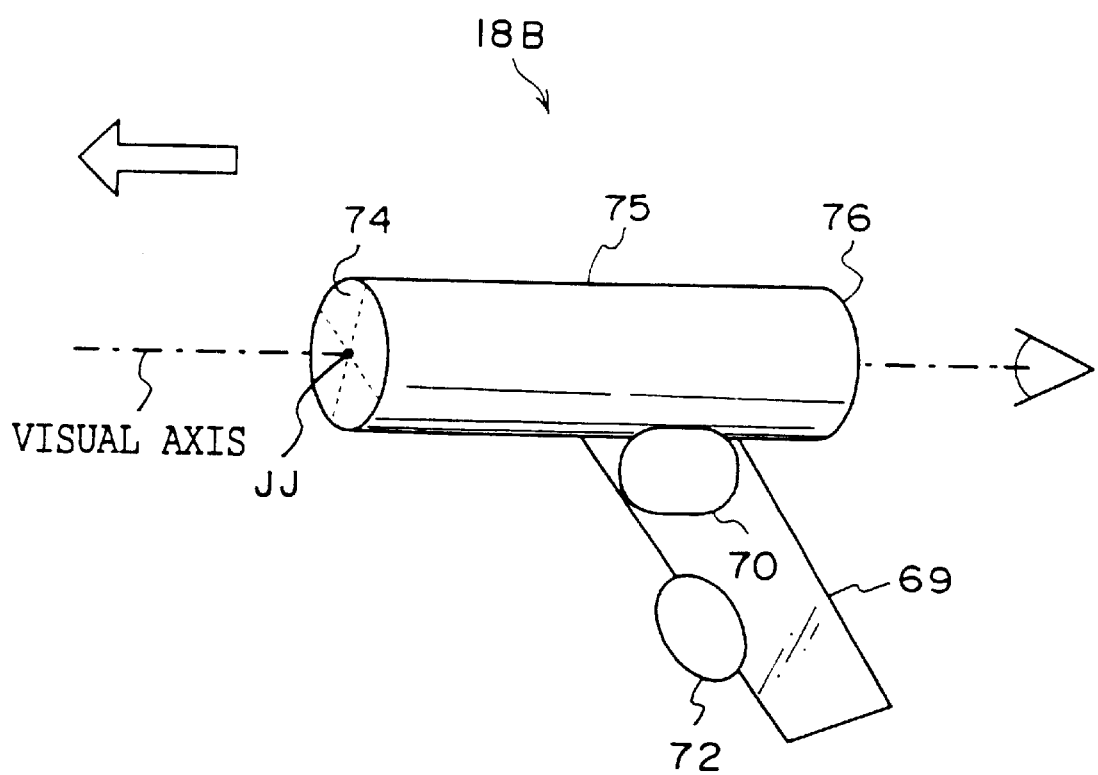
FIG. 5 is an image diagram illustrating the schematic configuration of still another position input device provided with sights.

As shown in FIG. 4 the three-dimensional pointer 18A has a laser device 68, and a detecting portion 70 for detecting a three-dimensional position by detecting a magnetic field is attached to a grip 69 which is fixed to the laser device 68. A designating portion 72 for designating a timing for detection is also attached to the grip 69. Meanwhile, as shown in FIG. 5, the three-dimensional pointer 18B has sights 74 and 76 which are respectively fixed to opposite ends of a cylindrical body 75. In the same way as the three-dimensional pointer 18A, the grip 69 is fixed to the body 75, and the detecting portion 70 for detecting a magnetic field and the designating portion 72 for designating a timing for detection are attached to the grip 69. These three-dimensional pointers 18A and 18B are connectable to the controller 14 as the position input device 18.

Next, a description will be given of the operation in accordance with this embodiment.

When the power supply for the stereoscopic image display apparatus 10 is turned on, the processing routine shown in FIG. 6 is executed by the controller 14. First, in Step 100, space correction processing is performed for correcting an error between the position of actual space and the position of space which has been detected by the position sensor and can serve as a virtual space. In an ensuing Step 102, processing for setting the screen position is performed for accurately ascertaining the three-dimensional position of an image which is displayed on the screen 16. In an ensuing Step 104, processing for setting the position of a visual point is performed for setting the position of an actual visual point of the operator OP. In an ensuing Step 106, a stereoscopic image is displayed in the virtual space subjected to spatial correction by adopting the screen position and the position of the visual point which have been set as described above.

Next, a description will be given of the details of space correction processing in Step 100 shown in FIG. 6.

Figure 7:
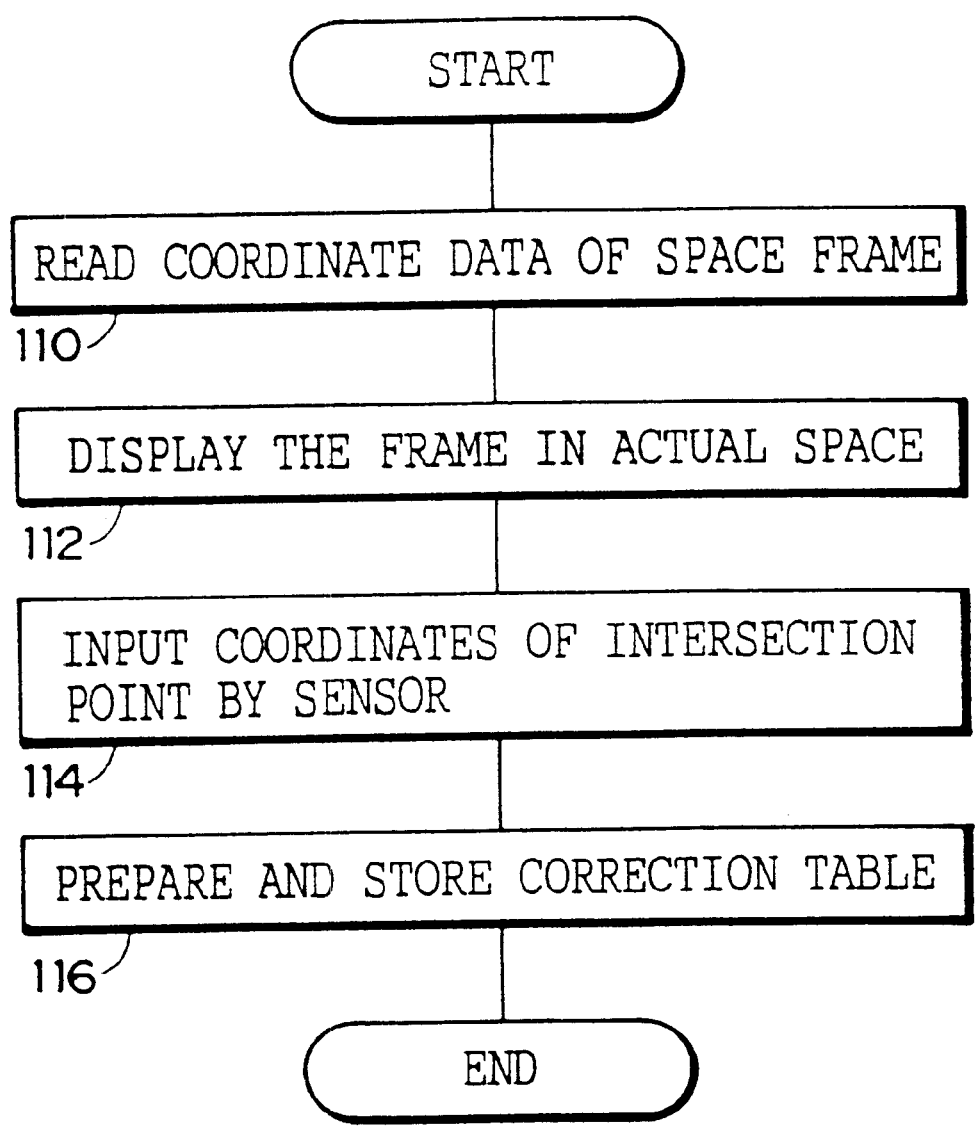
FIG. 7 is a flowchart illustrating the flow of space correction processing for displaying a stereoscopic image.

As shown in FIG. 7, in space correction processing, the coordinate data of a space frame is read in Step 110, and a frame is displayed in an ensuing Step 112. The coordinate data of a space frame is coordinate data in which a predetermined number of (e.g., m) coordinates at predetermined intervals d are provided in X, Y, and Z directions in a three-dimensional space, whereby small cubes each having a predetermined identical size with a side length of d are piled one on top of another by connecting the coordinate points by straight lines, thereby forming a cube with a side length of md. The display of a frame on the basis of the coordinate data of the space frame can be formed by arranging strings or laser beams (not shown) at intervals of the length d perpendicularly to the X, Y, and Z directions.

In an ensuing Step 114, the coordinates of intersection points of the displayed frame are inputted. Namely, the detecting portion 64 at the distal end of the pen-type position input device 18 is located at a plurality of intersection points of the displayed frame, and detection of each intersection point is designated by means of the designating portion 66 to detect magnetic fields, thereby inputting the coordinates of intersection points of the displayed frame. In an ensuing Step 116, the relationship of correspondence between the coordinates of intersection points of the displayed frame and the coordinates of intersection points inputted by the detection of magnetic fields is determined and stored as a correction table.

Consequently, the coordinates which are inputted by the detection of magnetic fields are made to correspond to actual space coordinates.

Next, a description will be given of the details of processing for setting the screen position in Step 102 shown in FIG. 6. It should be noted that, in the processing in Step 102, the three-dimensional pointer 18A having the laser device 68 is used as the position input device 18. In addition, this three-dimensional pointer 18A is arranged to detect a magnetic field by means of its detecting portion 70 and to detect a direction as detection is designated by the designating portion 72. Namely, upon designation by the designating portion 72, the three-dimensional pointer 18A outputs the three-dimensional coordinates of the central point J (see FIG. 4) of emission of laser light from the three-dimensional pointer 18A as well as a vector in a direction along the emitted direction of the laser light.

Figure 9:
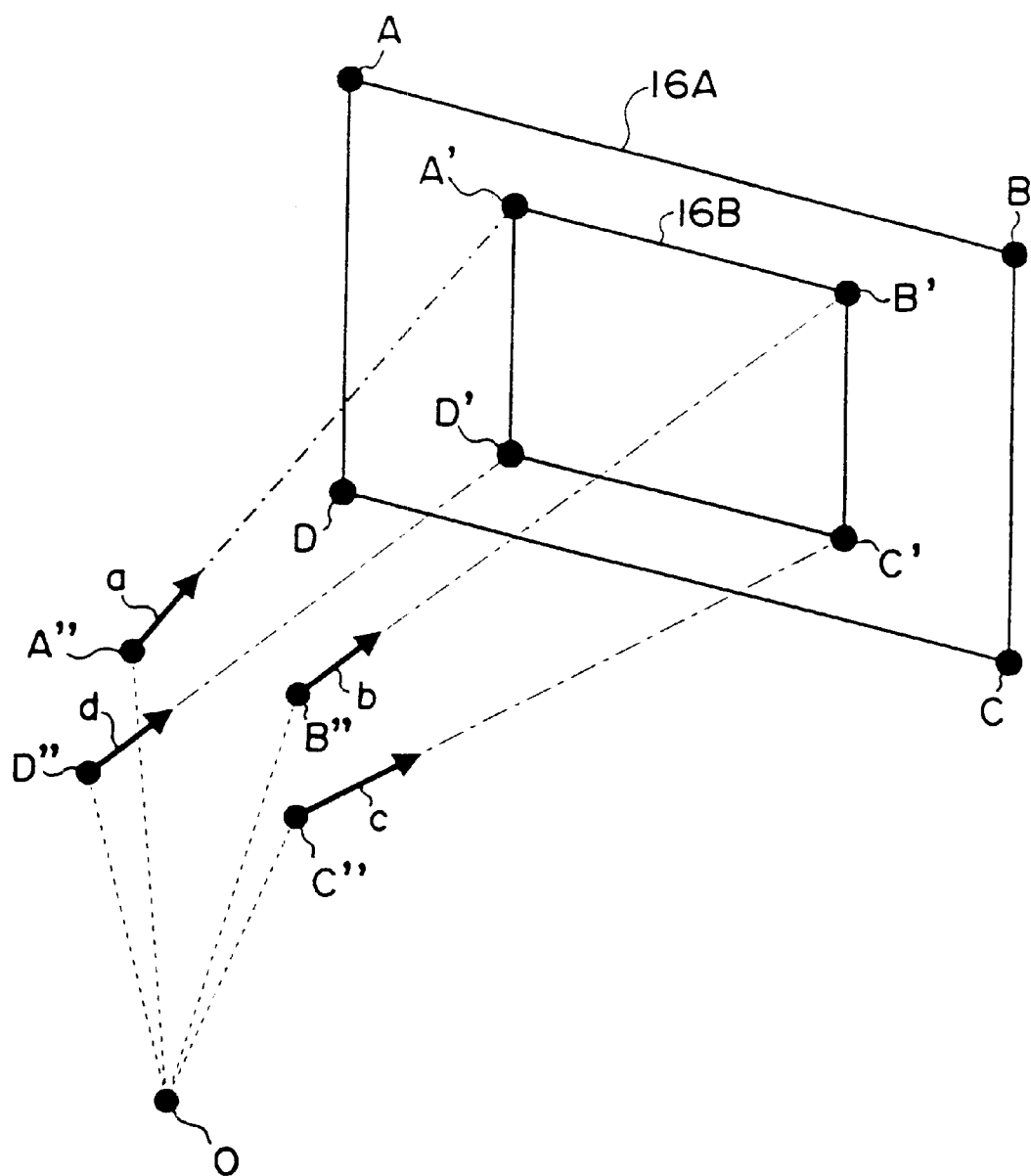
FIG. 9 is an image diagram for explaining a process in the processing for setting the screen position.

As shown in FIG. 8, in the processing for setting the screen position, basic shape data is read in Step 120, and the basic shape is displayed on the screen 16 in an ensuing Step 122. In this embodiment, as shown in FIG. 9, a rectangle 16B, which is a similar figure to a maximum frame 16A of the screen 16 in the projectable range of the projector 12 and which is smaller than that maximum frame and has a predetermined similitude ratio, is set as the basic shape. The maximum frame 16A is determined by points A, B, C, and D at the four corners as the outer frame of the screen display, and the rectangle 16B which is smaller than that maximum frame 16A is similarly determined by points A', B', C', and D' at the four corners.

In an ensuing Step 124, the respective three-dimensional coordinates and vectors are read by inputting the points A', B', C', and D' at the four corners of the rectangle 16B which is the basic shape displayed on the screen 16 by means of the three-dimensional pointer 18A. Namely, the point A' is irradiated with laser light emitted from the three-dimensional pointer 18A and is designated by the designating portion 72, thereby obtaining the coordinates and the vector a of a point A". Similarly, the point B' is irradiated with laser light from the three-dimensional pointer 18A and is designated by the designating portion 72 to obtain the coordinates and the vector b of a point B"; the point C' is irradiated with laser light from the three-dimensional pointer 18A and is designated by the designating portion 72 to obtain the coordinates and the vector c of a point C"; and the point D' is irradiated with laser light from the three-dimensional pointer 18A and is designated by the designating portion 72 to obtain the coordinates and the vector d of a point D".

In an ensuing Step 126, the coordinates in the virtual space of the points A', B', C', and D' at the four corners of the rectangle 16B, i.e., the basic shape displayed on the screen 16, are obtained in the following manner by using the coordinates and vectors a, b, c, and d of the points A", B", C", and D".

If the central point in the virtual space is set to be O, segments from the central point O to the points A', B', C', and D' on the screen 16 can be respectively expressed as follows:

$$OA'=OA''+pa$$

$$OB'=OB''+qb$$

$$OC'=OC''+rc$$

$$OD'=OD''+sd$$

where p, q, r, and s are variables (p>0, q>0, r>0, and s>0).

Since the coordinates and vectors a, b, c, and d of the points A", B", C", and D" are already known, and A'B'=C'D', A'B'·A'D'=0, it is possible to determine the coordinates of the points A', B', C', and D'.

In an ensuing Step 128, the coordinates of the points A, B, C, and D at the four corners of the maximum frame 16A are determined by using the coordinates of the points A', B', C', and D' determined above. In this embodiment, since the maximum frame 16A and the rectangle 16B are rectangles whose centers are identical, the center is determined on the basis of the coordinates of the points A', B', C', and D', and the coordinates of the points A, B, C, and D are determined by using the similitude ratio.

Thus three-dimensional positions on the screen 16 which is installed at a distance can be determined easily with high accuracy on the basis of the coordinates in the virtual space.

Although, in the above, a description has been given of the case in which a quadrangle is used as the basic shape, the basic shape to be measured may be deformed (made polygonal), or the number of measurement points may be increased.

In addition, although, in the above, a description has been given of a case where the coordinates are determined by calculation, the coordinates may be determined by actual measurement. Next, a description will be given of other processing in which the coordinates are determined by actual measurement.

Figure 10:
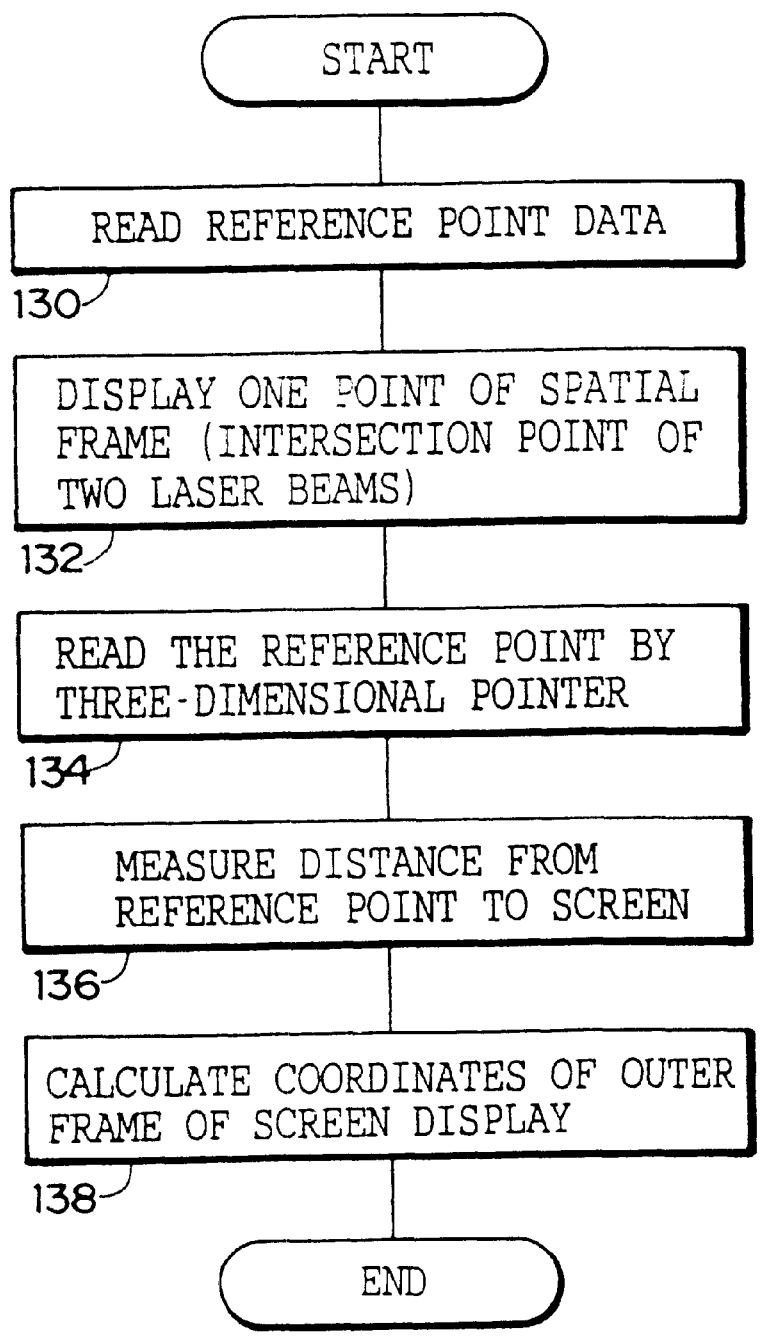
FIG. 10 is a flowchart illustrating the flow of another example of processing for setting the screen position.

As shown in FIG. 10, in the other processing for setting the screen position, reference point data is read in Step 130. As this reference point data, the coordinates of one intersection point when the frame is displayed in space correction processing (FIG. 7) are used. In an ensuing Step 132, the coordinates of the reference point which have been read are displayed in the space. Namely, laser light is emitted in such a manner that the point of intersection obtained by the intersection of two beams of laser light is located at the coordinates of the intersection point. This intersection point is set as a reference point, and is inputted by the pen-type three-dimensional pointer, i.e., the position input device 18, in an ensuing Step 134. In a ensuing Step 136, the distance from the reference point inputted by the position input device 18 to the screen 16 is actually measured, and the coordinates of the points A, B, C, and D, i.e., the coordinates of the outer frame of the screen display, are determined by using the measured values.

Since the intersection point displayed in the air is used as a reference point, measurement can be performed without causing trouble at the time of displaying the reference point.

Namely, an arrangement may be provided such that an intersection point produced by the intersection of two beams of laser light is set as a reference point, the position is inputted by the pen-type three-dimensional pointer, i.e., the position input device 18, the distance from that reference point to the screen 16 is actually measured, and the coordinates of the points A, B, C, and D, i.e., the coordinates of the outer frame of the screen display, are determined by using the measured values. If the intersection point displayed in the air is thus used as the reference point, measurement can be performed without causing trouble at the time of displaying the reference point.

Next, a description will be given of the details of processing for setting the position of a visual point in Step 104 shown in FIG. 6.

Figure 11:
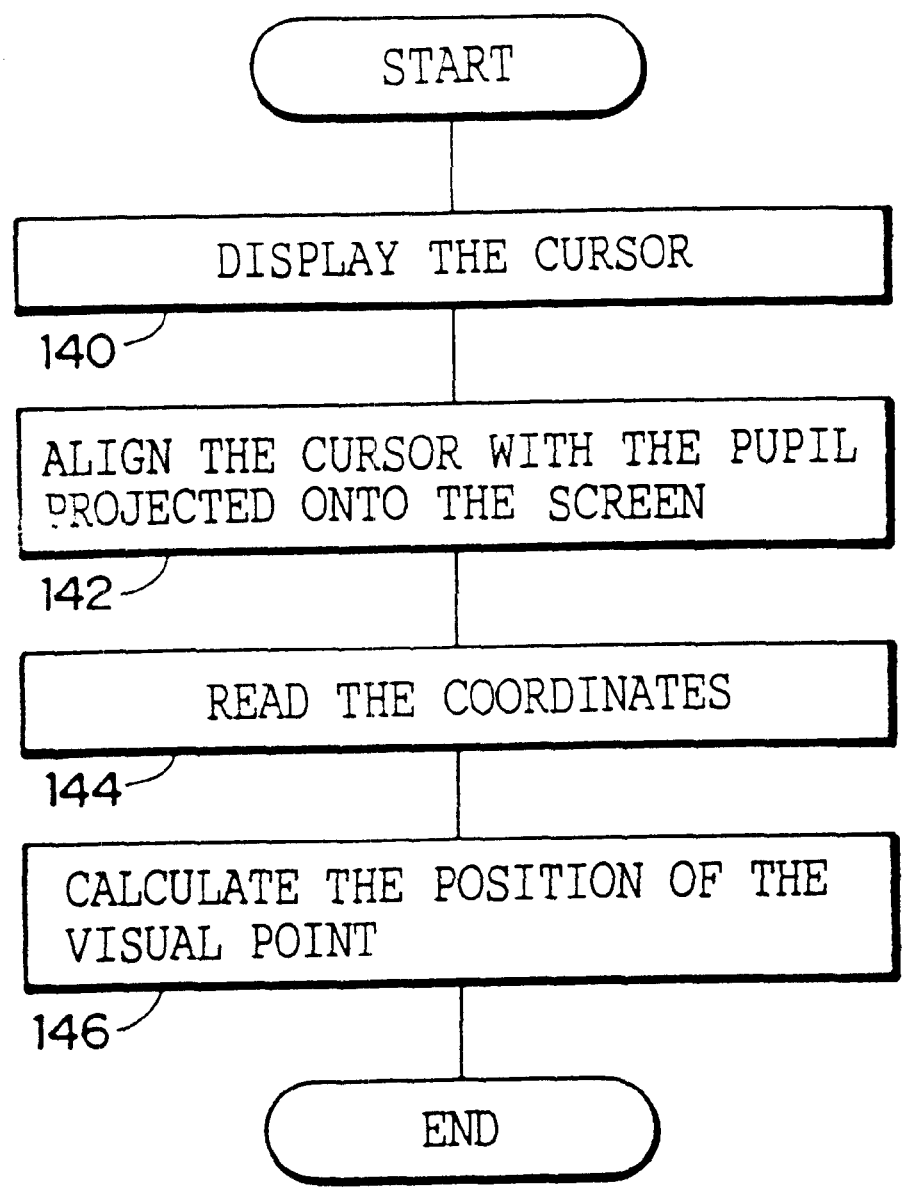
FIG. 11 is a flowchart illustrating the flow of processing for setting the position of a visual point.
Figure 12:
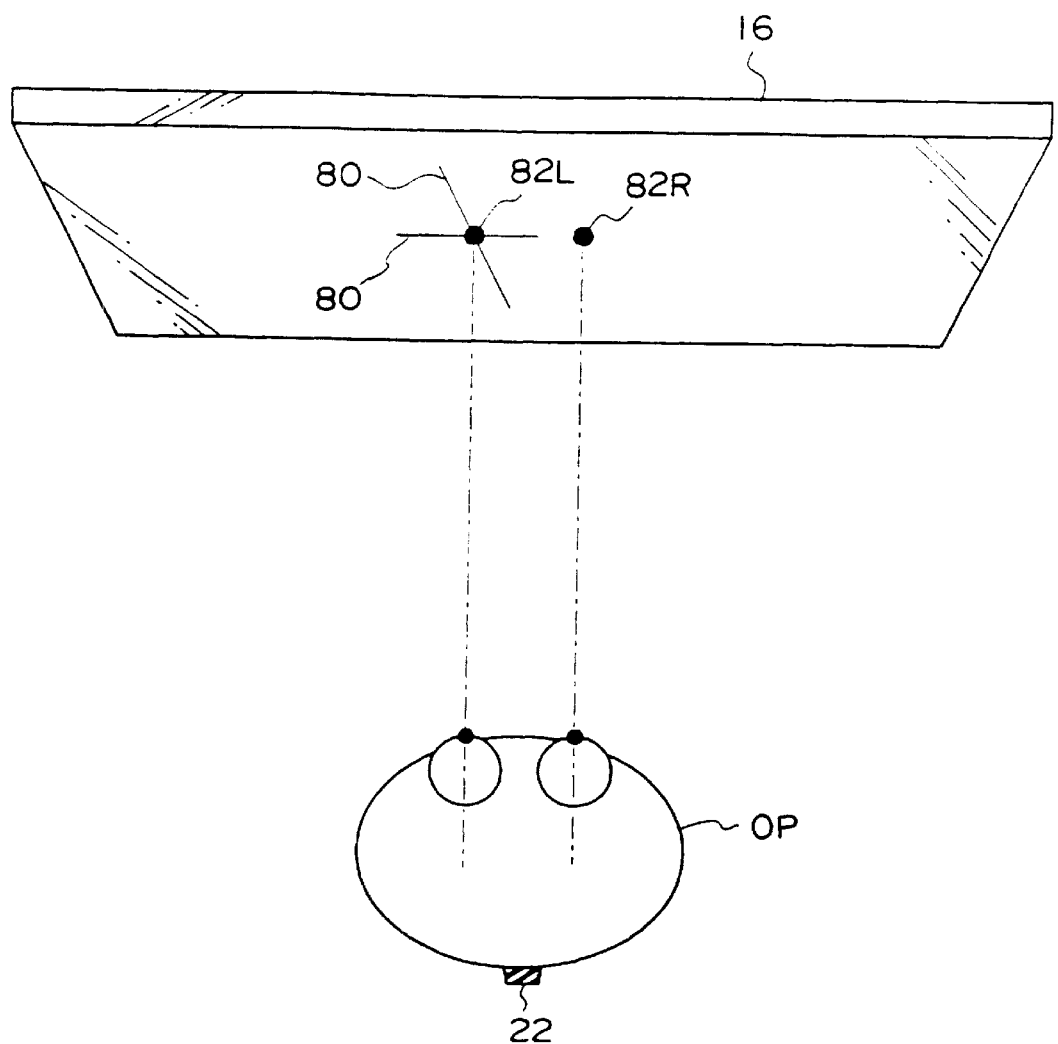
FIG. 12 is an image diagram for explaining a process in the processing for setting the position of a visual point.

As shown in FIG. 11, in the processing for setting the position of a visual point, a cross cursor 80 (FIG. 12) is displayed on the screen 16 in Step 140, and the cross cursor 80 is moved in response to the input from the keyboard 32 in an ensuing Step 142. In Step 142, the operator OP moves the cross cursor 80 to both of one's own left and right pupil images 82L and 82R projected on the screen 16 (FIG. 12), and designates the reading of coordinates. In an ensuing Step 144, the positions of the cross cursor 80 aligned with one's own left and right pupil images 82L and 82R are respectively read, and the position of a visual point is calculated in an ensuing Step 146. The interpupillary distance PD (FIG. 19) in an orthoscopic state (in a state in which a substantially infinite point is viewed) can be determined from the coordinates which were read in Step 144. Incidentally, the position of a visual point which is determined in Step 146 can be determined from the distance from the position sensor 22 located at the head of the operator OP on the basis of the standard shape of the head. In addition, the shape of the head may be determined from the coordinates inputted by locating the detecting portion 64 at the distal end of the pen-type position input device 18 in the vicinity of an eyeball of the operator OP, and the distance which is determined from that shape of the head may be adopted.

Although, in the above-described embodiment, a description has been given of the case in which the cross cursor is aligned with one's own pupil images projected on the screen 16, in a case where one's own pupils are not projected on the screen 16, a reflecting member such as a half mirror may be disposed between the operator OP and the screen 16 to project one's own pupil images.

In addition, although, in the above, a description has been given of the case in which the position of a visual point is determined from one's own pupil images projected on the screen 16, a description will be given of other processing for determining the position of the visual point more accurately with reference to FIGS. 13 and 14. Incidentally, in the other processing for determining the position of the visual point more accurately, the three-dimensional pointer 18B (FIG. 5) with the sights 74 and 76 fixed to opposite ends of the cylindrical body 75 is used as the position input device 18.

In addition, this three-dimensional pointer 18B is arranged to detect a magnetic field by means of its detecting portion 70 and to detect a direction as detection is designated by the designating portion 72. Namely, upon designation by the designating portion 72, the three-dimensional pointer 18B outputs the three-dimensional coordinates as well as a vector in the direction toward the point on the screen 16 which is aligned with the sights 74 and 76 of the three-dimensional pointer 18B. In other words, as the operator OP causes the point on the screen 16 to be aligned with the sights 74 and 76 of the three-dimensional pointer 18B, it is possible to determine the coordinates of one point JJ on the visual axis of the three-dimensional pointer 18B as well as the direction vector of the visual axis.

As the operator OP causes the point on the screen 16 to be aligned with the sights 74 and 76 of the three-dimensional pointer 18B at two different points, it is possible to determine the coordinates of one point JJ on the visual axis of the three-dimensional pointer 18B as well as the direction vector of the visual axis, thereby determining the position of the visual point.

Figure 13:
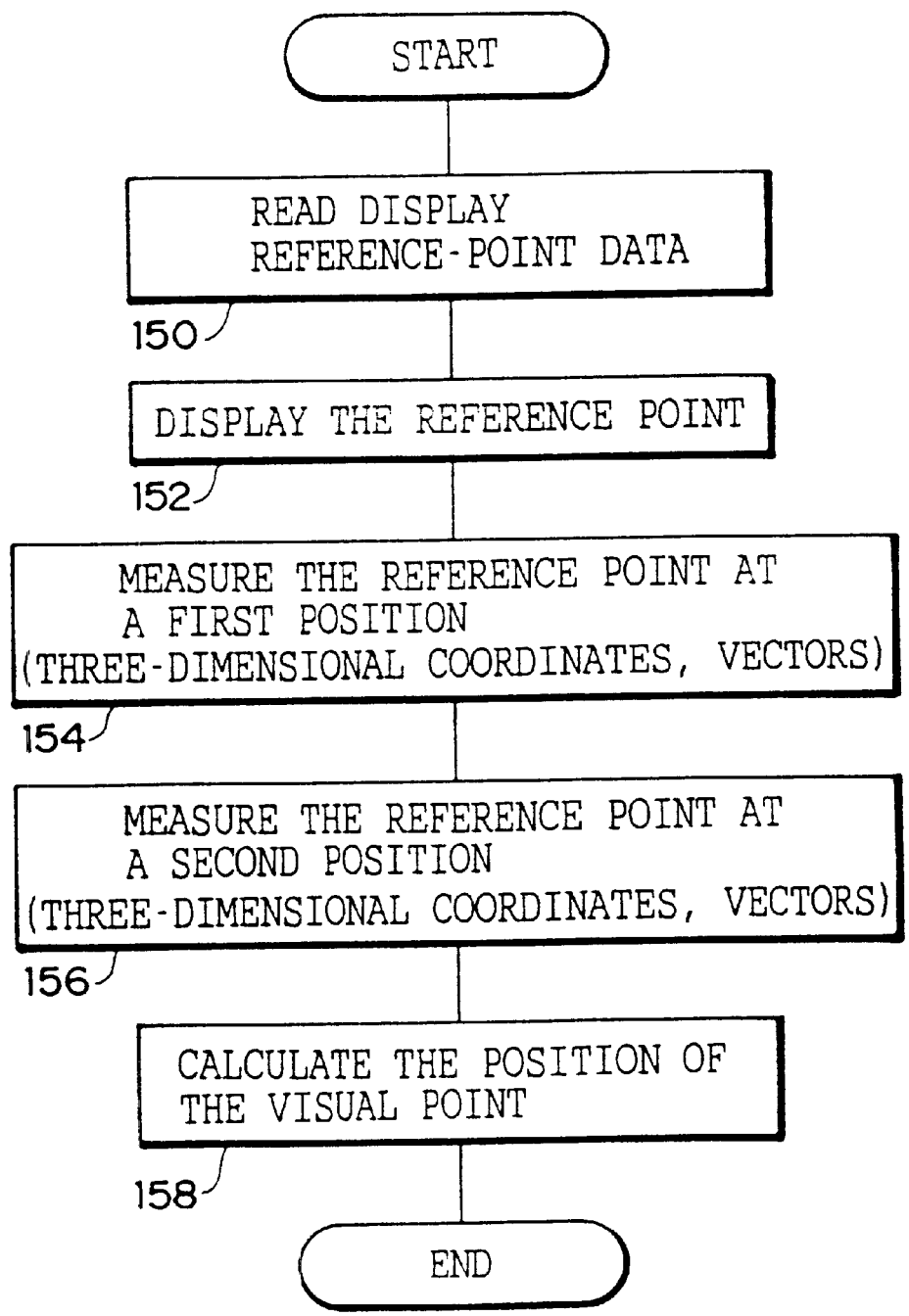
FIG. 13 is a flowchart illustrating the flow of another example of processing for setting the position of a visual point.

As shown in FIG. 13, in the other processing for setting the position of the visual point, reference point data is read in Step 150. This reference point data is the coordinate data on a reference point S to be displayed on the screen 16, and is set in advance. In an ensuing Step 152, this reference point S is displayed on the screen 16. In an ensuing Step 154, the operator OP is prompted to designate the coordinates and the direction vector of the visual axis in a first position, and the operator OP inputs the reference point S. As a result, the position vector a representing the coordinates of one point JJ on the visual axis of the three-dimensional pointer 18B as well as the unit vector b, i.e., the direction vector of the visual axis, are inputted (FIG. 14). In an ensuing Step 156, the designation of the coordinates and the direction vector of the visual axis at a second position different from the first position is prompted, and a reference point is inputted. Consequently, the position vector a' and the unit vector b' at the second position are inputted.

In an ensuing Step 158, the position of the visual point is determined by using the position vectors and the unit vectors for the reference point which were inputted by the position input device 18. A detailed description will be given of a method of determining the position of this visual point. Incidentally, since the position of the position sensor 22 mounted on the operator OP can be detected, the position of the visual point corresponds to the determination of a vector t from the position sensor 22 to the visual point X.

As shown in FIG. 14, the reference point S, the position vector a and the unit vector b of the point A, and the position vector a' and the unit vector b' of the point A' are inputted as described above. Accordingly, the position vector x of the visual point X at the first position and the position vector x' of the visual point X' at the second position can be expressed with respect to the left eye as shown below. Incidentally, in the drawing, the point O represents the central point in the virtual space.

$$x = t + p = s + k \cdot b$$
$$x' = t + p' = s + k' \cdot b'$$

where, t: position vector from the position sensor to the visual point X x: position vector of the visual point X x': position vector of the visual point X' p: position vector from the point O to the position sensor at the first position p': position vector from the point O to the position sensor at the second position k, k': variables From the above formulae, the vector t can be determined, and the position of the visual point can be determined. Incidentally, the vector t and the position of the visual point with respect to the right eye can be determined by processing similar to the above-described processing.

The position of the visual point of the operator OP can be set as described above, but the position of the visual point of the operator OP changes depending on the viewing direction. That is, the position of the visual point changes depending on the position of the fixation point. A description will be given of processing for determining the position of the visual point which changes depending on the position of the fixation point.

Figure 15:
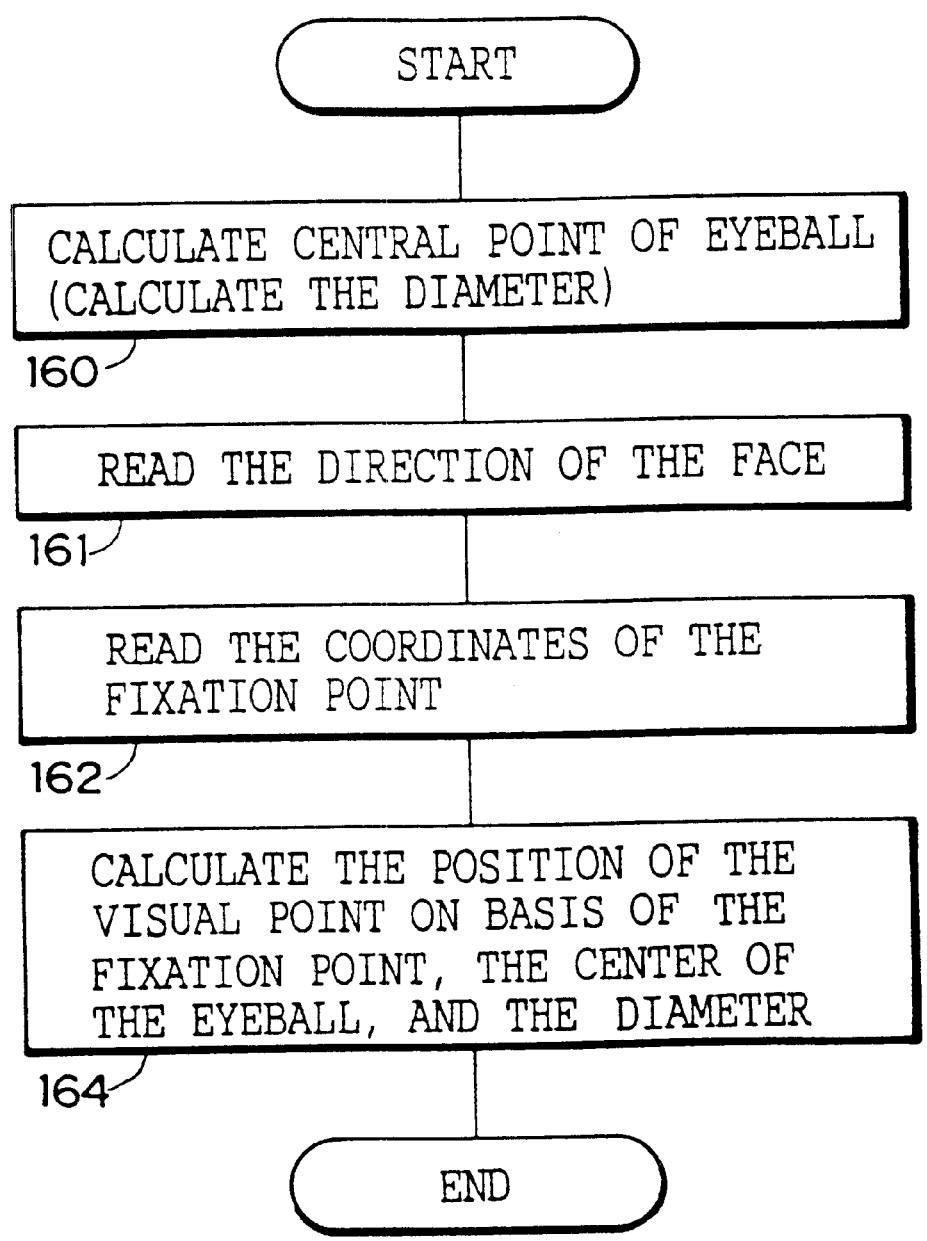
FIG. 15 is a flowchart illustrating the flow of processing for setting the position of a visual point on the basis of a fixation point.

As shown in FIG. 15, in the processing for determining the position of the visual point on the basis of the position of the fixation point, central positions L0 and R0 of eyeballs are first determined in Step 160. Namely, since the variations in the size of an eyeball are generally small, and the diameter of the eyeball can be determined in a standardized manner, the central positions L0 and R0 of eyeballs are determined by using a predetermined eyeball diameter from the position of the visual point determined in advance. In an ensuing Step 161, the direction of the face is read by the position sensor 22 mounted on the operator OP. In an ensuing Step 162, the position coordinates of the fixation point are read, and the position of the visual point is determined in an ensuing Step 164 on the basis of the position coordinates of this fixation point, the direction of the face which was read in Step 161, the central positions L0 and R0 of the eyeballs, and the eyeball diameter.

Referring to FIG. 16, a description will be given of a method of determining the position of the visual point by citing as an example a case in which the viewing state of the operator OP has changed from the orthoscopic state. It should be noted that, in this embodiment, the state in which the operator OP views a substantially infinite point is set as the orthoscopic state of the operator OP. In this case, it is assumed that the face of the operator OP, in terms of its direction, is oriented in the direction which connects the center of both eyes and the position being viewed. Accordingly, the states in which only the eyeballs are rotated, such as the so-called sidelong glance, upward glance, and downward glance, do not constitute the orthoscopic state. In the following description, such states as the so-called sidelong glance, upward glance, and downward glance will be generically referred to as the state of squint.

When the operator OP faces the forward direction (the screen) and views a fixation point Sc (in the state of squint), the position of the visual point of the left eye moves from the position L1 of the visual point in the orthoscopic state to the position L2 of the visual point which is at a point of intersection between a circle based on the eyeball diameter and a straight line connecting the center L0 of the left eye and the fixation point Sc. Accordingly, the positions L2 and R2 of the visual point, which change depending on the position of the fixation point, can be determined from the position of the fixation point Sc, the central positions L0 and R0 of the eyeballs, and the eyeball diameter. Incidentally, although in FIG. 16 a description has been given of the case where the operator OP is set in the state in which his or her face is oriented toward the forward direction (the screen), since the direction of the face can be detected by the position sensor 22 mounted on the operator OP, the positions L2 and R2 of the visual point, which change depending on the position of the fixation point, can be determined from the direction of the face, the position of the fixation point Sc, and the eyeball diameter in whatever direction the face of the operator OP is oriented.

The determination of the positions of the visual point, which change depending on the position of the fixation point, is effective when the position of the virtual object which is displayed for the operator OP is displayed by being moved substantially from the orthoscopic direction of the operator OP in the vertical or horizontal direction, i.e., in the case of the state of squint.

Figure 17:
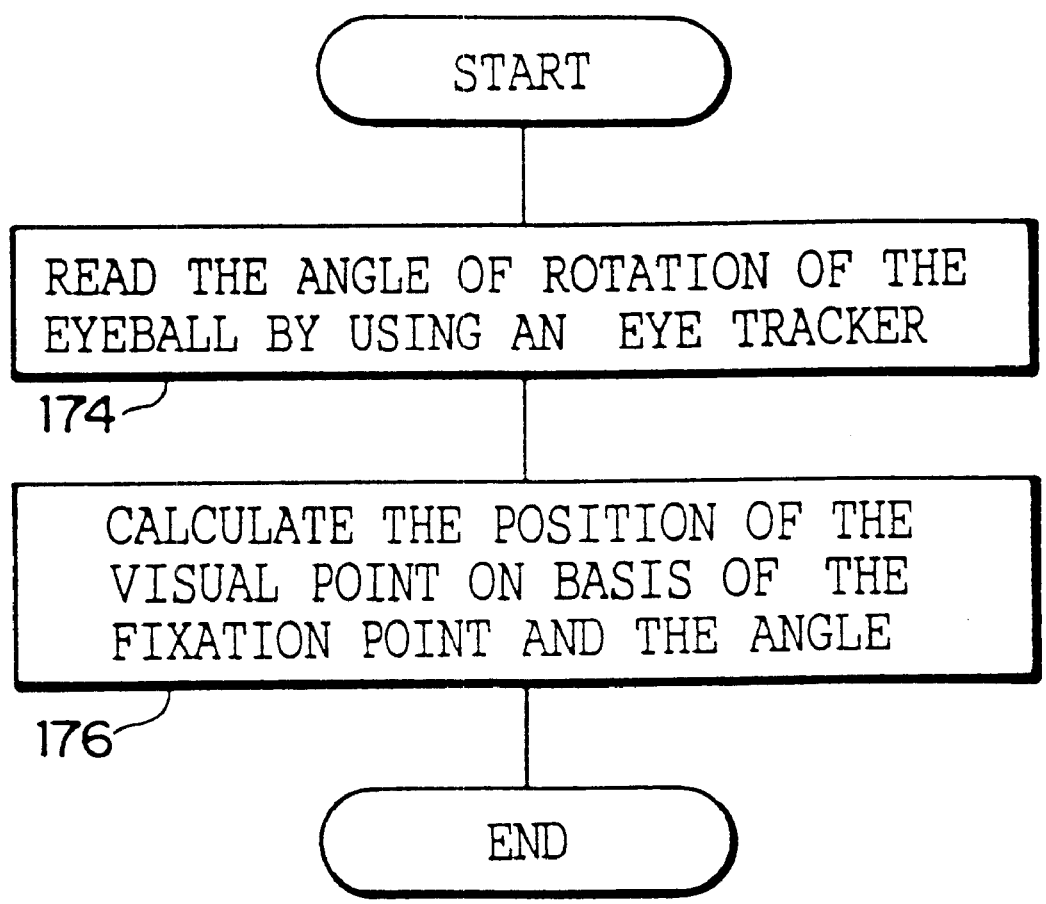
FIG. 17 is a flowchart illustrating the flow of another example of processing for setting the position of a visual point on the basis of the fixation point.

In the above, a description has been given of the case in which the positions of the visual point which change depending on the position of the fixation point are determined by calculation, but the positions of the visual point can be determined by directly detecting the eyeball motion. Referring to FIG. 17, a description will be given of other processing for determining the positions of the visual point by directly detecting this eyeball motion. Incidentally, as a device for directly detecting this eyeball motion, an eye tracker (not shown) is known for detecting the rotary motion of an eyeball on the basis of the rotary motion of a pupil and a change in the reflectivity of a cornea. Here, it is assumed that an output signal from the unillustrated eye tracker is inputted to the controller 14. In addition, this eye tracker is preferably attached to the liquid-crystal shutter eyeglasses 20.

As shown in FIG. 17, in the other processing for determining the positions of the visual point by detecting the eyeball motion, the rotary motion of the eyeballs is read by the eye tracker in Step 174. In an ensuing Step 176, the positions L2 and R2 of the visual point which changed from the positions R1 and L1 in the orthoscopic state can be determined on the basis of angles due to the rotary motion of the eyeballs.

Next, a detailed description will be given of processing for displaying a stereoscopic image in Step 106 shown in FIG. 6.

As shown in FIG. 18, in the processing for displaying a stereoscopic image, image data for displaying the virtual object in the virtual space is read in Step 200, and the position of the operator OP is read by reading the position sensor 22 in an ensuing Step 202. In an ensuing Step 204, the image data is corrected in the manner which will be described below, by using the aforementioned set positions of the visual point and the like, and a stereoscopic image is displayed on the basis of the corrected image data in an ensuing Step 206.

Here, referring to FIG. 19, a brief description will be given of the display of the stereoscopic image. The operator OP with the interpupillary distance PD views the screen 16 from the visual point L of the left eye and the visual point R of the right eye. An image based on the image data is displayed on the screen 16. On the basis of this image data, an image GL for the left eye and an image GR for the right eye, which incorporate a parallax by taking into consideration the interpupillary distance PD and the distance to the screen 16, are generated, and the image GL for the left eye and the image GR for the right eye are displayed alternately. In synchronism with the changeover of the display of the image GL for the left eye and the image GR for the right eye, the transmission of light through the left eye portion and the right eye portion of the liquid-crystal shutter eyeglasses 20 is changed over. Consequently, an overlapping area comprising an area up to the image GL for the left eye which is viewed by the left eye and an area up to the image GR for the right eye which is viewed by the right eye constitutes a virtual space Vr where the virtual object can be displayed. Thus the virtual object is stereoscopically displayed by the display of the image GL for the left eye and the image GR for the right eye.

Figure 33:
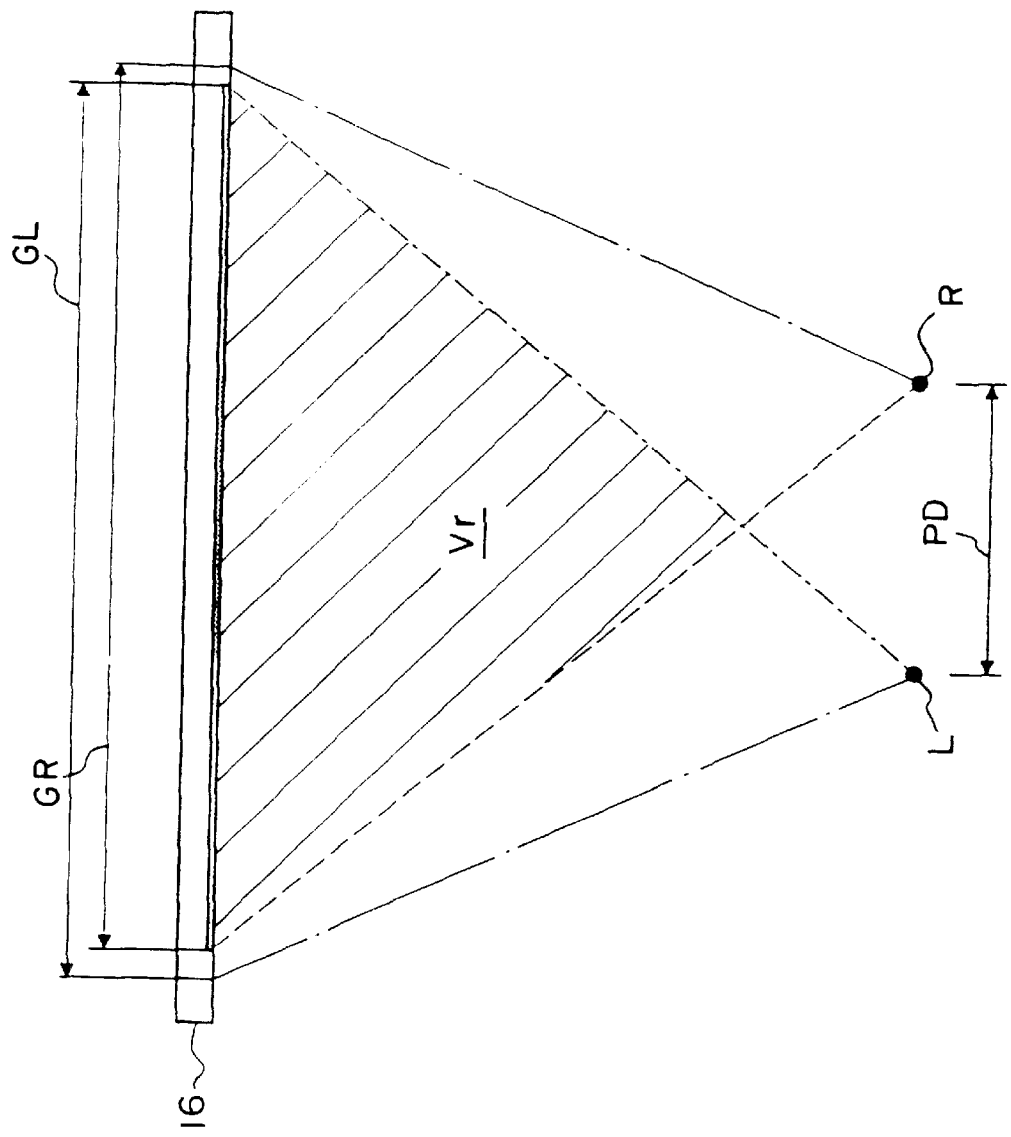
FIG. 33 is an image diagram for explaining a process for displaying a stereoscopic image.

Incidentally, as shown in FIG. 33, in the display of the stereoscopic image, by increasing the overlapping area of the image GL for the left eye and the image GR for the right eye which are displayed on the screen 16, it is possible to increase the overlapping area comprising the area up to the image GL for the left eye which is viewed by the left eye and the area up to the image GR for the right eye which is viewed by the right eye, thereby making it possible to enlarge the virtual space Vr where the virtual object can be displayed.

The present inventors conducted an experiment on the perception characteristic by taking note of the fact that the perception characteristic varies among operators OP in the perception of a virtual object displayed in the virtual space Vr and corresponding to a real object. In the experiment, a circular cone was used as the real object, and an apex of the circular cone was set as a measurement point. The circular cone was displayed in the virtual space as a virtual object, and the relationship was determined between, on the one hand, the perceived position when the apex of the circular cone, i.e., the virtual object, was designated by the operator OP and, on the other hand, the presented position of the measurement point.

FIG. 20A shows the relationship between the presented position and the error (difference between the presented position and the perceived position) when a virtual object was viewed by ten different operators OP in the orthoscopic state. Meanwhile, FIG. 20B shows the relationship between the presented position and the perceived position when the virtual object was viewed by the ten different operators OP in the state of squint. In the drawings, the presented position shows the distance from the operator OP. As for the error, the positive sign shows the direction of moving away from the operator OP, while the negative sign shows the direction of approaching the operator OP.

As can be appreciated from FIG. 20A, although the perception characteristic varied among the individuals, as for the distance of the virtual object perceived in the orthoscopic state, the closer to the operator OP, the closer the virtual object was perceived to be, whereas the farther from the operator OP, the farther the virtual object was perceived to be. On the other hand, as can be appreciated from FIG. 20B, the distance of the virtual object perceived in the state of squint exhibited a tendency similar to the perception characteristic in the orthoscopic state and, as a whole, shifted in the direction of approaching the operator OP.

From the aforementioned results of the experiment, the present inventors took note of the fact that the perception characteristic varies among individual operators OP in the perception of a virtual object displayed in the virtual space Vr and corresponding to a real object, and of the fact that there is a difference between the presented distance and the perceived distance depending on the presented distance as well. Hence, the present inventors obtained knowledge that correction is necessary to allow the virtual object to be perceived to be at the correct position for the operators OP.

Figure 21A:
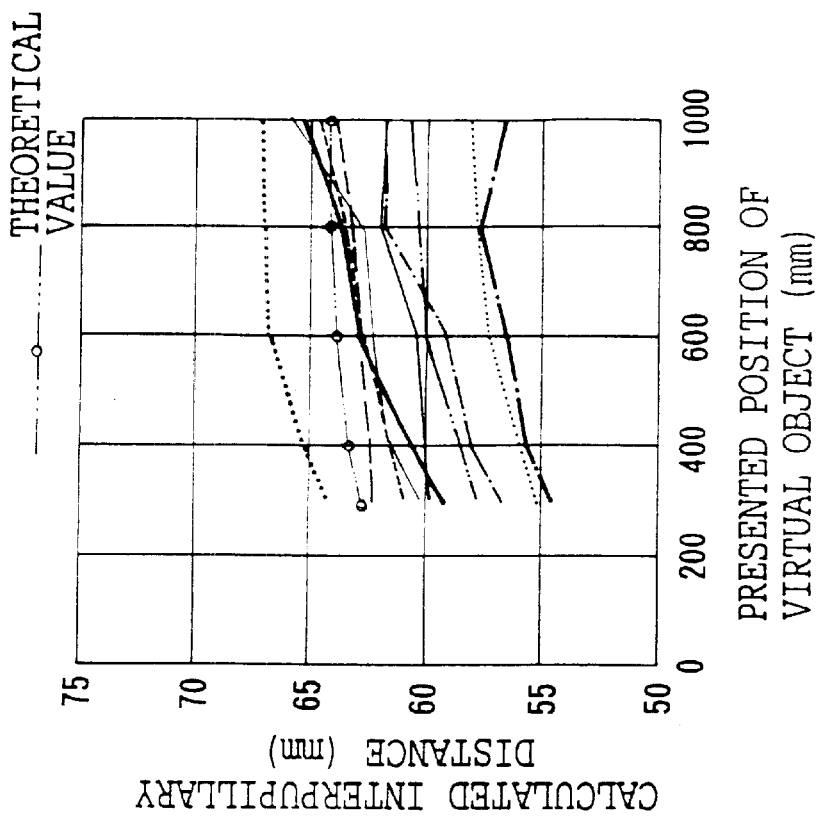
Figure 21B:
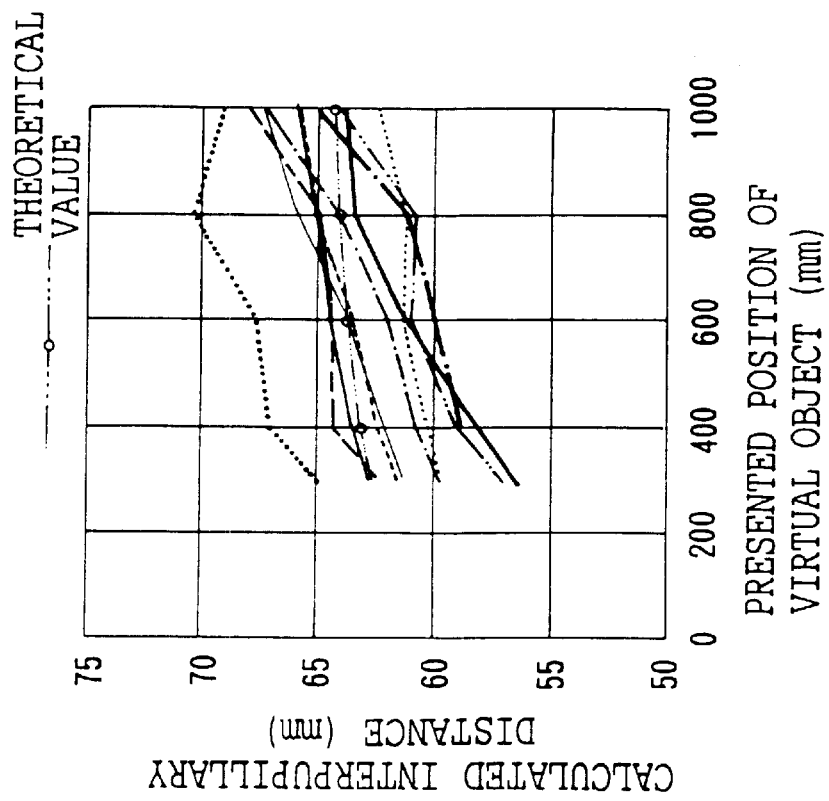

With respect to the point that the amount of error in which the presented distance is subtracted from the perceived distance of the virtual object perceived by the operator OP increases with an increase in the presented distance, the present inventors conducted an experiment on the relationship concerning the interpupillary distance PD by taking into consideration the fact that the aforementioned amount of error changes due to the vergence of the eyeballs, and obtained the following results. FIGS. 21A and 21B shows the results of the experiment, in which FIG. 21A shows the relationship between the interpupillary distance PD and the presented distance of the virtual object in the orthoscopic state, while FIG. 21B shows the relationship between the interpupillary distance PD and the presented distance of the virtual object in the state of squint. Incidentally, in the drawings, the thick lines indicate theoretical characteristics of change of the interpupillary distance PD corresponding to the change in the presented distance of the virtual object. In consequence of the results, knowledge was obtained that the perception error cannot be overcome by theoretical vergence alone.

Hereafter, a description will be given of processing for correcting image data in Step 204 in FIG. 18, which is the processing for allowing the virtual object to be perceived to be at the correct position for the operators OP.

Referring to the flowchart shown in FIG. 22, a description will be given of processing for generating a spatial distortion table by measuring correction data used for correction processing which will be described later, so as to ascertain the perception characteristic of the operator OP in the perception of the virtual object displayed in the virtual space Vr and corresponding to the real object.

Figure 22:
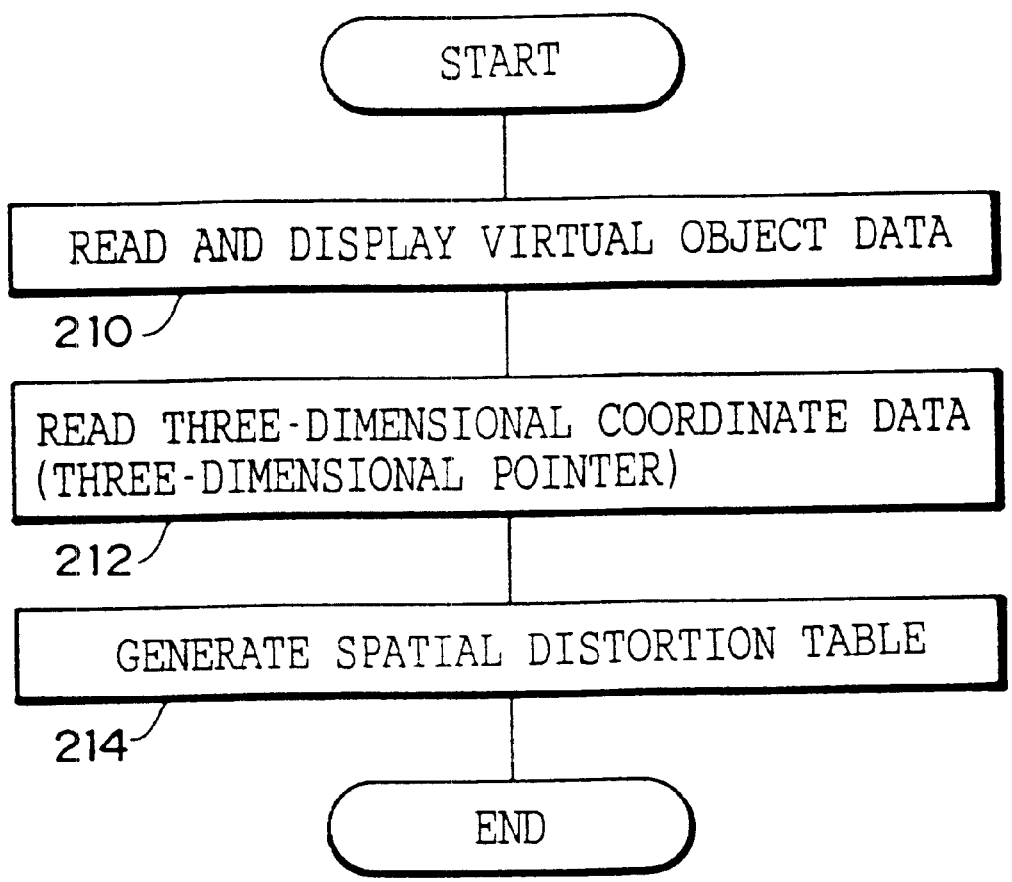
FIG. 22 is a flowchart illustrating the flow of processing for generating a spatial distortion table.

As shown in FIG. 22, in the processing for generating a spatial distortion table, in Step 210, the operator OP is prompted to display the virtual object at a plurality of presented distances (in a number corresponding to points which cover the virtual space), and to input the perceived positions of the presented virtual object. In an ensuing Step 212, the perceived positions of the virtual object inputted by the operator OP are read. The perceived positions of the virtual object are inputted by the pen-type position input device 18 to obtain three-dimensional coordinate data. In an ensuing Step 214, the relationship between the presented distance of the virtual object and an input value of the perceived position is generated and stored as the spatial distortion table. In this case, the spatial distortion table may be generalized by values measured by a multiplicity of operators OP, or may be used as a personal table of the operator OP. Incidentally, the interpupillary distance PD of the operator OP is made to correspond to the spatial distortion table and is stored.

In the above, the perceived positions of the displayed virtual object are inputted, and errors at that time may be adopted as a table, but it is also possible to adopt an amount of movement in which the virtual object is actually moved to the position where it should be located.

Next, a description will be given of correction processing for allowing the virtual object to be perceived to be at the correct position for the operator OP. First, a description will be given of first distortion correction by referring to the correction processing shown in FIG. 23. In the first distortion correction, the interpupillary distance is corrected by being set to a reference interpupillary distance at which the virtual object is perceived to be at the correct position.

Figure 23:
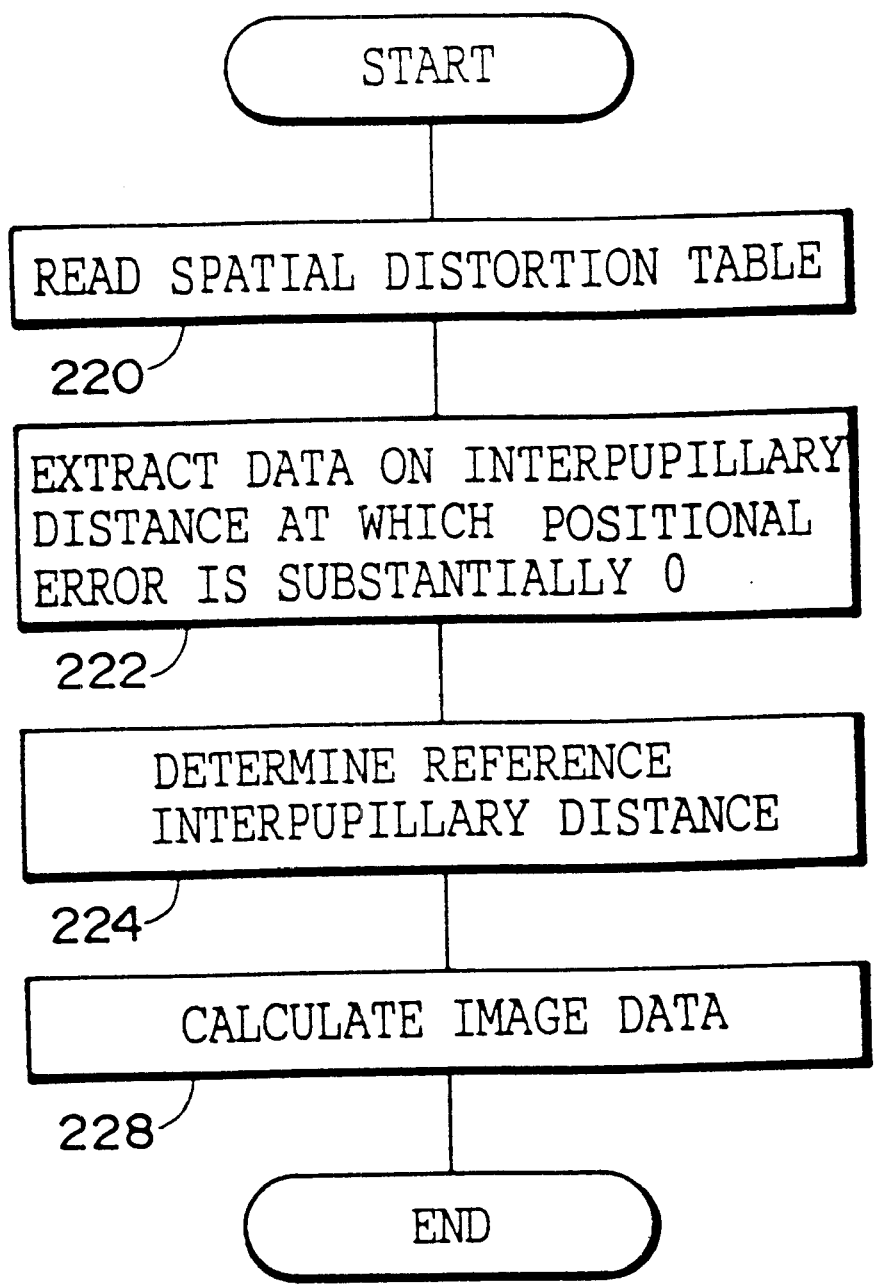
FIG. 23 is a flowchart illustrating the flow of first correction processing for allowing the virtual object to be perceived to be at a correct position for the operator.

As shown in FIG. 23, in the first distortion correction processing, the aforementioned spatial distortion table is read in Step 220, and data on the interpupillary distance at which the position error becomes substantially 0 at a predetermined position set in advance in the virtual space is extracted in an ensuing Step 222. In an ensuing Step 224, the extracted interpupillary distance is set as a reference interpupillary distance, and the image is calculated by using the reference interpupillary distance in Step 228.

Thus, since the interpupillary distance at which the position error becomes substantially 0 is set as the reference interpupillary distance, even an operator OP having a different interpupillary distance is able to perceive the virtual object to be at the correct position.

Next, referring to FIG. 24, a description will be given of second distortion correction processing which is different from the first distortion correction processing. In the second distortion correction processing, the shape of the virtual object is corrected by being distorted in correspondence with the distortion of the space.

Figure 24:
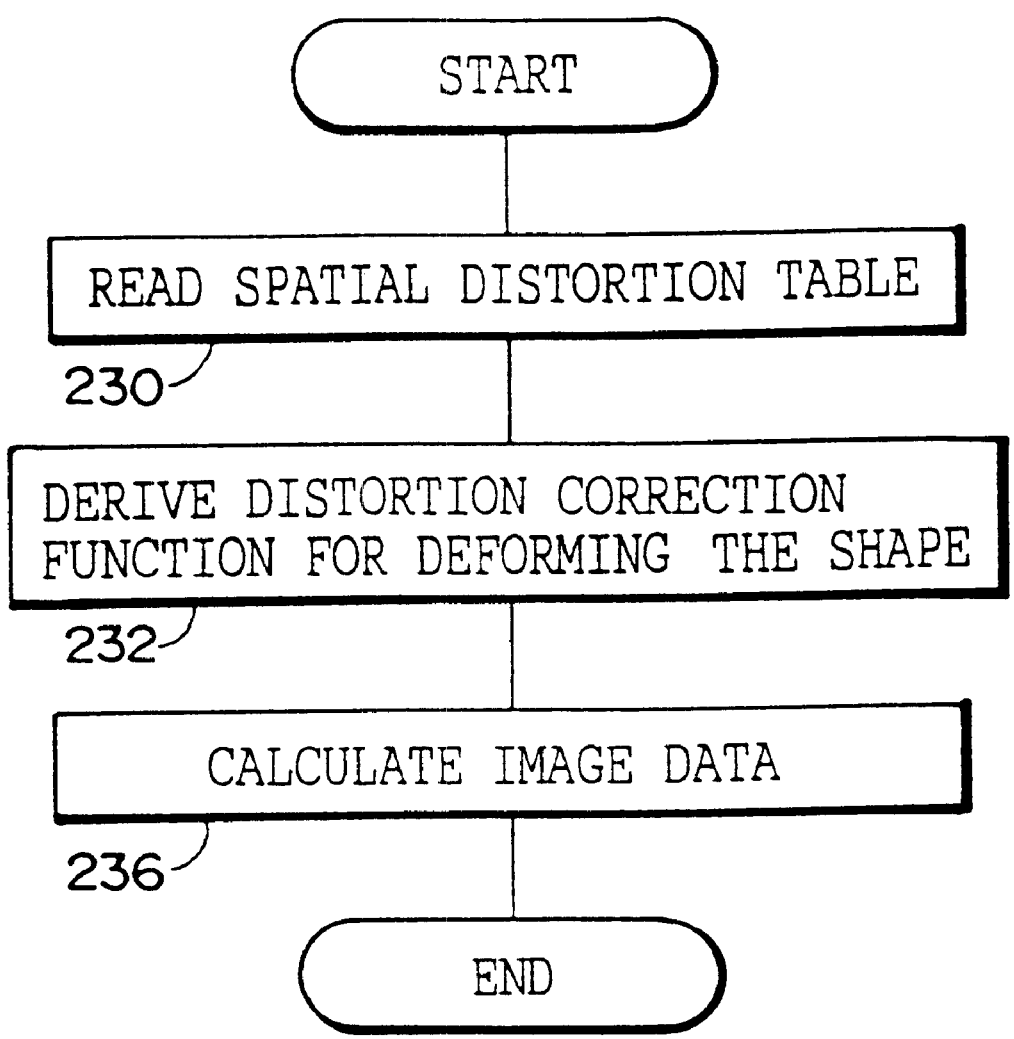
FIG. 24 is a flowchart illustrating the flow of second correction processing for allowing the virtual object to be perceived to be at a correct position for the operator.

As shown in FIG. 24, in the second distortion correction processing, the aforementioned spatial distortion table is read in Step 230, and a distortion correction function f for displaying the image by distorting the shape of the image in the virtual space is derived in an ensuing Step 232. In Step 236, the image is calculated by using the distortion correction function f thus derived.

The aforementioned distortion correction function is expressed by the following formulae:

$$(\alpha', \beta', y') = f(\alpha, \beta, y)$$

$$\alpha' = \alpha$$

$$\beta' = \beta$$

$$y' = a(\alpha, \beta) \cdot y + b(\alpha, \beta)$$

where, y: depth distance to be perceived y': correction value for the depth distance in the data α: sidelong glance angle in the vertical direction to be perceived (fixation point angle in the vertical direction)

α': correction value for the sidelong glance angle in the vertical direction in the data β: sidelong glance angle in the horizontal direction to be perceived (fixation point angle in the horizontal direction)

β': correction value for the sidelong glance angle in the horizontal direction in the data a(α, β), b(α, β): functions dependent on α, β

In the aforementioned distortion correction function f, by focusing attention on the fact that the position perceived by the operator OP and the presented position are in a substantially linear relationship (see FIG. 20), regression lines are determined for the respective operators OP, their average value is set as a gradient a(α, β), and a segment b(α, β) is determined. These functions a(α, β) and b(α, β) can be determined from two points (y1, y1') and (y2, y2') measured in correspondence with the individual operators OP.

Figure 25A:
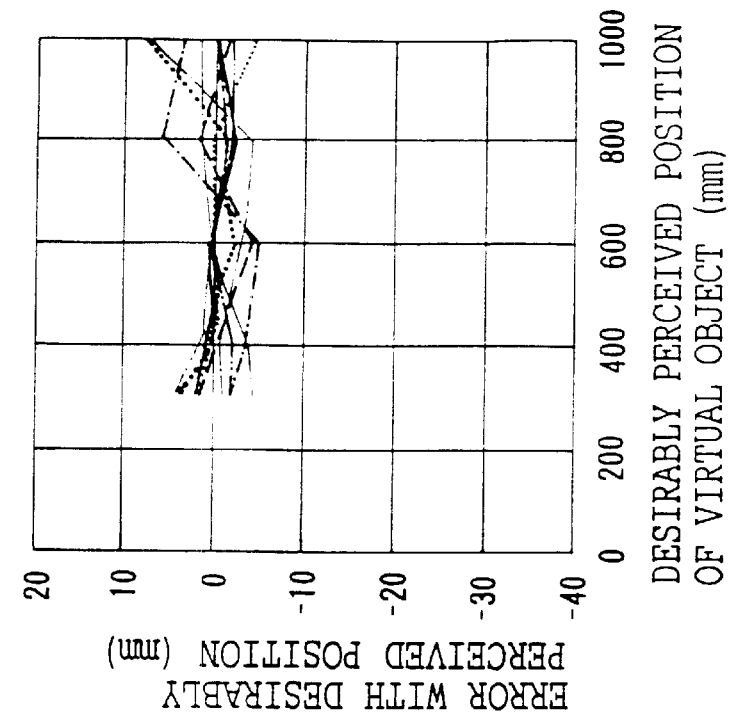
Figure 25B:
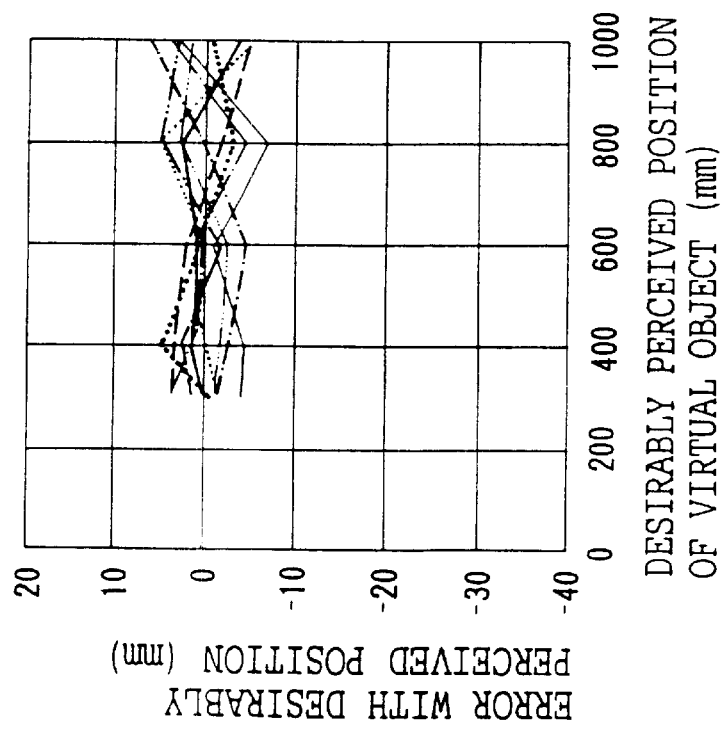

FIGS. 25A and 25B show the results in which the relationship was determined between the desirably perceived position where the virtual object was presented to the position corrected by the aforementioned function f and the error in the perceived position from that desirably perceived position. FIG. 25A shows the relationship when the virtual object was viewed in the orthoscopic state, while FIG. 25B shows the relationship when the virtual object was viewed in the state of squint. As can be appreciated from the drawings, the virtual object can be perceived substantially uniformly regardless of the operators OP.

Incidentally, the aforementioned correction function f can be generalized from the functions a(α, β) and b(α, β) of a small number of operators OP by changing the interpupillary distance of each of the individual operators OP such that (α0, β0, y0)=f(α0, β0, y0) with respect to a point (α0, β0, y0) serving as a reference.

Although, in the above, correction is effected separately for the respective angles in the vertical and horizontal directions, each of the angles may be merely replaced by an angle of deviation θ from the direction of the line of sight. By adopting this arrangement, the distortion correction function f can be simplified.

Next, referring to FIG. 26, a description will be given of third distortion correction processing. In the third distortion correction processing, a virtual interpupillary distance corresponding to the spatial distortion is determined, and the stereoscopic image is displayed in the position of the visual point.

Figure 26:
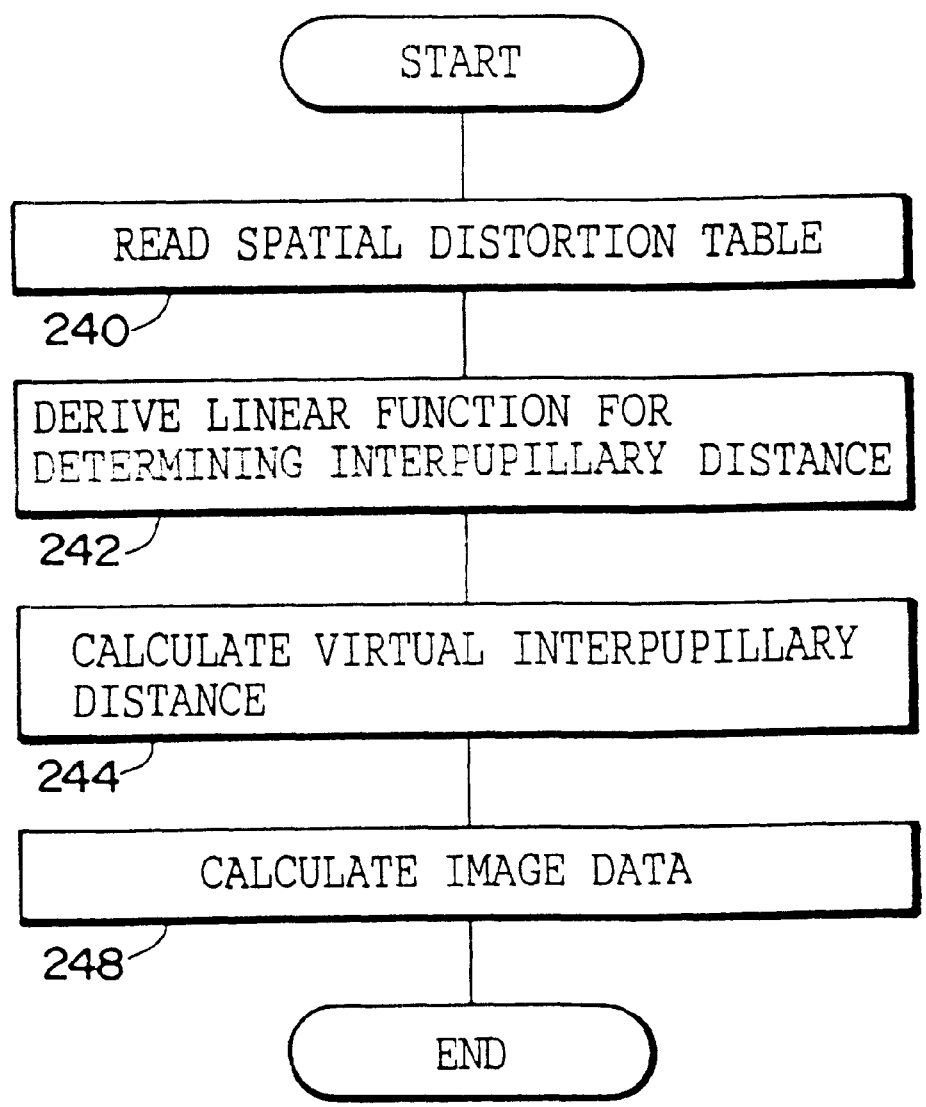
FIG. 26 is a flowchart illustrating the flow of third correction processing for allowing the virtual object to be perceived to be at a correct position for the operator.

As shown in FIG. 26, in the third distortion correction processing, the aforementioned spatial distortion table is read in Step 240, and a distortion correction function g for determining a virtual interpupillary distance is derived in an ensuing Step 242. In an ensuing Step 244, the virtual interpupillary distance is determined by using the derived distortion correction function g. In an ensuing Step 248, the image data is read, and is corrected by using the virtual interpupillary distance.

The aforementioned distortion correction function g is expressed by the following formulae:

$$(\alpha', \beta', d') = g(\alpha, \beta, y)$$

$$\alpha' = \alpha$$

$$\beta' = \beta$$

$$d' = a(\alpha, \beta) \cdot y + b(\alpha, \beta)$$

where, y: depth distance to be perceived d': correction value for the interpupillary distance in the data α: sidelong glance angle in the vertical direction to be perceived (fixation point angle in the vertical direction)

α': correction value for the sidelong glance angle in the vertical direction in the data β: sidelong glance angle in the horizontal direction to be perceived (fixation point angle in the horizontal direction)

β': correction value for the sidelong glance angle in the horizontal direction in the data a(α, β), b(α, β): functions dependent on α, β

The functions a(α, β) and b(α, β) of the aforementioned distortion correction function g can be determined from two points (y1, d1') and (y2, d2') measured in correspondence with individual operators OP. For instance, the interpupillary distance d can be set by being corrected such that the position error becomes 0 at an arbitrary depth y1. As an alternative method, the depth error e occurring when the interpupillary distance is set as d1 at an arbitrary depth y1 is measured, and the interpupillary distance d1' in the data is determined by the following formula on the basis of that error.

$$d1' = (d1 \cdot ds \cdot e) / \{y1 \cdot (ds - y1 - e)\} + d1$$

where, ds: distance from the visual point to the screen

Incidentally, the aforementioned correction function g can be generalized by determining in advance standard values of the functions a(α, β) and b(α, β) of a standard operator OP, by measuring the error between the interpupillary distance in the data with respect to individual operators OP and the interpupillary distance of the standard operator OP with respect to a point (α0, β0, y0) serving as a reference, and then by determining the functions a(α, β) and b(α, β) of the individual operators OP by incorporating the error components.

Although, in the above, correction is effected separately for the respective angles in the vertical and horizontal directions, each of the angles may be merely replaced by an angle of deviation θ from the direction of the line of sight. By adopting this arrangement, the distortion correction function g can be simplified.

Next, referring to FIG. 27, a description will be given of fourth distortion correction processing. In the fourth distortion correction processing, a virtual eyeball radius corresponding to the spatial distortion is determined, a virtual visual point based on the virtual eyeball radius is determined, and the stereoscopic image is displayed in the position of that visual point.

Figure 27:
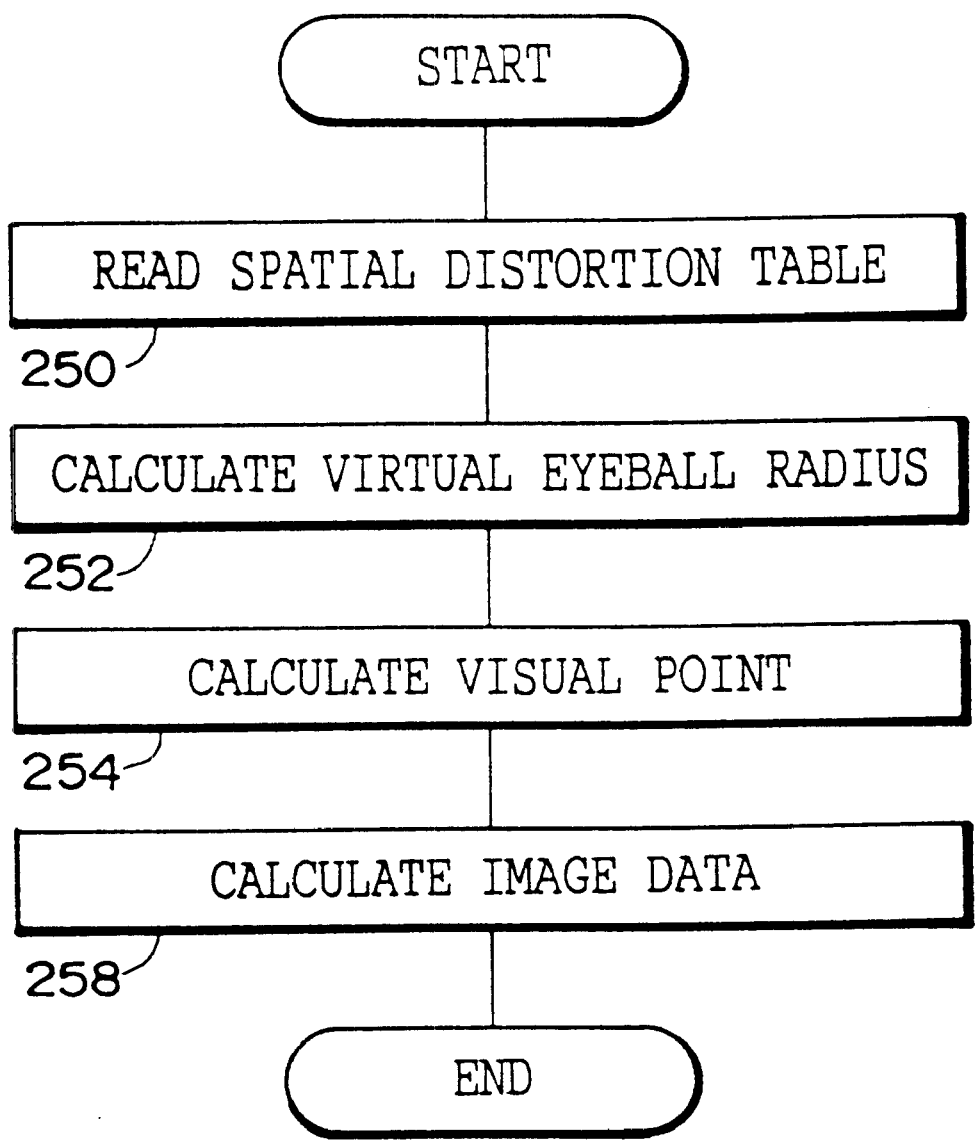
FIG. 27 is a flowchart illustrating the flow of fourth correction processing for allowing the virtual object to be perceived to be at a correct position for the operator.

As shown in FIG. 27, in the fourth distortion correction processing, the aforementioned spatial distortion table is read in Step 250, and a function h for determining a virtual eyeball radius is derived in an ensuing Step 252. In an ensuing Step 254, the position of the virtual visual point is determined by using the derived function h. In an ensuing Step 258, the image is calculated by using the position of the virtual visual point.

The aforementioned function h can be expressed by the following formula:

$$r = h(\alpha, \beta)$$

$$r = \frac{d(\alpha, \beta, y1) - d(\alpha, \beta, y2)}{2 \cdot \left[\cos\left(a\tan y \frac{2 \cdot 2}{d(\alpha, \beta, y2)}\right) - \cos\left(a\tan y \frac{1 \cdot 2}{d(\alpha, \beta, y1)}\right)\right]}$$

where, r: virtual eyeball radius y: depth distance to be perceived

α: sidelong glance angle in the vertical direction to be perceived (fixation point angle in the vertical direction)

β: sidelong glance angle in the horizontal direction to be perceived (fixation point angle in the horizontal direction)

d(α, β, y): correction value for the interpupillary distance in the data

In the aforementioned function h, virtual interpupillary distances d(α, β, y1) and d(α, β, y2) at two points y1 and y2 are required with respect to each (α, β), the virtual interpupillary distances d(α, β, y1) and d(α, β, y2) can be determined by the above-described processing (FIG. 26).

It should be noted that the aforementioned function h can be generalized if, with respect to the point (α0, β0, y0) serving as a reference, such a virtual interpupillary distance which makes r identical is used, or r is calculated in such a manner as to make the interpupillary distances identical.

Although, in the above, correction is effected separately for the respective angles in the vertical and horizontal directions, each of the angles may be merely replaced by an angle of deviation θ from the direction of the line of sight. By adopting this arrangement, the distortion correction function h can be simplified.

Figure 28:
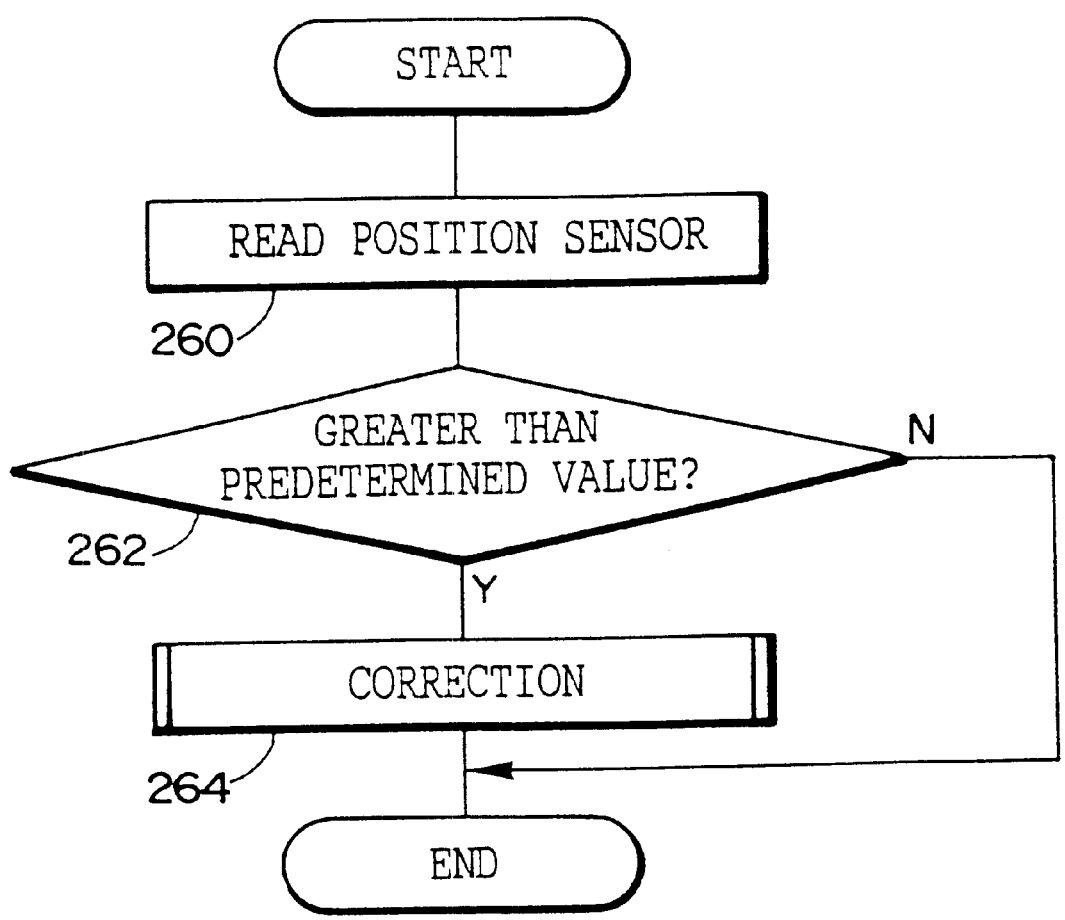
FIG. 28 is a flowchart illustrating the flow of correction processing while a fluttering sensation of the image is being reduced.

It is preferable that the above-described correction processing (Step 204 in FIG. 18) be constantly effected with respect to the display of stereoscopic images. However, since correction processing is effected in accordance with the follow-up of the visual point when real-time processing is made possible, there are cases where the virtual object flutters in the virtual space. To reduce such a fluttering sensation of the image, as shown in FIG. 28, preferably, after the position sensor is read in Step 260, and only when that value is greater than a predetermined value in Step 262, correction processing is effected in Step 264. By adopting such an arrangement, movement up to a value exceeding a predetermined value can be smoothed, and the sense of stability increases. Incidentally, correction may be provided with hysteresis.

Next, on considering that the distance from the visual point to the screen may have a bearing as a cause of the variation of the above-described perception characteristic, the present inventors conducted an experiment on the perception characteristic by varying the distance from the visual point to the screen. In the experiment, a virtual object at an identical presented distance was displayed in the virtual space at varying distances to the screen, and the relationship between the perceived position and the presented position was determined.

Figure 29:
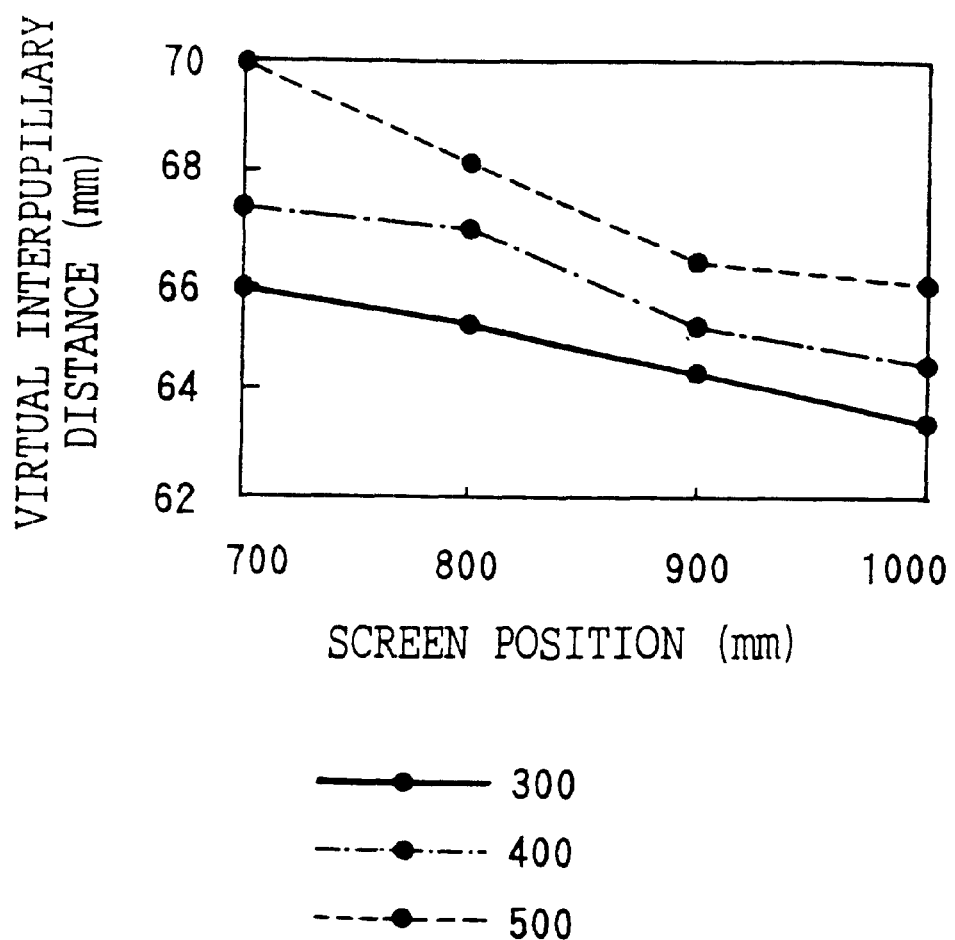
FIG. 29 is a graph illustrating the relationship between the screen position and a virtual interpupillary distance with respect to a plurality of different presented positions of the virtual object.

FIG. 29 shows the relationship between the screen position and the virtual interpupillary distance when the virtual object was presented to three presented positions (distances from the operator OP, i.e., presented distances) for three different operators OP by changing the screen position to four points. As can be appreciated from the drawing, in the case where the presented distance is fixed, the virtual interpupillary distance tends to decrease as the screen position moves farther away. On the other hand, the virtual interpupillary distance tends to increase as the presented distance increases regardless of the screen position.

Through the above-described experiment, by taking note of the fact that the perception characteristic of the operator OP in the perception of a virtual object displayed in the virtual space Vr is affected by the distance from the visual point to the screen, the present inventors obtained knowledge that correction which takes into consideration the distance from the visual point to the screen is necessary to allow the virtual object to be perceived to be at the correct position for the operators OP. Namely, when the operator views the virtual object, the head is not always stationary, so that if the head moves, the distance from the visual point to the screen changes. For this reason, by effecting correction which takes into consideration the distance from the visual point to the screen, it is possible to allow the operator to perceive the virtual object more accurately.

A description will be given of the aforementioned correction which takes into consideration the distance from the visual point to the screen (processing for correcting image data in Step 204 in FIG. 18).

Fifth distortion correction processing is similar to the above-described second distortion correction, the distance from the visual point to the screen is taken into account, and correction is effected by distorting the shape of the virtual object in correspondence with the distortion of the space.

As shown in FIG. 49, in the fifth distortion correction processing, the distance from the visual point to the screen is added as a parameter during the preparation of the aforementioned spatial distortion table. The spatial distortion table is read in Step 231, and a distortion correction function f'' for displaying the image by distorting the shape of the image in the virtual space, i.e., the correction function f'' for deforming the shape, is derived in an ensuing Step 233. In Step 237, the image is calculated by using the distortion correction function f'' thus derived. Namely, the shape is distorted by using the derived distortion correction function f'', and the image using that shape is generated. As a result, the perception error can be corrected.

The aforementioned distortion correction function f'' is expressed by the formula below. Namely, the distance from the visual point to the screen is added as a parameter to the aforementioned second distortion correction function f.

$$(y', \alpha', \beta', s') = f''(y, \alpha, \beta, s)$$

where, s: distance from the visual point to the screen s': distance from the visual point in the data to the screen Next, a description will be given of sixth distortion correction processing. The sixth correction processing is similar to the third distortion correction, the distance from the visual point to the screen is taken into account, the virtual interpupillary distance corresponding to the spatial distortion is determined, and a stereoscopic image is displayed at the position of that visual point.

Figure 30:
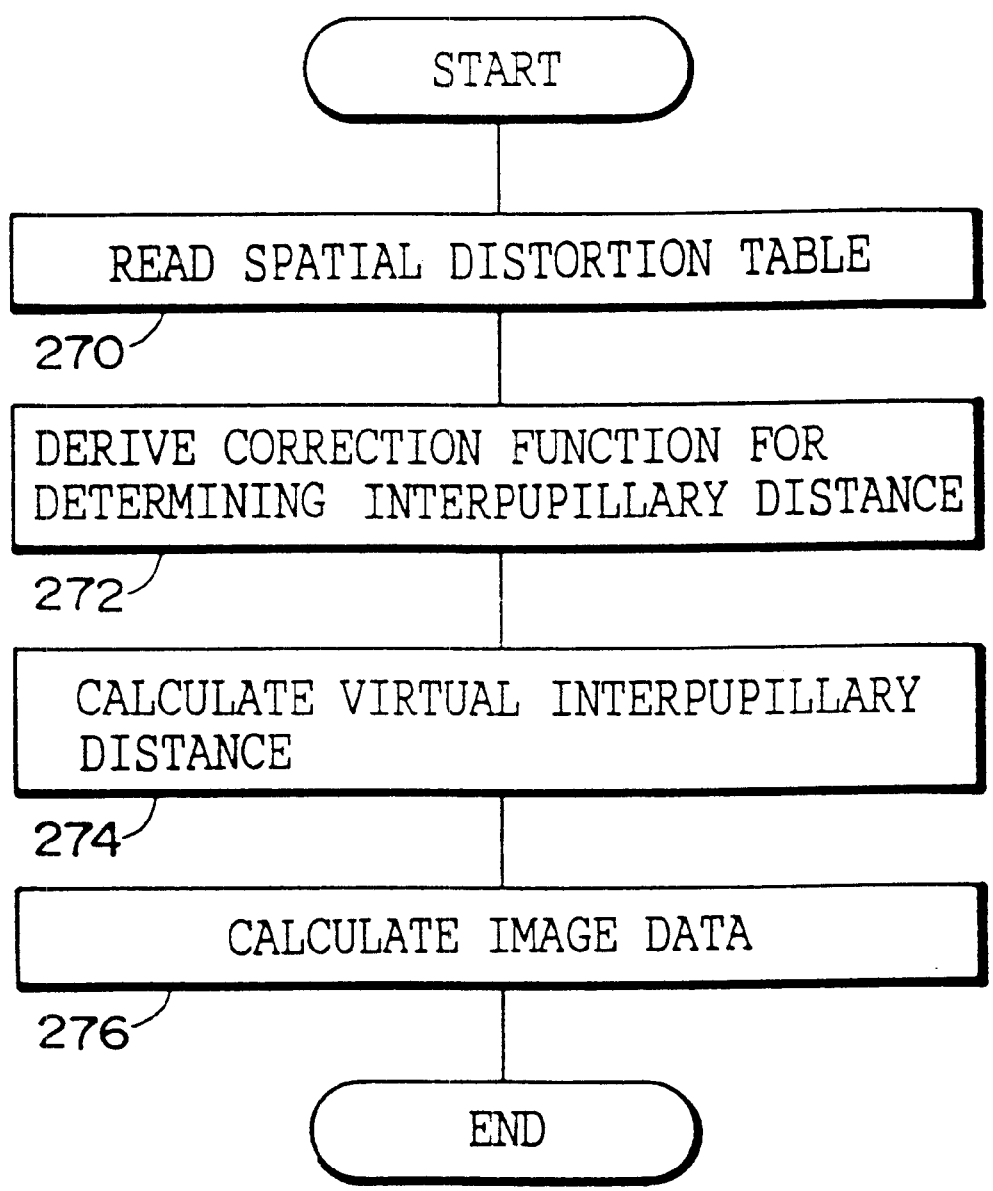
FIG. 30 is a flowchart illustrating the flow of sixth correction processing for allowing the virtual object to be perceived to be at a correct position for the operator.

As shown in FIG. 30, in the sixth distortion correction processing, the spatial distortion table is read in Step 270, and a correction function u (the details of which will be described later) for determining a virtual interpupillary distance PD' corresponding to the screen position s is derived in an ensuing Step 272. The corrected virtual interpupillary distance PD' is determined in Step 274. Then, correction is effected by using the virtual interpupillary distance PD' in an ensuing Step 276.

The aforementioned correction function u is expressed by the following formula:

$$PD' = u(x, PD, s)$$

where, x: depth distance (presented distance) of the virtual object to be perceived PD: interpupillary distance with respect to the presented distance s: screen position Specifically, first, the linear relationship between the virtual interpupillary distance and the presented distance can be expressed by the following formula:

$$PD_n(x, s) = \frac{PD_n(j, s) - PD_n(i, s)}{(j - i)} \cdot x + \frac{j \cdot PD_n(i, s) - i \cdot PD_n(j, s)}{(j - i)}$$

where, $PD_n(x, s)$: virtual interpupillary distance corresponding to the screen position n: number representing the operator x: presented distance for the operator $OP_n$ s: screen position i, j: presented distance $PD_n(i, s)$: virtual interpupillary distance at a presented distance i $PD_n(j, s)$: virtual interpupillary distance at a presented distance j In addition, as for the screen position, since the virtual interpupillary distance tends to become shorter as the screen position moves farther away as described above, regression analysis is performed with respect to the screen position and the presented distance on the basis of an experiment conducted in advance, a regression line shown below is determined, and approximation is obtained by using this regression line.

$$PD_n(i, s) = a_{nk} \cdot s + b_{nk}$$

where, $a_{nk}$: gradient of the regression line at a presented distance k $b_{nk}$: segment of the regression line at the presented distance k In this embodiment, gradients $a_{n300}$ and $a_{n500}$ and segments $b_{n300}$ and $b_{n500}$ of the regression line are determined with respect to the operator $OP_n$ by using two presented distances (i=300 mm, j=500 mm) as references, and are substituted into the formula of the regression line, thereby determining virtual interpupillary distances $PD_n(300, s)$ and $PD_n(500, s)$ at an arbitrary screen position s. The determined values are substituted into the above formula representing the linear relationship between the virtual interpupillary distance and the presented distance, thereby determining the virtual interpupillary distance $PD_n(x, s)$ corresponding to each presented distance x and each screen position s. Incidentally, in this embodiment, eight virtual interpupillary distances were measured with respect to each operator.

FIGS. 31A and 31B show the results of determination of the relationship between the deviation of the perceived distance and the presented distance. FIG. 31A shows the case in which measurement was made by fixing the virtual interpupillary distance, while FIG. 31B shows the case in which measurement was made with respect to the virtual object which was presented on the basis of the virtual interpupillary distance determined by applying the aforementioned correction formula. As can be appreciated from FIGS. 31A and 31B, by correcting the virtual interpupillary distance by taking into consideration the distance from the visual point to the screen, the deviation of the perceived distance was mitigated irrespective of the presented distance, and the virtual object could be perceived at a substantially accurate position.

FIGS. 32A and 32B show the results of determination of the relationship between the deviation of the perceived distance and the screen position. FIG. 32A shows the case in which measurement was made by fixing the virtual interpupillary distance, while FIG. 32B shows the case in which measurement was made of the virtual object which was presented on the basis of the virtual interpupillary distance determined by applying the aforementioned correction formula. As can be appreciated from FIGS. 32A and 32B, by correcting the virtual interpupillary distance by taking into consideration the distance from the visual point to the screen, the deviation of the perceived distance was mitigated irrespective of the screen position, and the virtual object could be perceived at a substantially accurate position.

In addition, as seventh distortion correction processing, although illustration will be omitted, when the eyeball radius is determined in the above-described fourth distortion correction processing, the distance from the visual point to the screen may be taken into account, and the eyeball radius may be redetermined in correspondence with the distance from the visual point to the screen.

Second Embodiment

Next, a description will be given of a second embodiment of the present invention. Although in the above-described embodiment a description has been given of the case in which a stereoscopic image is presented to a single operator, in this embodiment the present invention is applied to a case in which a stereoscopic image is presented to a plurality of operators. It should be noted that in this embodiment, in order to present a stereoscopic image to a plurality of operators, operators to whom the stereoscopic image should be preferentially presented for each predetermined time duration are set, and the stereoscopic image is displayed. Since this embodiment has an arrangement substantially similar to that of the above-described embodiment, identical portions will be denoted by the same reference numerals, and a detailed description thereof will be omitted.

Figure 34:
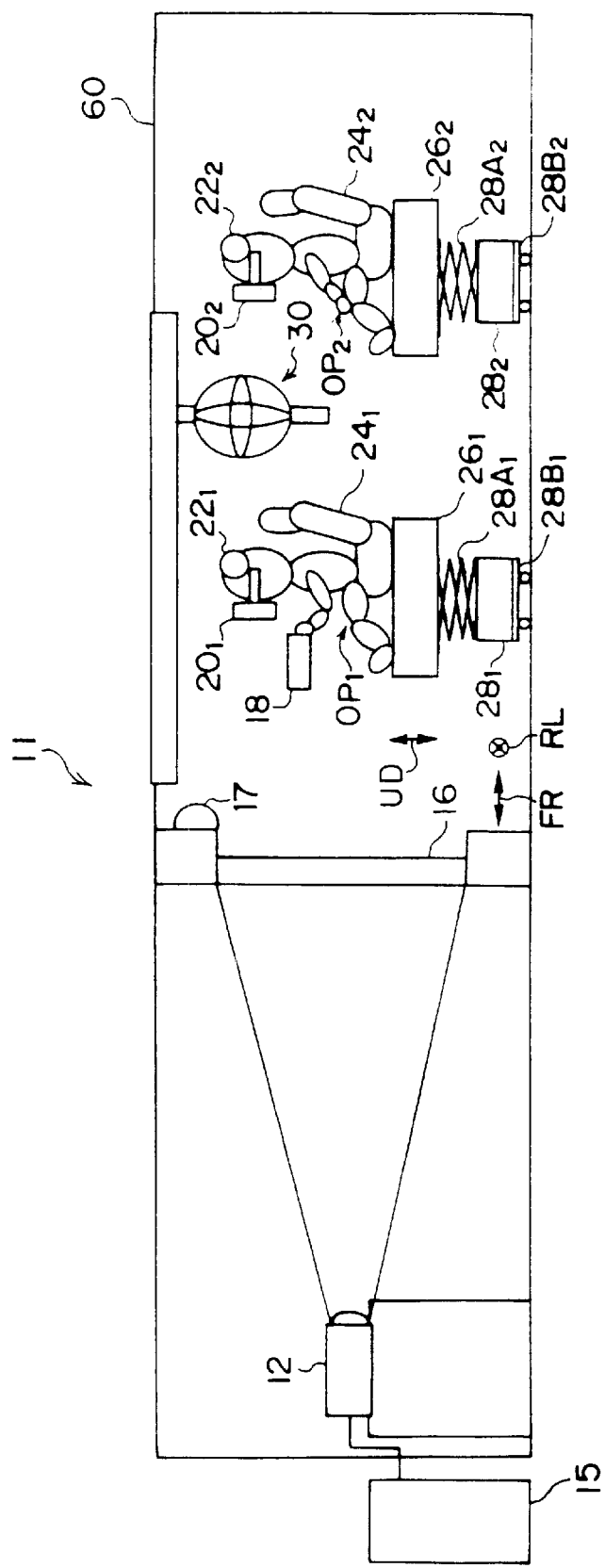
FIG. 34 is a schematic diagram illustrating the configuration of the stereoscopic image display apparatus in accordance with a second embodiment of the present invention.

As shown in FIG. 34, a stereoscopic image display apparatus 11 in accordance with this embodiment is provided with the projector 12 for projecting an image onto the screen 16 in the darkroom 60. The projector 12 is connected to a controller 15 for generating an image for stereoscopic display. An infrared transmitter 17 for transmitting infrared rays toward the operator located downstream of the screen 16 is mounted above the screen 16. A plurality of (in this embodiment, two) seats $24_1$, and $24_2$ in which a plurality of (in this embodiment, two) operators $OP_1$, and $OP_2$ are seated are consecutively located on the projection side of the projector 12 and downstream of the screen 16. It should be noted that, in the following description, when no particular operator is designated among the plurality of operators, and a description is generally given of an operator, such an operator will be referred to as the operator OP.

The seat $24_1$ in which the operator $OP_1$ is seated is mounted on a pedestal $26_1$, and this pedestal $26_1$ is connected to a motor $28_1$ via a bellows $28A_1$. The motor $28_1$ is fixed to a cart $28B_1$ which is movable on the floor in predetermined directions (in the direction of arrow FR in FIG. 34 as a back-and-forth direction, and in the direction of arrow RL in FIG. 34 as a left-and-right direction), and the bellows $28A_1$ is extended or contracted as the motor $28_1$ is driven. As the bellows $28A_1$ is extended or contracted, the pedestal $26_1$ is moved in the vertical direction (in the direction of arrow UD in FIG. 34), so that the operator $OP_1$ seated in the seat $24_1$ is raised or lowered. The raising or lowering of the operator $OP_1$ seated in the seat $24_1$ is used for adjustment of the vehicle height corresponding to the type of vehicle.

Similarly, the seat $24_2$ in which the operator $OP_2$ is seated is mounted on a pedestal $26_2$, and this pedestal $26_2$ is connected to a motor $28_2$ via a bellows $28A_2$. The motor $28_2$ is fixed to a cart $28B_2$ which is movable on the floor. As the motor $28_2$ is driven, the bellows $28A_2$ is extended or contracted, which in turn causes the pedestal $26_2$ to move in the vertical direction, so that the operator $OP_2$ seated in the seat $24_2$ is raised or lowered.

Incidentally, if it is assumed that the position of the operator $OP_1$ is a driver seat, the position of the operator $OP_2$ seated in this seat $24_2$ can be set in correspondence with the position of a front passenger seat or a rear seat corresponding to the type of vehicle by moving the pedestal $26_2$. As a result, the positional relationship between the operators $OP_1$ and $OP_2$ can be made to correspond to the seating positions in the vehicle corresponding to the type of vehicle.

The operator $OP_1$ has the position input device 18 for inputting position coordinates and the like. A pair of liquid-crystal shutter eyeglasses $20_1$ is mounted on the head of the operator $OP_1$, and this liquid-crystal shutter eyeglasses $20_1$ is provided with a position sensor $22_1$. The position sensor $22_1$ is a magnetic field detection sensor which detects a magnetic field generated by the magnetic field generator 30 disposed behind the operator $OP_1$ so as to detect the three-dimensional coordinates where the position sensor $22_1$ is located as well as the direction thereof.

Similarly, a pair of liquid-crystal shutter eyeglasses $20_2$ is mounted on the head of the operator $OP_2$, and this liquid-crystal shutter eyeglasses $20_2$ is provided with a position sensor $22_2$. The position sensor $22_2$ is a magnetic field detection sensor which is similar to the position sensor $22_1$.

As shown in FIG. 37, the liquid-crystal shutter eyeglasses $20_1$ are worn by the operator $OP_1$ and are comprised of a right arm 21R, a frame 23R for the right eye, a frame 23L for the left eye, and a left arm 21L. A liquid-crystal shutter 25R for the right eye is attached to the frame 23R for the right eye, while a liquid-crystal shutter 25L for the left eye is attached to the frame 23L for the left eye. An infrared receiver 27 is provided between the frame 23R for the right eye and the frame 23L for the left eye. Further, LEDs 29 and 31 are provided on the left arm 21L. The LED 29 is lit up when the operator $OP_1$ is a preferential viewer, while the LED 31 is lit up when a signal is received by the infrared receiver 27 (a detailed description will be given later). The infrared receiver 27 is connected to the LEDs 29 and 31 and to an unillustrated receiving unit which incorporates a microcomputer and receives the infrared rays received by the infrared receiver 27.

Incidentally, since the liquid-crystal shutter eyeglasses $20_2$ are worn by the operator $OP_2$ is arranged in a manner similar to that of the liquid-crystal shutter eyeglasses $20_1$ worn by the operator $OP_1$, a detailed description thereof will be omitted.

Figure 35:
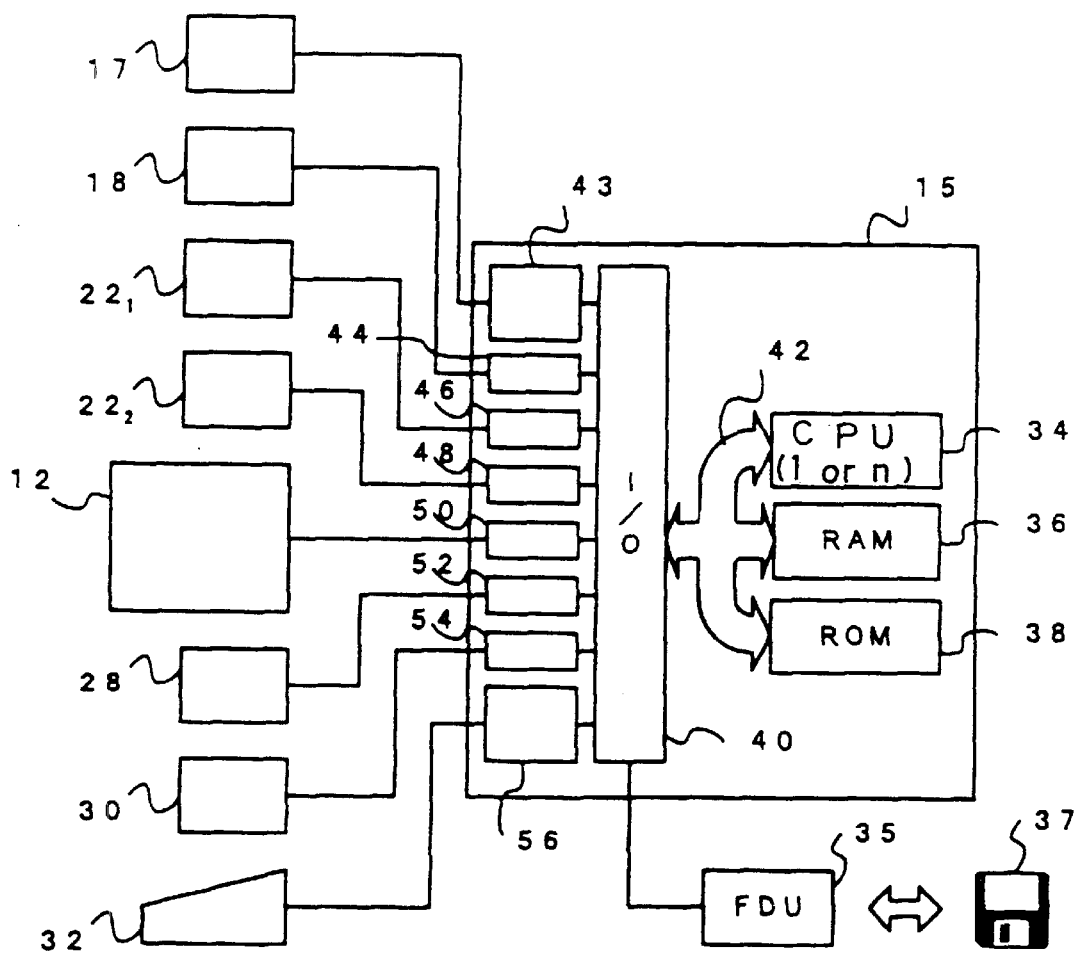
FIG. 35 is a block diagram illustrating the schematic configuration of the controller of the stereoscopic image display apparatus in accordance with the second embodiment of the present invention.

As shown in FIG. 35, the controller 15 is constituted by a microcomputer which is comprised of a CPU 34, a RAM 36, a ROM 38, and an input/output port 40, all of which may be singular or plural. The respective units of the microcomputer are connected to each other by the bus 42 to allow various commands and data to be transmitted or received. The infrared transmitter 17 is connected to the input/output port 40 via a driver 43, and the position input device 18 is also connected thereto via the driver 44. The position sensor $22_1$ for the operator $OP_1$ and the position sensor $22_2$ for the operator $OP_2$ are also connected to the input/output port 40 via the driver 46 and the driver 48, respectively. The projector 12 is also connected to the input/output port 40 via the driver 50. The motor 28 and the magnetic field generator 30 are also connected to the input/output port 40 via the driver 52 and the driver 54, respectively. The keyboard 32 is also connected to the input/output port 40 via the driver 56. Further, a processing routine which will be described later is stored in the ROM 38.

The floppy disk unit (FDU) 35, into which the floppy disk 37 as a recording medium can be removably inserted, is also connected to the input/output port 40. Incidentally, the processing routine, which will be described later, can be read from and written on the floppy disk 37 by using the FDU 35. Accordingly, the processing routine which will be described later may be recorded in advance on the floppy disk 37 without being stored in the ROM 38, and the processing program recorded on the floppy disk 37 may be executed via the FDU 35. In addition, a large-capacity storage device (not shown) such as a hard disk may be connected to the controller 15, and the processing program recorded on the floppy disk 37 may be stored (installed) in the large-capacity storage device (not shown). Further, as the recording medium, it is also possible to use an optical disk such as a CD-ROM, or magneto-optic disk such as an MD or MO, and when such a recording medium is used, it suffices if a CD-ROM device, an MD device, an MO device, or the like is used in place of or in addition to the FDU 35.

It should be noted that since the position input device in this embodiment is similar to that of the above-described first embodiment, a description thereof will be omitted.

Next, a description will be given of the operation in accordance with this embodiment.

Figure 36:
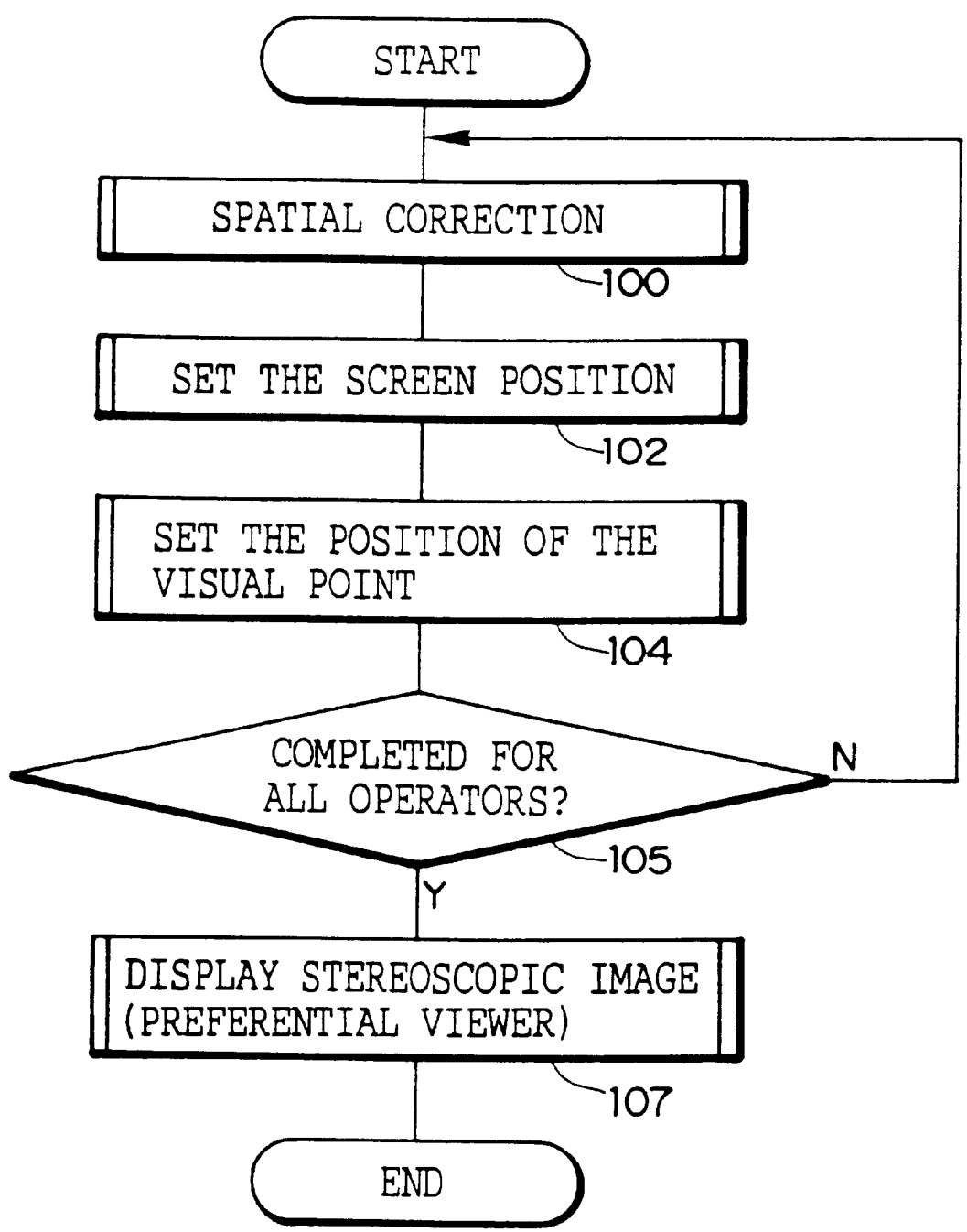
FIG. 36 is a flowchart illustrating the flow of processing for displaying a stereoscopic image in the stereoscopic image display apparatus.

When the power supply for the stereoscopic image display apparatus 11 is turned on, the processing routine shown in FIG. 36 is executed by the controller 15. First, with respect to the operator $OP_1$, space correction processing is performed for correcting an error between the space of actual space and the position of space which has been detected by the position sensor and can serve as a virtual space in the same way as in the above-described first embodiment (Step 100). Then, processing for setting the screen position is performed for accurately ascertaining the three-dimensional position of an image which is displayed on the screen 16 (Step 102), and processing for setting the position of a visual point is performed for setting the position of an actual visual point of the operator $OP_1$ (Step 104). In an ensuing Step 105, a determination is made as to whether or not the above processing has been completed for all the operators. In the above, since processing has been performed only for the operator $OP_1$, NO is given as the answer in Step 105, and the operation returns to Step 100 to repeat the same processing as described above with respect to the operator $OP_2$. Then, the operation proceeds to Step 107 in which a preferential viewer who is to be a subject for viewing the stereoscopic image is set among the plurality of (in this embodiment, two) operators set as described above, and a stereoscopic image is displayed for the preferential viewer in the virtual space subjected to spatial correction by adopting the screen position and the position of the visual point of the preferential viewer which have been set as described above.

Next, a description will be given of the details of the processing for displaying a stereoscopic image in Step 107 shown in FIG. 36. Upon completion of the settings for the operators in Steps 100 to 105 above, a stereoscopic image is displayed as described below.

Figure 38:
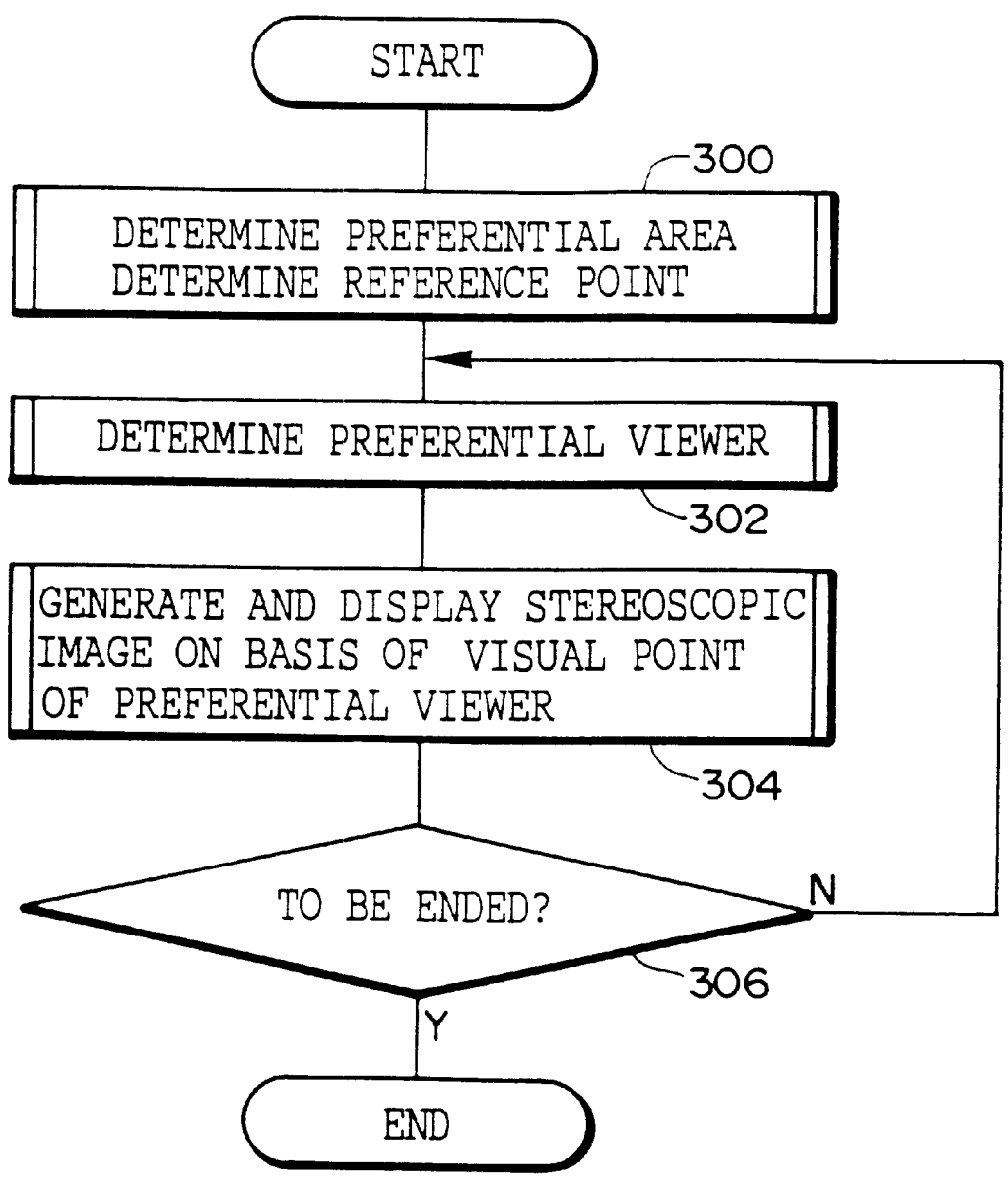
FIG. 38 is a flowchart illustrating the flow of processing for displaying a stereoscopic image in accordance with the second embodiment.

In this embodiment, a preferential viewer is set for each predetermined time duration of the display of a stereoscopic image, and the stereoscopic image is displayed. When the processing for displaying a stereoscopic image is started, the processing routine for displaying a stereoscopic image shown in FIG. 38 is executed. First, in Step 300 in FIG. 38, a reference point serving as a reference at the time of displaying a stereoscopic image is set, and a preferential area for determining the operator who is to be the subject among the plurality of operators is set. In an ensuing Step 302, a preferential viewer who is to be the subject for viewing the stereoscopic image is determined among the plurality of operators by using the set reference point and the preferential area. In an ensuing Step 304, a stereoscopic image based on the visual point of the preferential viewer is generated and displayed. Then, a determination is made in Step 306 as to whether or not an instruction for ending has been given. If the displaying of the image is to be continued, NO is given as the answer in Step 306, and the operation returns to Step 302 to repeat the above-described processing. If the displaying of the image is to be ended, YES is given as the answer in Step 306, and this routine ends.

Since the preferential viewer who is to be the subject for viewing the stereoscopic image is determined among the plurality of operators, and the stereoscopic image based on the visual point of the preferential viewer is generated and displayed, the stereoscopic image can be presented to not only a single operator but a plurality of operators.

Next, a description will be given of the details of the aforementioned processing for setting the reference point and the preferential area (Step 300 in FIG. 38). First, a description will be given of first processing for setting a reference area in which the reference point and the preferential area are set by assuming an occupant seated in the driver seat of the vehicle and by using that occupant as a reference.

Figure 39:
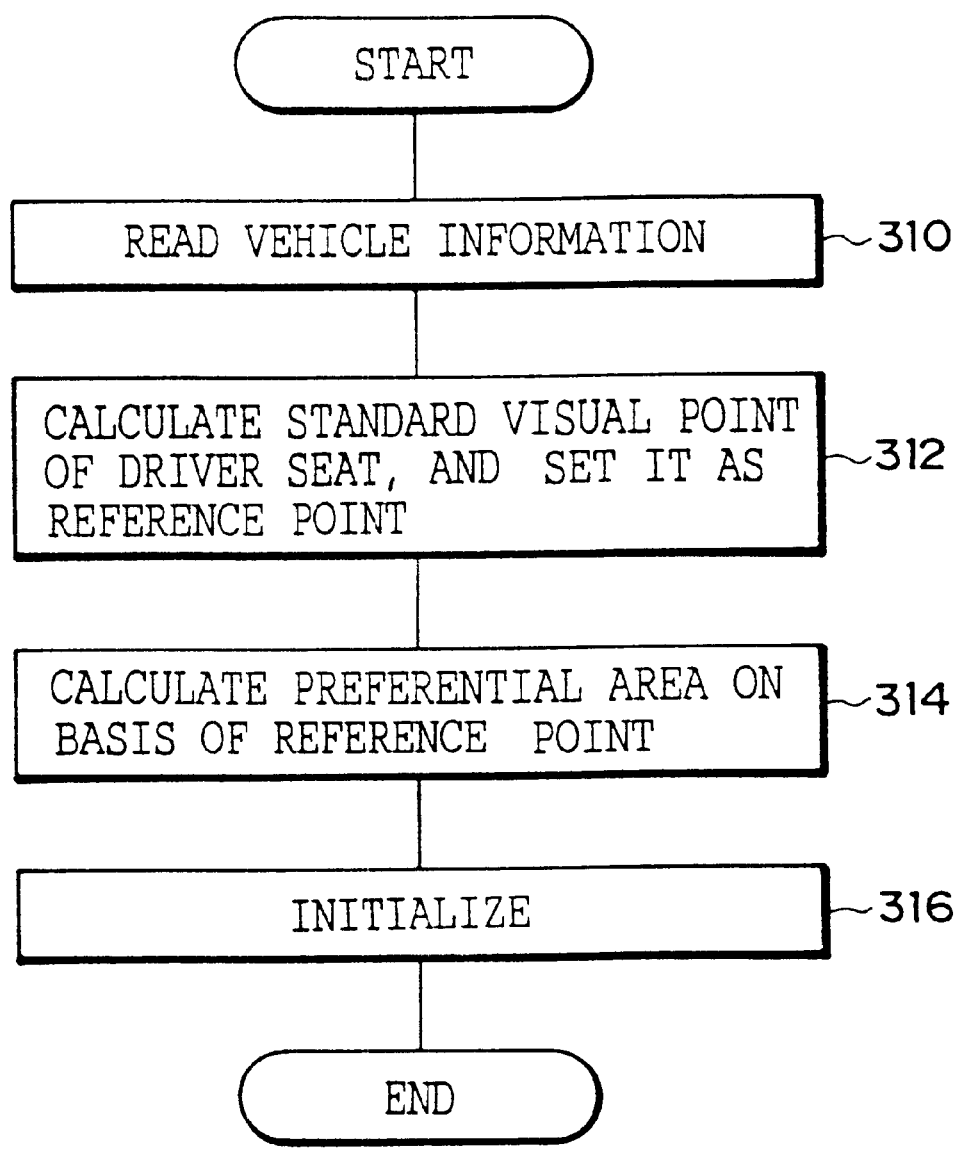
FIG. 39 is a flowchart illustrating the flow of first processing for setting a reference area, which is the detail of Step 300 in FIG. 38.

When the first processing for setting a reference area, i.e., the processing for setting the reference point and the preferential area, is started, the setting processing routine shown in FIG. 39 is executed, and the operation proceeds to Step 310.

In Step 310, vehicle information is read, including the positions of seats such as the driver seat and passenger seats of the vehicle, the distance between the seats, the overall vehicle length, the vehicle width, and the vehicle height. In an ensuing Step 312, a standard visual point at the time when an occupant of a standard physique is seated in the driver seat of the vehicle is calculated by using the vehicle information which has been read, and that standard visual point is set as a reference point Po. In an ensuing Step 314, a preferential area is determined from the reference point set as described above. A space from the reference point to a fixed distance, a space based on a shape derived by a predetermined function, or a space based on a predetermined shape including the reference point may be determined as this preferential area. In an ensuing Step 316, since the reference point and the preferential area have been set, to enable the setting of a preferential viewer in the subsequent processing, the preferential viewer is initialized (reset), and this routine ends.

Thus, in the first processing for setting a reference area, since the standard visual point for an occupant in the driver seat of the vehicle is set as the reference point Po, and the preferential area is determined on the basis of that reference point, a stereoscopic image concerning the vicinity of the driver seat of the vehicle, i.e., a stereoscopic image to be presented to the occupant (driver) seated in the driver seat, can be presented to a plurality of operators.

Next, a description will be given of second processing for setting a reference area. The second processing for setting a reference area is processing in which a tentative preferential viewer is set among a plurality of operators, and the reference point and the preferential area are set by using the visual point of the tentative preferential viewer as a reference.

Figure 40:
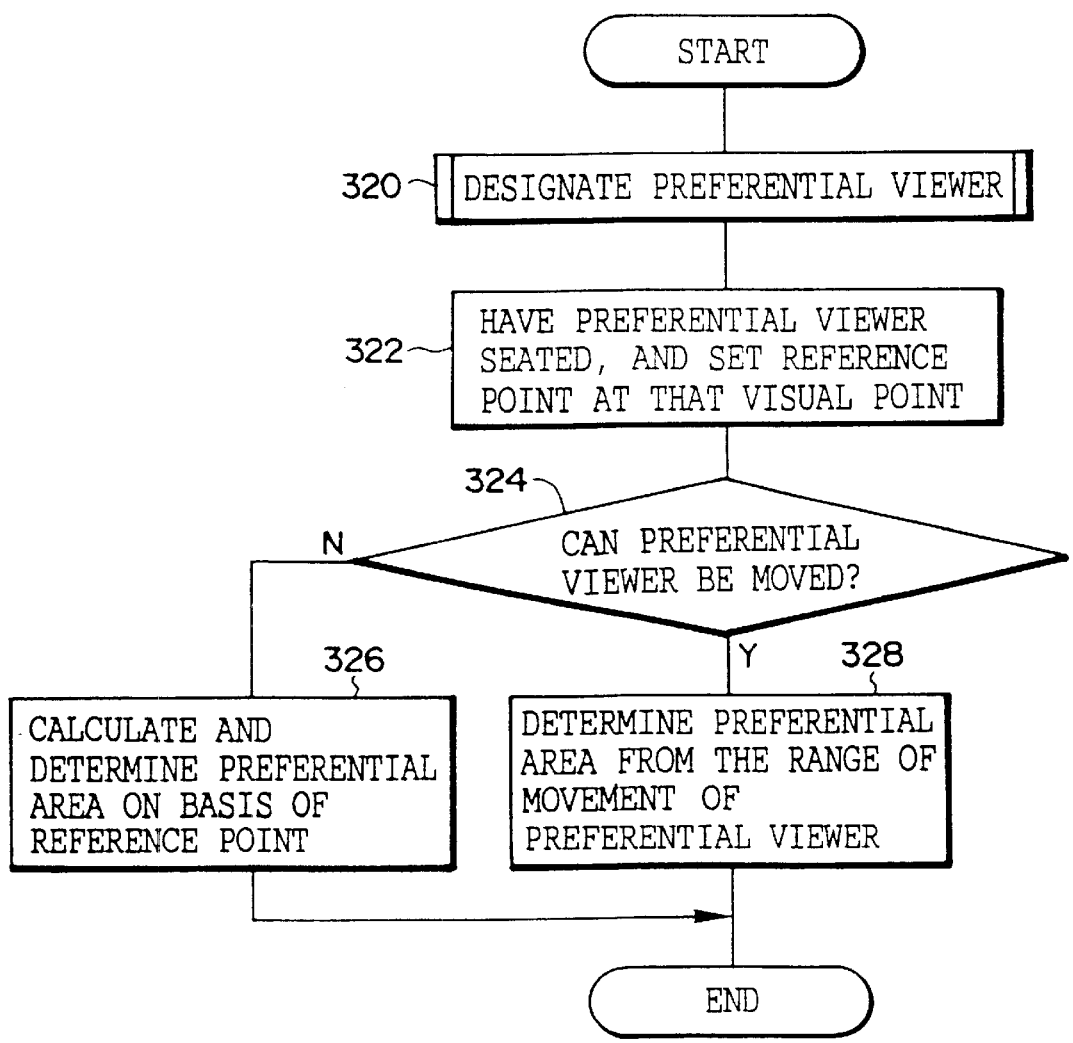
FIG. 40 is a flowchart illustrating the flow of second processing for setting a reference area, which is the detail of Step 300 in FIG. 38.

When the second processing for setting a reference area is started, the setting processing routine shown in FIG. 40 is executed, and the operation proceeds to Step 320.

In Step 320, a tentative preferential viewer is designated. In the designation of the tentative preferential viewer, any operator may be inputted as the preferential viewer when the processing is started or at the time of execution of Step 320, or a predetermined operator may be set as the preferential viewer. When the tentative preferential viewer has been set, data transmission using infrared rays is carried out from the infrared transmitter 17 toward the liquid-crystal shutter eyeglasses worn by the respective operators, the LED 29 on the liquid-crystal shutter eyeglasses (in this embodiment, either $20_1$ or $20_2$) of the tentative preferential viewer is lit up, thereby informing the other operators that the relevant operator is the preferential viewer. It should be noted that, in the data transmission from the infrared transmitter 17, the infrared receiver 27 receives the signal, and the LED 31 is lit to inform that the data is being received. Incidentally, in the setting of the tentative preferential viewer in Step 320, the preferential viewer may be determined in the processing (FIGS. 41 to 43) the details of which will be described later.

In an ensuing Step 322, the tentative preferential viewer set as described above is seated in the seat, and the visual point based on the seated position is set as the reference point Po. In the setting of the visual point based on the seated position, the magnetic field generated from the magnetic field generator 30 can be detected by the position sensor ($22_1$ or $22_2$) of the set tentative preferential viewer, and the visual point can be determined and set by detecting the three-dimensional coordinates where the position sensor is located as well as its direction.

Although the setting of the reference point in the second processing for setting a reference area is completed in the above-described manner, it is necessary to determine the preferential area on the basis of that reference point. In the second processing for setting a reference area, the determination of a predetermined preferential area on the basis of the reference point and the setting of the preferential area by designation of a tentative preferential viewer are effected as described below.

In an ensuing Step 324, to determine whether or not the preferential area is to be set by designation of a tentative preferential viewer, a determination is made as to whether or not the designated preferential viewer is to be moved. A value for this decision is set in advance by a flag or the like at the start of processing, and the decision is made by determining the value of the reading of the flag or the like. When a predetermined preferential area is to be determined on the basis of the reference point, it is unnecessary to move the preferential viewer, so that NO is given as the answer in Step 324. In an ensuing Step 326, in the same way as in Step 314 above, the preferential area is determined on the basis of such as a space based on a fixed distance from the reference point or derived by a predetermined function.

On the other hand, when the preferential area is to be set by designation of a tentative preferential viewer, it is necessary to move the preferential viewer, so that YES is given as the answer in Step 324. In an ensuing Step 328, the movement of the preferential viewer is designated, and the preferential area is determined on the basis of the range of movement. This range of movement includes one's own allowable range for changing the attitude when the preferential viewer is seated and an allowable range for presenting a stereoscopic image for the preferential viewer to the other operators. Incidentally, when the preferential area is determined on the basis of the range of movement, the range of movement of the position sensor ($22_1$ or $22_2$) of the preferential viewer may be detected from the magnetic field generated from the magnetic field generator 30, and a space to a fixed distance from that range or a space based on a shape derived from a predetermined function may be determined as the preferential area.

Thus, in the second processing for setting a reference area, since the visual point of a designated operator among the plurality of operators is set as the reference point Po, and the preferential area is determined on the basis of that reference point, or the preferential area is determined on the basis of the range of movement of the operator, a stereoscopic image in which the vicinity of an arbitrary seat position where the operator is located or a position in and outside the vehicle which is maintained by the operator is set as the visual point can be presented to a plurality of operators.

Next, a description will be given of the details of processing (Step 302 in FIG. 38) for setting a preferential viewer who is to be the subject for viewing the stereoscopic image among the plurality of operators by using the reference point and preferential area set as described above.

When the preferential area set on the basis of the reference point has been determined, there is essentially a high possibility that the operator who reaches by a shortest distance the reference point serving as the reference for displaying the stereoscopic image can be the preferential viewer among the plurality of operators. Accordingly, in first processing for setting a preferential viewer, the preferential viewer is set on the basis of the distance to the reference point when a plurality of operators are present.

Figure 41:
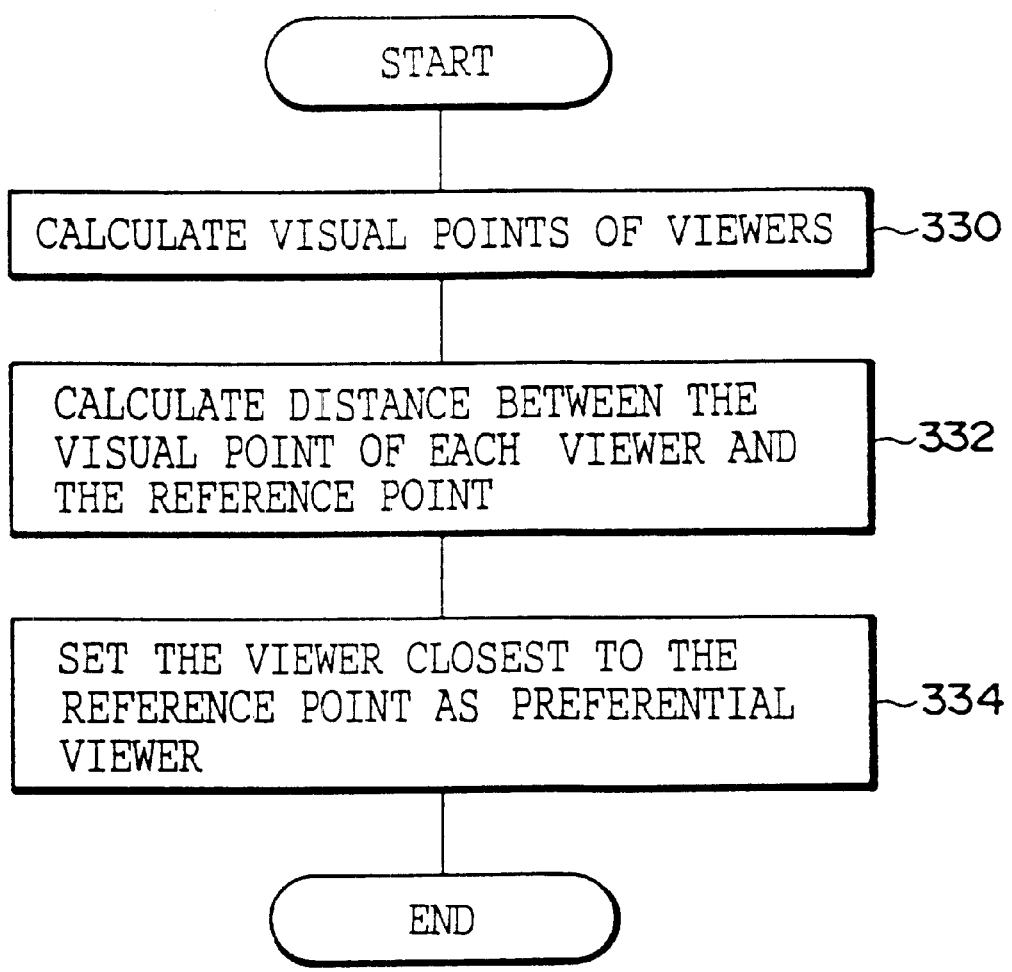
FIG. 41 is a flowchart illustrating the flow of first processing for setting a preferential viewer, which is the detail of Step 302 in FIG. 38.

When the first processing for setting a preferential viewer is executed, the operation proceeds to Step 330 in FIG. 41, and the visual points of the respective operators are determined. In an ensuing Step 332, distances from the visual points of the operators to the reference point are determined. As for the visual points of the operators, the magnetic field generated from the magnetic field generator 30 can be detected by the position sensor (in this embodiment, the position sensor 22$_2$ or 22$_2$) of each operator, and the visual point can be determined by detecting the three-dimensional coordinates where the position sensor is located as well as its direction. In an ensuing Step 334, the operator with the shortest distance among the distances determined in Step 332, i.e., the operator who is closest to the reference point, is set as the preferential viewer.

For instance, as shown in FIG. 44A, when operators $P_1$ and $P_2$ are outside the preferential area designated at Area, the distances from the operators $P_1$ and $P_2$ to the reference point Po are respectively $L_1$ and $L_2$ ($L_1<L_2$), so that the operator $P_1$ is set as the preferential viewer. Meanwhile, as shown in FIG. 44B, when operators $P_3$ and $P_4$ are inside the preferential area designated at Area, the distances from the operators $P_3$ and $P_4$ to the reference point Po are respectively $L_3$ and $L_4$ ($L_3>L_4$), so that the operator $P_4$ is set as the preferential viewer. Incidentally, the same holds true of a case where a plurality of operators are dispersed in and outside the preferential area designated at Area, and the operator whose distance to the reference point is shortest is set as the preferential viewer.

Thus, since the operator whose distance to the reference point is shortest is set as the preferential viewer, it is easily possible to set the preferential viewer among the plurality of operators.

Although, in the first processing for setting a preferential viewer, the operator whose distance to the reference point is shortest is set as the preferential viewer, the preferential viewer cannot be set in a case where a plurality of operators with identical distances are present. Accordingly, in second processing for setting a preferential viewer, the operator whose distance to the preferential area is shortest is set as the preferential viewer.

Figure 42:
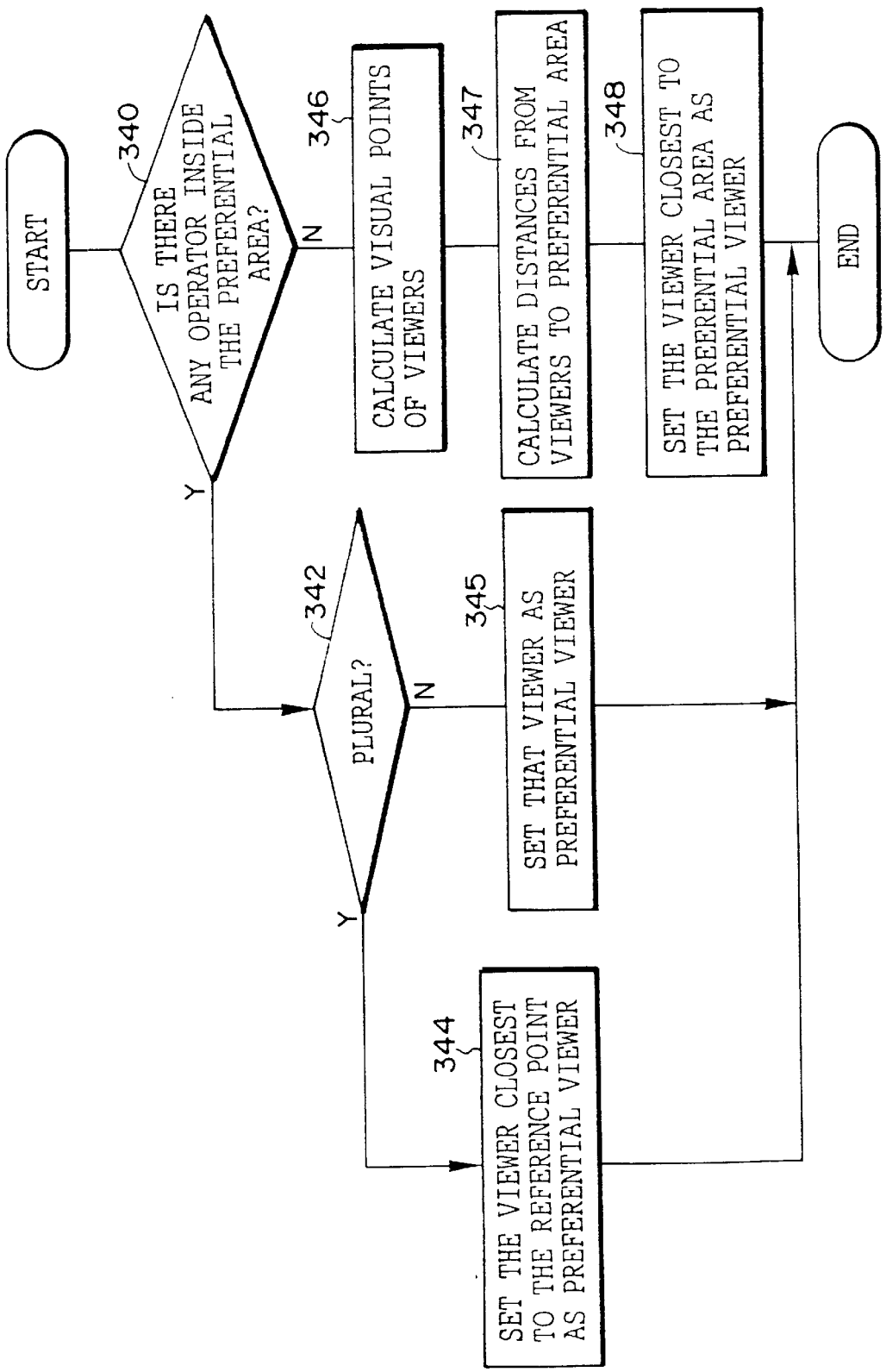
FIG. 42 is a flowchart illustrating the flow of second processing for setting a preferential viewer, which is the detail of Step 302 in FIG. 38.

When the second processing for setting a preferential viewer is executed, the operation proceeds to Step 340 in FIG. 42, and a determination is made as to whether or not there is any operator inside the preferential area. If there is no operator inside the preferential area, NO is given as the answer in Step 340, and the operation proceeds to Step 346. In Step 346, the visual points of the operators are determined in the same way as in Step 330 above, and the distances from the operators to the preferential area are determined in an ensuing Step 347. In an ensuing Step 348, the operator with the shortest distance among the distances determined in Step 347, i.e., the operator who is closest to the preferential area, is set as the preferential viewer.

On the other hand, when any operator is present inside the preferential area, YES is given as the answer in Step 340, and the operation proceeds to Step 342 to determine whether or not the number of operators present is plural. If the number is singular, NO is given as the answer in Step 342, and that operator is set as the preferential viewer in Step 345. If the number is plural, YES is given as the answer in Step 342, and the operator whose distance to the reference point is shortest is set as the preferential viewer in Step 344.

Incidentally, in the processing in Step 344, it suffices if, in the same way as in Steps 330 to 334 in the first processing for setting a preferential viewer (FIG. 41), the visual points of the operators and the distances from the operators' visual points to the reference point are determined, and the operator with the shortest distance, i.e., the operator closest to the reference point, is set as the preferential viewer.

For instance, as shown in FIG. 44C, when operators $P_5$ and $P_6$ are outside the preferential area designated at Area, the shortest distances from the operators $P_5$ and $P_6$ to the preferential area designated at Area are respectively $L_5$ and $L_6$ ($L_5<L_6$), so that the operator $P_5$ is set as the preferential viewer. Meanwhile, as shown in FIG. 44D, when operators $P_7$ and $P_8$ are outside the preferential area designated at Area but their distances to the reference point are identical, the shortest distances from the operators $P_7$ and $P_8$ to the preferential area are respectively $L_7$ and $L_8$ ($L_7>L_8$), so that the operator $P_8$ is set as the preferential viewer.

Thus, even if there are a plurality of operators who are located outside the preferential area and whose distances to the reference point are identical, since the operator whose distance to the preferential area is shortest is set as the preferential viewer, the preferential viewer can be set in correspondence with the size and shape of the preferential area, and it is easily possible to set the preferential viewer among the plurality of operators.

In the above-described second processing for setting a preferential viewer, even if the plurality of operators outside the preferential area have identical distances to the reference point, it is possible to set the preferential viewer, but the preferential viewer cannot be set if a plurality of operators are present inside the preferential area. Accordingly, in third processing for setting a preferential viewer, the operator whose distance for movement from inside the preferential area to outside the preferential area is set as the preferential viewer. Incidentally, since the third processing for setting a preferential viewer is substantially similar to the second processing for setting a preferential viewer, identical portions will be denoted by the same reference numerals, and a detailed description thereof will be omitted.

Figure 43:
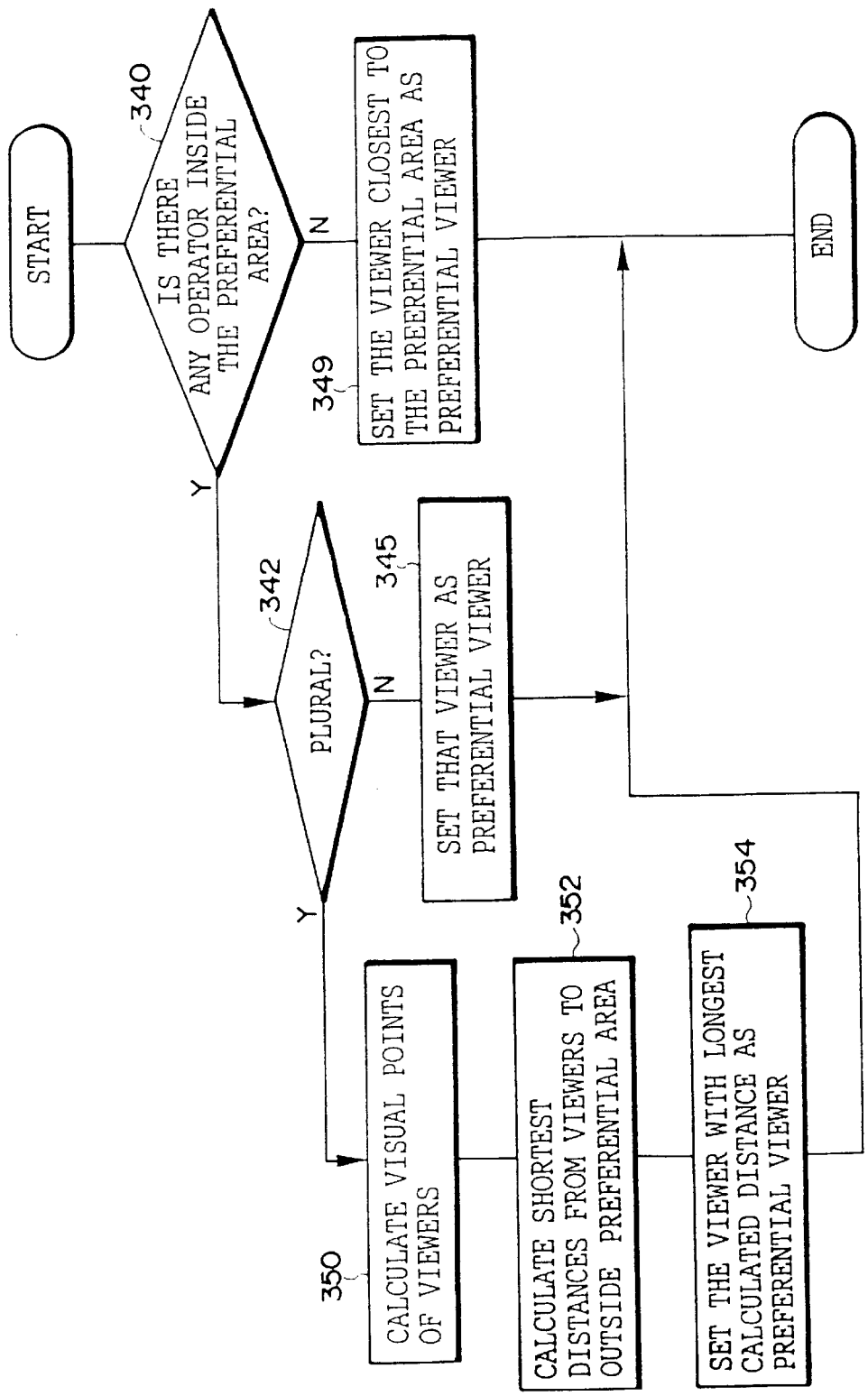
FIG. 43 is a flowchart illustrating the flow of third processing for setting a preferential viewer, which is the detail of Step 302 in FIG. 38.

When the third processing for setting a preferential viewer is executed, the processing routine shown in FIG. 43 is executed. First, a determination is made as to whether or not there is any operator inside the preferential area (Step 340), and when the operator is not present (NO is the answer), in Step 349, the visual points of the operators and distances to the preferential area are determined in a manner similar to Steps 346 to 348 in FIG. 42, and the operator who is closest to the preferential area is set as the preferential viewer.

On the other hand, if there is only one operator inside the preferential area (YES in Step 340 and NO in Step 342), that operator is set as the preferential viewer (Step 345). If a plurality of operators are present inside the preferential area (YES in Steps 340 and 342), the operation proceeds to Step 350 to determine the operators' visual points in the same way as in Step 330 above. Then, in Step 352, the shortest distances for the respective operators to move to outside the preferential area are determined. In an ensuing Step 354, the operator with the longest distance among the distances determined in Step 352, i.e., the operator who is most difficult to move to outside the preferential area, is set as the preferential viewer.

As shown in FIG. 44E, when operators $P_9$ and $P_{10}$ are outside the preferential area designated at Area, the shortest distances from the operators $P_9$ and $P_{10}$ to the preferential area designated at Area are respectively $L_9$ and $L_{10}$ ($L_9<L_{10}$ ), so that the operator $P_9$ is set as the preferential viewer. Meanwhile, as shown in FIG. 44F, operators $P_{11}$ and $P_{12}$ are outside the preferential area designated at Area, but their distances to the reference point are identical. At this time, the shortest distances for the operators $P_{11}$ and $P_{12}$ to move to outside the preferential area are respectively $L_{11}$ and $L_{12}$ ($L_{11}>L_{12}$), so that the operator $P_{11}$ who is most difficult to move to outside the preferential area is set as the preferential viewer.

Thus, since the operator who is most difficult to move to outside the preferential area is set as the preferential viewer, even if there are a plurality of operators whose distances to the reference point are identical, the preferential viewer can be set in correspondence with the size and shape of the preferential area, and it is easily possible to set the preferential viewer among the plurality of operators.

Next, a description will be given of the details of the above-described processing for generating and displaying a stereoscopic image (Step 304 in FIG. 38). First, a description will be given of first processing for generating and displaying a stereoscopic image for presenting stereoscopic images consecutively to each of the plurality of operators.

Figure 45:
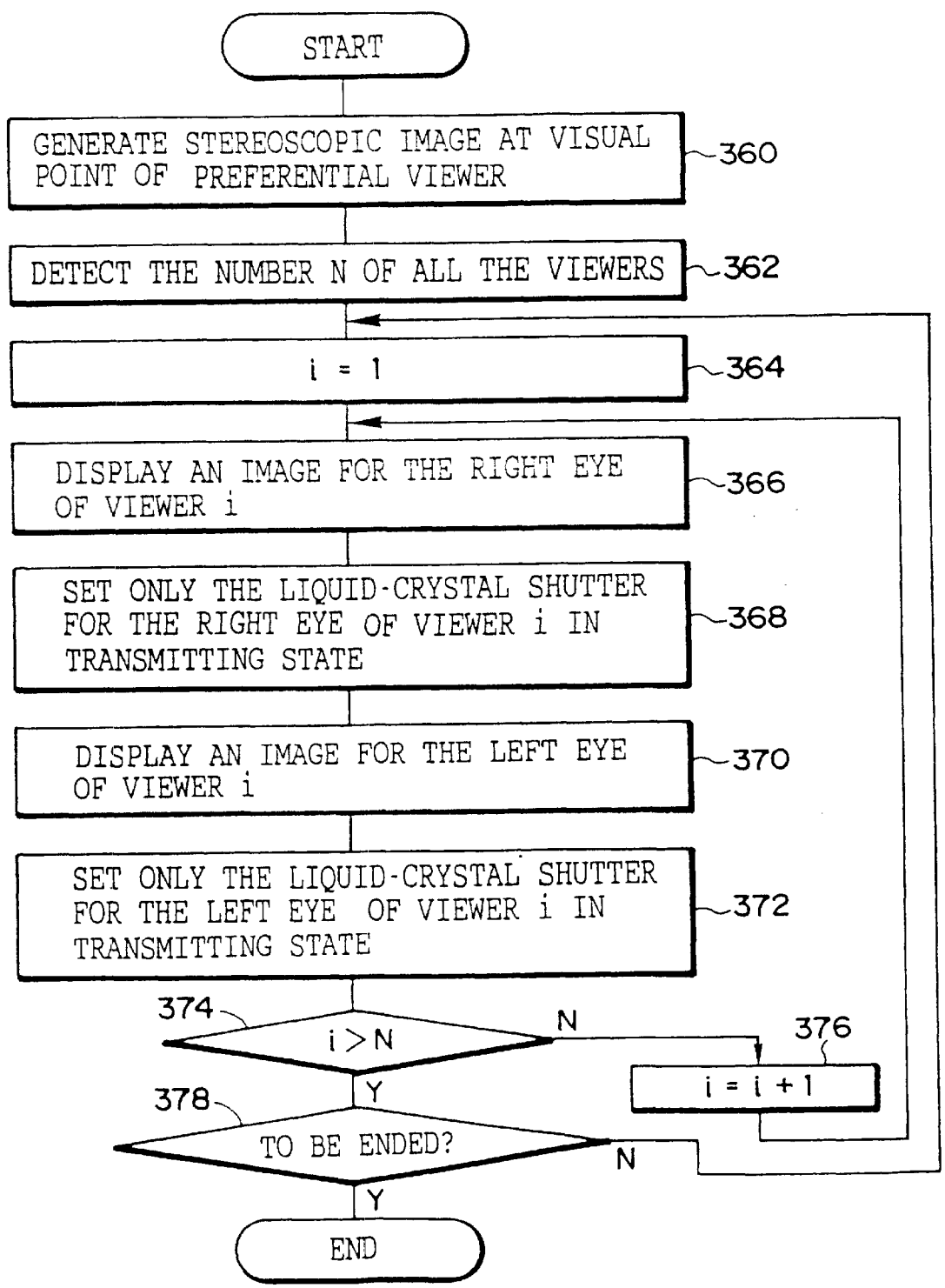
FIG. 45 is a flowchart illustrating the flow of first processing for generating and displaying a stereoscopic image, which is the detail of Step 304 in FIG. 38.

When Step 304 in FIG. 38 is executed as described above, and the processing for generating and displaying a stereoscopic image is started, the first processing for generating and displaying a stereoscopic image is executed, and the operation proceeds to Step 360 in FIG. 45. In Step 360, with respect to the preferential viewer set as described above, a stereoscopic image at that visual point is generated, i.e., an image for the right eye and an image for the left eye, are generated. In an ensuing Step 362, the number N of all the operators is detected. The detection of this number of operators may be entered by the keyboard prior to the execution of this processing, or may be set in advance. In addition, in this embodiment, the number of operators can be detected by the number of inputs from the position sensors ($22_1$, $22_2$) of the operators.

In an ensuing Step 364, a counter value i is initialized (i=1). In an ensuing Step 366, an image for the right eye of an operator i is displayed and, in an ensuing Step 368, the liquid-crystal shutter for the right eye of the liquid-crystal shutter eyeglasses of the operator i alone is set in a transmitting state. As a result, the image is presented only to the right eye of the operator i, and the image is not presented to the left eye of the operator i and the right and left eyes of the other operators. Incidentally, as for the image for the right eye of the operator i, the image based on the visual point of the preferential viewer should be preferably corrected by the visual point of the operator i, but the image based on the visual point of the preferential viewer may be presented as it is in order to allow the image to become close to the viewing state of the preferential viewer.

In an ensuing Step 370, an image for the left eye of the operator i is displayed and, in an ensuing Step 372, the liquid-crystal shutter for the left eye of the liquid-crystal shutter eyeglasses of the operator i alone is set in the transmitting state. As a result, the image is presented only to the left eye of the operator i, and the image is not presented to the right eye of the operator i and the right and left eyes of the other operators.

In an ensuing Step 374, a determination is made as to whether or not i>N. If i≦N and NO is the answer in the determination, in order to present an image to an ensuing operator, the counter value i is incremented (i=i+1) in Step 376, and the operation then returns to Step 366 to repeat the above-described processing. On the other hand, if i>N and YES is the answer in the determination in Step 374, a determination is made in Step 378 as to whether or not an instruction for ending has been given. As for the determination in Step 378, it suffices if an arrangement is provided such that YES is given as the answer when, for example, an end command is entered by the keyboard or all the operators have moved out of the preferential area. When the displaying of the image is to be continued, NO is given as the answer in Step 378, and the operation returns to Step 364. When the displaying of the image is to be ended, YES is given as the answer in Step 378, and this routine ends.

Next, a description will be given of second processing for generating and displaying a stereoscopic image for presenting stereoscopic images consecutively to the right or left eye of each of the plurality of operators.

Figure 46:
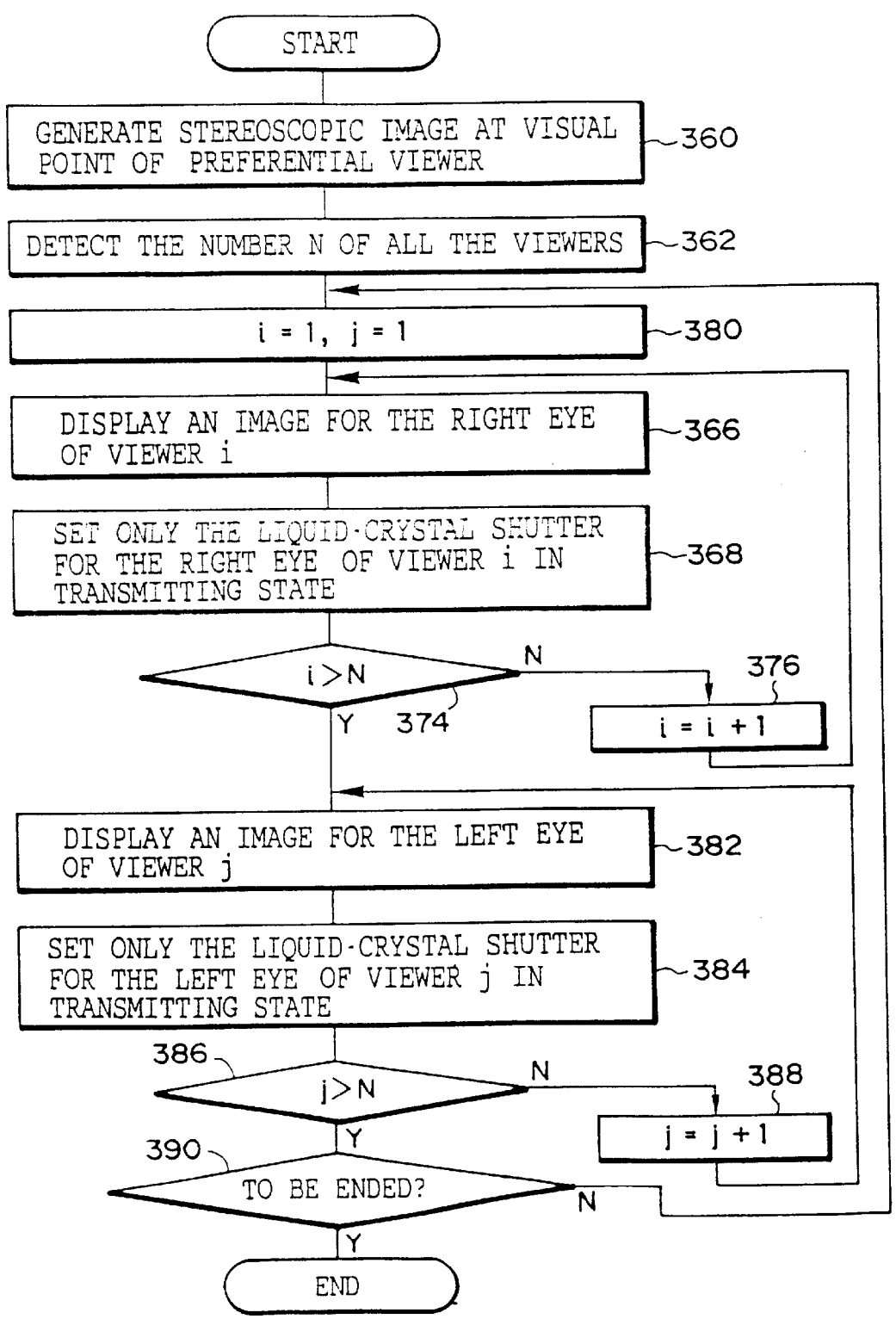
FIG. 46 is a flowchart illustrating the flow of second processing for generating and displaying a stereoscopic image, which is the detail of Step 304 in FIG. 38.

When the second processing for generating and displaying a stereoscopic image is executed, the processing routine shown in FIG. 46 is executed, and a stereoscopic image based on the visual point of the preferential viewer is generated (Step 360), and the number N of all the operators is detected (Step 362). In an ensuing Step 380, a counter value i for the right eye and a counter value j for the left eye are initialized (i=1, j=1). In an ensuing Step 366, an image for the right eye of an operator i is displayed and, in an ensuing Step 368, the liquid-crystal shutter for the right eye of the liquid-crystal shutter eyeglasses of the operator i alone is set in the transmitting state. In an ensuing Step 374, a determination is made as to whether or not i>N. If i≦N and NO is the answer in the determination, in order to present an image to the right eye of an ensuing operator, the counter value i is incremented (i=i+1) in Step 376, and the operation then returns to Step 366 to repeat the above-described processing.

On the other hand, if i>N and YES is the answer in the determination in Step 374, in order to start presenting an image to the left eye, the operation proceeds to Step 382 and an image for the left eye of the operator j is displayed. In an ensuing Step 384, the liquid-crystal shutter for the left eye of the liquid-crystal shutter eyeglasses of the operator j alone is set in the transmitting state. In an ensuing Step 386, a determination is made as to whether or not j>N. If j≦N and NO is the answer in the determination, in order to present an image to the left eye of an ensuing operator, the counter value j is incremented (j=j+1) in Step 388, and the operation then returns to Step 382 to repeat the above-described processing. On the other hand, if j>N and YES is the answer in the determination in Step 386, a determination is made in Step 390 as to whether or not an instruction for ending has been given. If the displaying of the image is to be continued, NO is given as the answer in Step 390, and the operation returns to Step 364. If the displaying of the image is to be ended, YES is given as the answer in Step 390, and this routine ends.

As described above, in this embodiment, in a case where a plurality of operators are present, the reference point and the preferential area are set, and the preferential viewer is set on the basis of the reference point and the preferential area. Since a stereoscopic image is displayed to the preferential viewer, even if a plurality of operators are present, it is possible to present a stereoscopic image to each of the operators.

It should be noted that the above-described generation of a stereoscopic image based on the visual point of the preferential viewer (Step 360 in FIGS. 45 and 46) should be preferably corrected to allow the virtual object to be perceived to be at the correct position for the operator, by taking into consideration the variations of the perception characteristics of operators concerning the perception of a virtual object displayed in the virtual space and corresponding to a real object, as already described in the above-described embodiment.

Namely, the image data for displaying the virtual object in the virtual space is read, and the position sensor 22 is read to read the position of the operator. Then, the image data is corrected, as will be described below, by using the aforementioned set position of the visual point and the like, and a stereoscopic image is displayed in an ensuing Step 206 by using the corrected image data (see FIG. 18).

Third Embodiment

Next, a description will be given of a third embodiment of the present invention. In this embodiment, the present invention is applied to a case in which a stereoscopic image is displayed in correspondence with the presence or absence of a preferential viewer so as to present the stereoscopic image to a plurality of operators. It should be noted that since this embodiment has an arrangement substantially similar to that of the above-described embodiments, identical portions will be denoted by the same reference numerals, and a detailed description thereof will be omitted.

When the setting of the operators is completed in the above-described manner, a stereoscopic image is displayed (Step 107 in FIG. 36). In this embodiment, the stereoscopic image is displayed in correspondence with the presence or absence of a preferential viewer. When the processing for displaying a stereoscopic image is started, the processing routine for displaying a stereoscopic image in FIG. 47 is executed. First, a reference point serving as a reference at the time of displaying the stereoscopic image is set, and a preferential area for setting an operator who is to be a subject among the plurality of operators is set (Step 300). Upon completion of the setting of the reference point and the preferential area, a determination is made in Step 392 as to whether or not a preferential viewer is present. When this processing routine is started, the preferential viewer is not yet set, so that NO is given as the answer on only the first occasion in Step 392. If NO is given as the answer in Step 392, a preferential viewer who is to be the subject for viewing the stereoscopic image among the plurality of operators is set by using the aforementioned set reference point and preferential area (Step 302), and a stereoscopic image based on the visual point of the preferential viewer is generated and displayed (Step 304).

On the other hand, if a preferential viewer is present, YES is given as the answer in Step 392, and a determination is made in Step 394 as to whether or not the preferential viewer is present inside the preferential area. If the preferential viewer is not present inside the preferential area, NO is given as the answer in Step 394. Then, after a preferential viewer is determined in the same way as described above, a stereoscopic image is generated and displayed (Steps 302 and 304). If the preferential viewer is present inside the preferential area, YES is given as the answer in Step 394, and a stereoscopic image based on the visual point of that preferential viewer is generated and displayed (Step 304). Then, a determination is made in Step 306 as to whether or not an instruction for ending has been given. If the displaying of the image is to be continued, NO is given as the answer in Step 306, and the operation returns to Step 392 to repeat the above-described processing. If the displaying of the image is to be ended, YES is given as the answer in Step 306, and this routine ends.

Thus, in this embodiment, the presence or absence of the preferential viewer is determined, the preferential viewer is set only when the preferential viewer is outside the preferential area or when the preferential viewer is absent, and a stereoscopic image based on the visual point of that preferential viewer is generated and displayed. Accordingly, the stereoscopic image which is displayed can be maintained by using the preferential viewer as the reference.

Fourth Embodiment

Next, a description will be given of a fourth embodiment of the present invention. In this embodiment, the present invention is applied to a case in which a stereoscopic image is displayed in correspondence with the presence or absence of a preferential viewer and the presence or absence of an operator inside the preferential area so as to present the stereoscopic image to a plurality of operators. It should be noted that since this embodiment has an arrangement substantially similar to that of the above-described embodiments, identical portions will be denoted by the same reference numerals, and a detailed description thereof will be omitted.

When the setting of the operators is completed in the above-described manner, a stereoscopic image is displayed (Step 107 in FIG. 36). In this embodiment, the stereoscopic image is displayed in correspondence with the presence or absence of a preferential viewer. When the processing for displaying a stereoscopic image is started, the processing routine for displaying a stereoscopic image in FIG. 48 is executed. First, a reference point serving as a reference at the time of displaying the stereoscopic image is set, and a preferential area for setting an operator who is to be a subject among the plurality of operators is set (Step 300). Upon completion of the setting of the reference point and the preferential area, a determination is made as to whether or not a preferential viewer is present (Step 392). When this processing routine is started, the preferential viewer is not yet set, so that NO is given as the answer on only the first occasion in Step 392. If NO is given as the answer in Step 392, a preferential viewer who is to be the subject for viewing the stereoscopic image among the plurality of operators is set by using the aforementioned set reference point and preferential area (Step 302), and a stereoscopic image based on the visual point of the preferential viewer is generated and displayed (Step 304).

On the other hand, if a preferential viewer is present (YES in Step 392), a determination is made as to whether or not the preferential viewer is present inside the preferential area (Step 394). If the preferential viewer is present inside the preferential area, YES is given as the answer in Step 394, and a stereoscopic image based on the visual point of that preferential viewer is generated and displayed (Step 304). If the preferential viewer is not present inside the preferential area (NO in Step 394), the operation proceeds to Step 396. In Step 396, a determination is made as to whether or not an operator is present inside the preferential area. If the operator is present inside the preferential area, YES is given as the answer in Step 396, and after a preferential viewer is determined in the same way as described above among the operators who are present inside the preferential area, a stereoscopic image is generated and displayed (Steps 302 and 304). On the other hand, if the preferential viewer is not present inside the preferential area (NO in Step 396), a decision is made that although the preferential viewer is outside the preferential area, it is unnecessary to set a new preferential viewer, and a stereoscopic image based on the visual point of that preferential viewer is generated and displayed (Step 304). Then, a determination is made in Step 306 as to whether or not an instruction for ending has been given. If the displaying of the image is to be continued, NO is given as the answer in Step 306, and the operation returns to Step 392 to repeat the above-described processing. If the displaying of the image is to be ended, YES is given as the answer in Step 306, and this routine ends.

Thus, in this embodiment, the presence or absence of the preferential viewer is determined, the preferential viewer is set only when the preferential viewer is outside the preferential area or when the preferential viewer is absent, and when another operator is present inside the preferential area, and a stereoscopic image based on the visual point of that preferential viewer is generated and displayed. Accordingly, the stereoscopic image which is displayed even when the preferential viewer has temporarily left his or her seat can be maintained by using the former preferential viewer as the reference.

It should be noted that although, in the above-described second to fourth embodiments, a description has been given of the case where a stereoscopic image is presented to two operators, the present invention is not limited to two operators, and is also applicable to a case where a stereoscopic image is presented to three or more operators.

Although, in the above-described embodiments, a description has been given of the case where a stereoscopic image is presented by correcting the structural distortion of the image so as to allow the operator to perceive the stereoscopic image, the image may be corrected by using as an object for correction the color of the image to be presented.

What is claimed is:

1. A stereoscopic image display apparatus comprising:
    display means having a display area for displaying an image;
    a pair of stereoscopic eyeglasses disposed at a position spaced apart from said display means and having an optical element for a left eye and an optical element for a right eye whose states of transmission and nontransmission of light can be mutually changed over on the basis of signals inputted respectively thereto;
    visual-point position input means for inputting positions of a pair of eyeballs located in vicinities of said stereoscopic eyeglasses;
    display-position input means for inputting positions on the display area of said display means;
    controlling means for defining a virtual stereoscopic space included between said display means and said stereoscopic eyeglasses on the basis of the inputted positions of the eyeballs and the inputted positions on the display area, for causing an image for the left eye of a virtual object and an image for the right eye of the virtual object to be alternately displayed by said display means by being mutually changed over so as to allow the virtual object to be perceived in the virtual stereoscopic space, and for outputting changeover signals to cause said optical element for the left eye and said optical element for the right eye to alternate the transmission and nontransmission of the light in synchronism with the changeover; and
    correcting means for determining in advance a relationship of correspondence between a perceived position in said virtual stereoscopic space and at least one of the position inputted by said visual-point position input means and the position inputted by said display-position input means, and for correcting coordinates in the virtual stereoscopic space for displaying the virtual object on the basis of the relationship of the correspondence,
    wherein said correcting means calculates the image for the left eye of the virtual object and the image for the right eye of the virtual object on the basis of the relationship of the correspondence, and
    wherein said correcting means determines the relationship of correspondence on the basis of an error between a position of the virtual object displayed in the virtual stereoscopic space and measured in advance and a measurement position used in the measurement of the perceived position of the virtual object.

2. A stereoscopic image display apparatus according to claim 1, wherein said display means is formed by including a reflecting member for reflecting part of the light, and said visual-point position input means inputs positions of visual points on the basis of the input of the positions on said display means onto which the pair of eyeballs located in the vicinities of said stereoscopic eyeglasses are projected.

3. A stereoscopic image display apparatus according to claim 1, wherein said visual-point position input means is provided with a position input portion for inputting an operator's own position and a sighting portion for forming a reference visual axis with respect to said position input portion, and said visual-point position input means inputs the position of the visual point on the basis of the inputted operator's own position and the reference visual axis.

4. A stereoscopic image display apparatus according to claim 2, wherein said visual-point position input means is provided with a detecting portion for detecting the rotation of the eyeball located in the vicinity of said stereoscopic eyeglasses, and said visual-point position input means inputs the position of the visual point on the basis of the detected rotation of the eyeball.

5. A stereoscopic image display apparatus according to claim 2, wherein said visual-point position input means is provided with a detecting means for detecting the rotation of the eyeball from a fixation position on said display means, and said visual-point position input means inputs the position of the visual point on the basis of the detected rotation of the eyeball.

6. A stereoscopic image display apparatus according to claim 1, wherein said display-position input means is provided with a position input portion for inputting the operator's own position and a light emitting portion for forming a reference optical axis with respect to said position input portion, and said display-position input means inputs the position on the display area on the basis of the inputted operator's own position and the reference optical axis with respect to a reference figure displayed on the display area.

7. A method of displaying a stereoscopic image for displaying a stereoscopic image by a programmed computer, comprising:
    inputting positions of a pair of eyeballs located in vicinities of a pair of stereoscopic eyeglasses having an optical element for a left eye and an optical element for a right eye whose states of transmission and nontransmission of light can be alternately changed over on the basis of signals inputted respectively thereto;
    inputting positions on a display area of display means having the display area for displaying an image;
    defining a virtual stereoscopic space included between said display means and said stereoscopic eyeglasses on the basis of the positions of the eyeballs and the positions on the display area, alternately displaying an image for the left eye of a virtual object and an image for the right eye of the virtual object so as to allow the virtual object to be perceived in the virtual stereoscopic space, and causing the states of transmission and non-transmission of light of said optical element for the left eye and said optical element for the right eye to be mutually changed over alternately in synchronism with the changeover; and determining in advance a relationship of correspondence between a perceived position in said virtual stereoscopic space and at least one of the position inputted by said visual-point position input means and the position inputted by said display-position input means, and correcting coordinates in the virtual stereoscopic space for displaying the virtual object on the basis of the relationship of the correspondence, wherein said determining includes calculating the image for the left eye of the virtual object and the image for the right eye of the virtual object on the basis of the relationship of the correspondence, and wherein said determining includes determining the relationship of correspondence on the basis of an error between a position of the virtual object displayed in the virtual stereoscopic space and measured in advance and a measurement position used in the measurement of the perceived position of the virtual object.

8. A recording medium in which a stereoscopic-image display program is recorded for displaying a stereoscopic image by a computer by:

inputting positions of a pair of eyeballs located in vicinities of a pair of stereoscopic eyeglasses having an optical element for a left eye and an optical element for a right eye whose states of transmission and nontransmission of light can be alternately changed over on the basis of signals inputted respectively thereto;

inputting positions on a display area of display means having the display area for displaying an image;

defining a virtual stereoscopic space included between said display means and said stereoscopic eyeglasses on the basis of the positions of the eyeballs and the positions on the display area, alternately displaying an image for the left eye of a virtual object and an image for the right eye of the virtual object so as to allow the virtual object to be perceived in the virtual stereoscopic space, and causing the states of transmission and non-transmission of light of said optical element for the left eye and said optical element for the right eye to be mutually changed over alternately in synchronism with the changeover; and determining in advance a relationship of correspondence between a perceived position in said virtual stereoscopic space and at least one of the position inputted by said visual-point position input means and the position inputted by said display-position input means, and correcting coordinates in the virtual stereoscopic space for displaying the virtual object on the basis of the relationship of the correspondence, wherein said determining includes calculating the image for the left eye of the virtual object and the image for the right eye of the virtual object on the basis of the relationship of the correspondence, and wherein said determining includes determining the relationship of correspondence on the basis of an error between a position of the virtual object displayed in the virtual stereoscopic space and measured in advance and a measurement position used in the measurement of the perceived position of the virtual object.

9. A stereoscopic image display apparatus comprising:

display means for displaying an image;

a plurality of pairs of stereoscopic eyeglasses disposed at positions spaced apart from said display means, each of said plurality of pairs of stereoscopic eyeglasses having notifying means for notifying an operator's own position as well as an optical element for a left eye and an optical element for a right eye whose states of transmission and nontransmission of light can be mutually changed over on the basis of signals inputted respectively thereof;

selecting means for selecting stereoscopic eyeglasses subject to perception from among said plurality of pairs of stereoscopic eyeglasses;

display-position input means for inputting positions on said display means; and controlling means for defining a virtual stereoscopic space included between said display means and said stereoscopic eyeglasses on the basis of the positions on said display means and a reference position spaced apart from said display means and set in advance, for causing an image for the left eye of a virtual object and an image for the right eye of the virtual object to be alternately displayed by said display means by being mutually changed over so as to allow the virtual object to be perceived in the virtual stereoscopic space, and for outputting changeover signals to cause said optical element for the left eye and said optical element for the right eye of said stereoscopic eyeglasses subject to perception to repeat the transmission and nontransmission of the light alternately in synchronism with the changeover.

10. A stereoscopic image display apparatus according to claim 9, wherein the reference position is set on the basis of the operator's own position notified by said notifying means of one of said plurality of pairs of stereoscopic eyeglasses.

11. A stereoscopic image display apparatus according to claim 9, wherein the reference position is one of a position of a visual point set in advance and the position of the visual point which is set on the basis of the position notified by said notifying means of one of said plurality of pairs of stereoscopic eyeglasses.

12. A stereoscopic image display apparatus according to claim 9, wherein said selecting means selects said stereoscopic eyeglasses whose distance to the reference position is shortest.

13. A stereoscopic image display apparatus according to claim 9, wherein said selecting means has area-setting means for setting a presence area where said stereoscopic eyeglasses is estimated to be present on the basis of the reference position, and said selecting means selects said stereoscopic eyeglasses subject to perception on the basis of the presence area and a plurality of positions notified by said notifying means.

14. A stereoscopic image display apparatus according to claim 9, wherein said optical element for the left eye and said optical element for the right eye of said stereoscopic eyeglasses are liquid-crystal shutters.

15. A method for displaying a stereoscopic image by a programmed computer, comprising:

inputting positions on a display area of display means having the display area for displaying an image;

selecting a pair of stereoscopic eyeglasses subject to perception from among a plurality of pairs of stereoscopic eyeglasses, each of said plurality of pairs of stereoscopic eyeglasses having an optical element for a left eye and an optical element for a right eye whose states of transmission and nontransmission of light can be mutually changed over on the basis of signals inputted respectively thereto; and defining a virtual stereoscopic space included between said display means and said stereoscopic eyeglasses on the basis of the positions on said display means and a reference position spaced apart from said display means and set in advance, causing an image for the left eye of a virtual object and an image for the right eye of the virtual object to be alternately displayed by said display means by being mutually changed over so as to allow the virtual object to be perceived in the virtual stereoscopic space, and causing the states of transmission and nontransmission of light of said optical element for the left eye and said optical element for the right eye of said stereoscopic eyeglasses subject to perception to be mutually changed over alternately in synchronism with the changeover.

16. A recording medium in which stereoscopic-image display program is recorded for displaying a stereoscopic image by a computer by:

inputting positions on a display area of display means having the display area for displaying an image;

selecting a pair of stereoscopic eyeglasses subject to perception from among a plurality of pairs of stereoscopic eyeglasses, each of said plurality of pairs of stereoscopic eyeglasses having an optical element for a left eye and an optical element for a right eye whose states of transmission and nontransmission of light can be mutually changed over on the basis of signals inputted respectively thereto; and defining a virtual stereoscopic space included between said display means and said stereoscopic eyeglasses on the basis of the positions on said display means and a reference position spaced apart from said display means and set in advance, causing an image for the left eye of a virtual object and an image for the right eye of the virtual object to be alternately displayed by said display means by being mutually changed over so as to allow the virtual object to be perceived in the virtual stereoscopic space, and causing the states of transmission and nontransmission of light of said optical element for the left eye and said optical element for the right eye of said stereoscopic eyeglasses subject to perception to be mutually changed over alternately in synchronism with the changeover.

17. A stereoscopic image display apparatus comprising:

a display having a display area, the display displaying an image;

a pair of stereoscopic eyeglasses disposed at a position spaced apart from the display and having an optical element for a left eye and an optical element for a right eye whose states of transmission and nontransmission of light can be mutually changed over on the basis of signals inputted respectively thereto;

a visual-point position input, the visual-point position input adapted to input data representing positions of a pair of eyeballs located in vicinities of said stereoscopic eyeglasses;

a display-position input, the display-position input adapted to input data representing positions on the display area of the display; and a controller which is programmed to define a virtual stereoscopic space included between the display and the stereoscopic eyeglasses on the basis of the eyeball position data the display area data, and to cause an image for the left eye of a virtual object and an image for the right eye of the virtual object to be alternately displayed by the display by being mutually changed over so as to allow the virtual object to be perceived in the virtual stereoscopic space, and to output changeover signals to cause the optical element for the left eye and the optical element for the right eye to alternate the transmission and nontransmission of the light in synchronism with the changeover.

18. A stereoscopic image display apparatus according to claim 17, wherein the display includes a reflecting member which reflects a portion of the light, and the visual-point position input is adapted to input positions of visual points on the basis of the input of the positions on the display onto which the pair of eyeballs located in the vicinities of said stereoscopic eyeglasses are projected.

19. A stereoscopic image display apparatus according to claim 17, wherein the visual-point position input further comprises:

a position input portion which is adapted to input an operator's own position; and a sighting portion which is adapted to form a reference visual axis with respect to the position input portion, and the visual-point position input is adapted to input the position of the visual point on the basis of the inputted operator's own position and a reference visual axis.

20. A stereoscopic image display apparatus according to claim 18, wherein the visual-point position input further comprises:

a detecting portion which is adapted to detect the rotation of the eyeball located in the vicinity of the stereoscopic eyeglasses, and the visual-point position input is adapted to input the position of the visual point on the basis of the detected rotation of the eyeball.

21. A stereoscopic image display apparatus according to claim 18, wherein the visual-point position input further comprises:

a detector which is adapted to detect the rotation of the eyeball from a fixation position on the display, and the visual-point position input is adapted to input the position of the visual point on the basis of the detected rotation of the eyeball.

22. A stereoscopic image display apparatus according to claim 17, wherein the display-position input further comprises:

a position input portion adapted to input the operator's own position; and a light emitting device which is adapted to form a reference optical axis with respect to the position input portion, and wherein the display-position input is adapted to input the position on the display area on the basis of the inputted operator's own position and the reference optical axis with respect to a reference figure displayed on the display area.

23. A stereoscopic image display apparatus according to claim 17, further comprising:

a correction system which is adapted to determine, in advance, a relationship of correspondence between a perceived position in the virtual stereoscopic space and at least one position inputted by the visual-point position input and the position inputted by the display-position input, and to correct coordinates in the virtual stereoscopic space for displaying the virtual object on the basis of the relationship of correspondence.

24. A stereoscopic image display apparatus according to claim 23, wherein the correction system is adapted to calculate the image for the left eye of the virtual object and the image for the right eye of the virtual object on the basis of the relationship of correspondence.

25. A stereoscopic image display apparatus according to claim 23, wherein the correction system is adapted to determine the relationship of correspondence on the basis of an error between a position of the virtual object displayed in the virtual stereoscopic space and measured in advance and a measurement position used in the measurement of the perceived position of the virtual object.

* * * * *